(12) United States Patent
Sato et al.

(10) Patent No.: US 11,376,101 B2
(45) Date of Patent: Jul. 5, 2022

(54) FORCE CONTROL, STOP MECHANISM, REGULATING STRUCTURE OF REMOVABLE ARCH ADJUSTMENT APPLIANCE

(71) Applicant: Align Technology, Inc., San Jose, CA (US)

(72) Inventors: Jun Sato, San Jose, CA (US); Yaser Shanjani, San Jose, CA (US); Ryan Kimura, San Jose, CA (US)

(73) Assignee: Align Technology, Inc., San Jose, CA (US)

(*) Notice: Subject to any disclaimer, the term of this patent is extended or adjusted under 35 U.S.C. 154(b) by 457 days.

(21) Appl. No.: 15/580,874

(22) PCT Filed: Dec. 1, 2017

(86) PCT No.: PCT/US2017/064340
§ 371 (c)(1),
(2) Date: Dec. 8, 2017

(87) PCT Pub. No.: WO2018/102770
PCT Pub. Date: Jun. 7, 2018

(65) Prior Publication Data
US 2018/0368944 A1 Dec. 27, 2018

Related U.S. Application Data

(60) Provisional application No. 62/429,545, filed on Dec. 2, 2016.

(51) Int. Cl.
*A61C 7/10* (2006.01)
*A61C 7/08* (2006.01)

(52) U.S. Cl.
CPC . *A61C 7/10* (2013.01); *A61C 7/08* (2013.01)

(58) Field of Classification Search
CPC ............. A61C 7/08; A61C 7/10; A61C 7/00
(Continued)

(56) References Cited

U.S. PATENT DOCUMENTS

| 2,098,867 A | 11/1937 | Baxter |
| 2,171,695 A | 9/1939 | Harper |
(Continued)

FOREIGN PATENT DOCUMENTS

| AU | 517102 B | 11/1977 |
| AU | 3031677 A | 11/1977 |
(Continued)

OTHER PUBLICATIONS

US 8,553,966 B1, 10/2013, Alpern et al. (withdrawn)
(Continued)

*Primary Examiner* — Heidi M Eide
(74) *Attorney, Agent, or Firm* — Shay Glenn LLP

(57) ABSTRACT

A removable arch adjustment appliance includes a removable shell having a plurality of cavities formed therein, wherein the plurality of cavities are shaped to receive at least one posterior tooth of a patient on each side of a patient's jaw. The shell can include an elastic transpalatal element that spans a palate of the patient and provides force to expand at least one of the spaces between the posterior teeth on each side of a patient's jaw or the palate of the patient. The transpalatal element can include a predetermined force characteristic, a number of force control elements to control the force provided by the transpalatal element, and/or a regulating structure to balance and direct the force provided by the transpalatal element, wherein the transpalatal element has a width specific to a stage of a treatment plan.

15 Claims, 32 Drawing Sheets

(58) Field of Classification Search
USPC .......................................................... 433/7
See application file for complete search history.

(56) References Cited

U.S. PATENT DOCUMENTS

| | | | |
|---|---|---|---|
| 2,194,790 A | 3/1940 | Gluck | |
| 2,467,432 A | 4/1949 | Kesling | |
| 2,531,222 A | 11/1950 | Kesling | |
| 2,818,065 A | 12/1957 | Freed | |
| 3,089,487 A | 5/1963 | Enicks et al. | |
| 3,092,907 A | 6/1963 | Traiger | |
| 3,162,948 A * | 12/1964 | Gerber | A61C 7/00 433/7 |
| 3,178,820 A | 4/1965 | Kesling | |
| 3,211,143 A | 10/1965 | Grossberg | |
| 3,277,892 A | 10/1966 | Tepper | |
| 3,379,193 A | 4/1968 | Monsghan | |
| 3,385,291 A | 5/1968 | Martin | |
| 3,407,500 A | 10/1968 | Kesling | |
| 3,478,742 A | 11/1969 | Bohlmann | |
| 3,496,936 A | 2/1970 | Gores | |
| 3,533,163 A | 10/1970 | Kirschenbaum | |
| 3,556,093 A | 1/1971 | Quick | |
| 3,600,808 A | 8/1971 | Reeve | |
| 3,660,900 A | 5/1972 | Andrews | |
| 3,683,502 A | 8/1972 | Wallshein | |
| 3,724,075 A | 4/1973 | Kesling | |
| 3,738,005 A | 6/1973 | Cohen et al. | |
| 3,797,115 A | 3/1974 | Silverman et al. | |
| 3,860,803 A | 1/1975 | Levine | |
| 3,885,310 A | 5/1975 | Northcutt | |
| 3,916,526 A | 11/1975 | Schudy | |
| 3,922,786 A | 12/1975 | Lavin | |
| 3,949,477 A | 4/1976 | Cohen et al. | |
| 3,950,851 A | 4/1976 | Bergersen | |
| 3,955,282 A | 5/1976 | McNall | |
| 3,983,628 A | 10/1976 | Acevedo | |
| 4,014,096 A | 3/1977 | Dellinger | |
| 4,055,895 A | 11/1977 | Huge | |
| 4,094,068 A | 6/1978 | Schinhammer | |
| 4,117,596 A | 10/1978 | Wallshein | |
| 4,129,946 A | 12/1978 | Kennedy | |
| 4,134,208 A | 1/1979 | Pearlman | |
| 4,139,944 A | 2/1979 | Bergersen | |
| 4,179,811 A | 12/1979 | Hinz | |
| 4,179,812 A | 12/1979 | White | |
| 4,183,141 A | 1/1980 | Dellinger | |
| 4,195,046 A | 3/1980 | Kesling | |
| 4,204,325 A | 5/1980 | Kaelble | |
| 4,253,828 A | 3/1981 | Coles et al. | |
| 4,255,138 A | 3/1981 | Frohn | |
| 4,299,568 A | 11/1981 | Crowley | |
| 4,324,546 A | 4/1982 | Heitlinger et al. | |
| 4,324,547 A | 4/1982 | Arcan et al. | |
| 4,348,178 A | 9/1982 | Kurz | |
| 4,368,040 A | 1/1983 | Weissman | |
| 4,419,992 A | 12/1983 | Chorbajian | |
| 4,433,956 A | 2/1984 | Witzig | |
| 4,433,960 A | 2/1984 | Garito et al. | |
| 4,439,154 A | 3/1984 | Mayclin | |
| 4,449,928 A | 5/1984 | von Weissenfluh | |
| 4,478,580 A | 10/1984 | Barrut | |
| 4,500,294 A | 2/1985 | Lewis | |
| 4,505,672 A | 3/1985 | Kurz | |
| 4,505,673 A | 3/1985 | Yoshii | |
| 4,519,386 A | 5/1985 | Sullivan | |
| 4,523,908 A | 6/1985 | Drisaldi et al. | |
| 4,526,540 A | 7/1985 | Dellinger | |
| 4,553,936 A | 11/1985 | Wang | |
| 4,575,330 A | 3/1986 | Hull | |
| 4,575,805 A | 3/1986 | Moermann et al. | |
| 4,591,341 A | 5/1986 | Andrews | |
| 4,592,725 A * | 6/1986 | Goshgarian | A61C 7/282 433/24 |
| 4,608,021 A | 8/1986 | Barrett | |
| 4,609,349 A | 9/1986 | Cain | |
| 4,611,288 A | 9/1986 | Duret et al. | |
| 4,629,424 A | 12/1986 | Lauks et al. | |
| 4,638,145 A | 1/1987 | Sakuma et al. | |
| 4,656,860 A | 4/1987 | Orthuber et al. | |
| 4,663,720 A | 5/1987 | Duret et al. | |
| 4,664,626 A | 5/1987 | Kesling | |
| 4,665,621 A | 5/1987 | Ackerman et al. | |
| 4,676,747 A | 6/1987 | Kesling | |
| 4,755,139 A | 7/1988 | Abbatte et al. | |
| 4,757,824 A | 7/1988 | Chaumet | |
| 4,763,791 A | 8/1988 | Halverson et al. | |
| 4,764,111 A | 8/1988 | Knierim | |
| 4,790,752 A | 12/1988 | Cheslak | |
| 4,793,803 A | 12/1988 | Martz | |
| 4,798,534 A | 1/1989 | Breads | |
| 4,830,612 A | 5/1989 | Bergersen | |
| 4,836,778 A | 6/1989 | Baumrind et al. | |
| 4,837,732 A | 6/1989 | Brandestini et al. | |
| 4,850,864 A | 7/1989 | Diamond | |
| 4,850,865 A | 7/1989 | Napolitano | |
| 4,856,991 A | 8/1989 | Breads et al. | |
| 4,877,398 A | 10/1989 | Kesling | |
| 4,880,380 A | 11/1989 | Martz | |
| 4,886,451 A | 12/1989 | Cetlin | |
| 4,889,238 A | 12/1989 | Batchelor | |
| 4,890,608 A | 1/1990 | Steer | |
| 4,901,737 A | 2/1990 | Toone | |
| 4,932,866 A | 6/1990 | Guis | |
| 4,935,635 A | 6/1990 | O'Harra | |
| 4,936,862 A | 6/1990 | Walker et al. | |
| 4,937,928 A | 7/1990 | van der Zel | |
| 4,941,826 A | 7/1990 | Loran et al. | |
| 4,952,928 A | 8/1990 | Carroll et al. | |
| 4,964,770 A | 10/1990 | Steinbichler et al. | |
| 4,971,557 A | 11/1990 | Martin | |
| 4,975,052 A | 12/1990 | Spencer et al. | |
| 4,976,614 A * | 12/1990 | Tepper | A61C 7/00 433/18 |
| 4,983,334 A | 1/1991 | Adell | |
| 4,997,369 A | 3/1991 | Shafir | |
| 5,002,485 A | 3/1991 | Aagesen | |
| 5,011,405 A | 4/1991 | Lemchen | |
| 5,015,183 A | 5/1991 | Fenick | |
| 5,017,133 A | 5/1991 | Miura | |
| 5,018,969 A | 5/1991 | Andreiko et al. | |
| 5,027,281 A | 6/1991 | Rekow et al. | |
| 5,035,613 A | 7/1991 | Breads et al. | |
| 5,037,295 A | 8/1991 | Bergersen | |
| 5,055,039 A | 10/1991 | Abbatte et al. | |
| 5,061,839 A | 10/1991 | Matsuno et al. | |
| 5,083,919 A | 1/1992 | Quachi | |
| 5,094,614 A | 3/1992 | Wildman | |
| 5,100,316 A | 3/1992 | Wildman | |
| 5,103,838 A | 4/1992 | Yousif | |
| 5,114,339 A | 5/1992 | Guis | |
| 5,121,333 A | 6/1992 | Riley et al. | |
| 5,123,425 A | 6/1992 | Shannon et al. | |
| 5,128,870 A | 7/1992 | Erdman et al. | |
| 5,130,064 A | 7/1992 | Smalley et al. | |
| 5,131,843 A | 7/1992 | Hilgers et al. | |
| 5,131,844 A | 7/1992 | Marinaccio et al. | |
| 5,139,419 A | 8/1992 | Andreiko et al. | |
| 5,145,364 A | 9/1992 | Martz et al. | |
| 5,176,517 A | 1/1993 | Truax | |
| 5,194,003 A | 3/1993 | Garay et al. | |
| 5,204,670 A | 4/1993 | Stinton | |
| 5,222,499 A | 6/1993 | Allen et al. | |
| 5,224,049 A | 6/1993 | Mushabac | |
| 5,238,404 A | 8/1993 | Andreiko | |
| 5,242,304 A | 9/1993 | Truax et al. | |
| 5,245,592 A | 9/1993 | Kuemmel et al. | |
| 5,273,429 A | 12/1993 | Rekow et al. | |
| 5,278,756 A | 1/1994 | Lemchen et al. | |
| 5,306,144 A | 4/1994 | Hibst et al. | |
| 5,312,247 A * | 5/1994 | Sachdeva | A61C 7/10 433/18 |
| 5,314,335 A | 5/1994 | Fung | |
| 5,324,186 A | 6/1994 | Bakanowski | |

(56) References Cited

U.S. PATENT DOCUMENTS

| | | |
|---|---|---|
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 6,002,706 A | 12/1999 | Staver et al. |
| 6,018,713 A | 1/2000 | Coli et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A | 9/2000 | Cleary |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chishti et al. |
| 6,230,142 B1 | 5/2001 | Benigno et al. |
| 6,231,338 B1 | 5/2001 | de Josselin de Jong et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto |
| 6,299,438 B1 | 10/2001 | Sahagian et al. |
| 6,299,440 B1 * | 10/2001 | Phan .................. A61C 7/00 433/18 |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |

(56) References Cited

U.S. PATENT DOCUMENTS

| | | |
|---|---|---|
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 * | 6/2003 | Phan ................. A61C 7/00 433/18 |
| 6,573,998 B2 | 6/2003 | Cohen Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 * | 9/2003 | Kittelsen ............. A61C 7/08 128/859 |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,843,370 B2 | 1/2005 | Tuneberg |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |

(56) References Cited

U.S. PATENT DOCUMENTS

| | | |
|---|---|---|
| 7,476,100 B2 | 1/2009 | Kuo |
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,828,601 B2 | 11/2010 | Pyczak |
| 7,841,464 B2 | 11/2010 | Cinader et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,108,189 B2 | 1/2012 | Chelnokov et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,152,518 B2 | 4/2012 | Kuo |
| 8,160,334 B2 | 4/2012 | Thiel et al. |
| 8,172,569 B2 | 5/2012 | Matty et al. |
| 8,197,252 B1 | 6/2012 | Harrison |
| 8,201,560 B2 | 6/2012 | Dembro |
| 8,215,312 B2 | 7/2012 | Garabadian et al. |
| 8,240,018 B2 | 8/2012 | Walter et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandells et al. |
| 8,314,764 B2 | 11/2012 | Kim et al. |
| 8,332,015 B2 | 12/2012 | Ertl |
| 8,354,588 B2 | 1/2013 | Sticker et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,366,479 B2 | 12/2013 | Borst et al. |
| 8,601,925 B1 | 12/2013 | Coto |
| 8,639,477 B2 | 1/2014 | Chelnokov et al. |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,753,114 B2 | 6/2014 | Vuillemot |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,899,976 B2 | 12/2014 | Chen et al. |
| 8,936,463 B2 | 1/2015 | Mason et al. |
| 8,944,812 B2 | 2/2015 | Kuo |
| 8,948,482 B2 | 2/2015 | Levin |
| 8,956,058 B2 | 2/2015 | Rösch |
| 8,992,216 B2 | 3/2015 | Karazivan |
| 9,004,915 B2 | 4/2015 | Moss et al. |
| 9,022,792 B2 | 5/2015 | Sticker et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |

(56) References Cited

U.S. PATENT DOCUMENTS

| | | |
|---|---|---|
| 9,214,014 B2 | 12/2015 | Levin |
| 9,220,580 B2 | 12/2015 | Borovinskih et al. |
| 9,241,774 B2 | 1/2016 | Li et al. |
| 9,242,118 B2 | 1/2016 | Brawn |
| 9,261,358 B2 | 2/2016 | Atiya et al. |
| 9,277,972 B2 | 3/2016 | Brandt et al. |
| 9,336,336 B2 | 5/2016 | Deichmann et al. |
| 9,351,810 B2 | 5/2016 | Moon |
| 9,375,300 B2 | 6/2016 | Matov et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,566,132 B2 | 2/2017 | Stone-Collonge et al. |
| 9,584,771 B2 | 2/2017 | Mandelis et al. |
| 9,589,329 B2 | 3/2017 | Levin |
| 9,675,427 B2 | 6/2017 | Kopelman |
| 9,675,430 B2 | 6/2017 | Verker et al. |
| 9,693,839 B2 | 7/2017 | Atiya et al. |
| 9,730,769 B2 | 8/2017 | Chen et al. |
| 9,744,006 B2 | 8/2017 | Ross |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 9,861,451 B1 | 1/2018 | Davis |
| 9,936,186 B2 | 4/2018 | Jesenko et al. |
| 10,123,706 B2 | 11/2018 | Elbaz et al. |
| 10,123,853 B2 | 11/2018 | Moss et al. |
| 10,154,889 B2 | 12/2018 | Chen et al. |
| 10,159,541 B2 | 12/2018 | Bindayel |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,248,883 B2 | 4/2019 | Borovinskih et al. |
| 10,258,432 B2 | 4/2019 | Webber |
| 10,275,862 B2 | 4/2019 | Levin |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1* | 12/2002 | Phan .................. A61C 19/003 433/6 |
| 2003/0000927 A1 | 1/2003 | Kanaya et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1* | 1/2004 | Mah .................. A61C 7/10 433/7 |
| 2004/0013994 A1 | 1/2004 | Goldberg et al. |
| 2004/0013996 A1* | 1/2004 | Sapian .................. A61C 7/10 433/18 |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Plan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1* | 8/2005 | Abolfathi .................. A61C 7/10 433/7 |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0098007 A1 | 5/2006 | Rouet et al. |
| 2006/0099545 A1 | 5/2006 | Lia et al. |

(56) References Cited

U.S. PATENT DOCUMENTS

| | | |
|---|---|---|
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0037111 A1* | 2/2007 | Mailyan ............... A61C 7/10 433/7 |
| 2007/0037112 A1* | 2/2007 | Mailyan ............... A61C 7/10 433/7 |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0239488 A1 | 10/2007 | DeRosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254402 A1 | 10/2008 | Hilliard |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0130635 A1* | 5/2009 | Tortorici ................. A61C 7/08 433/215 |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1* | 7/2009 | Cao .......................... A61C 7/08 433/24 |
| 2009/0210032 A1 | 8/2009 | Beiski et al. |
| 2009/0218514 A1 | 9/2009 | Klunder et al. |
| 2009/0281433 A1 | 11/2009 | Saadat et al. |
| 2009/0286195 A1 | 11/2009 | Sears et al. |
| 2009/0298613 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo Gonzalez et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0047732 A1* | 2/2010 | Park ......................... A61C 7/00 433/18 |
| 2010/0062394 A1 | 3/2010 | Jones et al. |
| 2010/0068676 A1 | 3/2010 | Mason et al. |
| 2010/0075268 A1* | 3/2010 | Duran Von Arx ....... A61C 7/10 433/6 |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | DuHamel et al. |
| 2010/0165275 A1 | 7/2010 | Tsukamoto et al. |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0268363 A1 | 10/2010 | Karim et al. |
| 2010/0268515 A1 | 10/2010 | Vogt et al. |
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2010/0303316 A1 | 12/2010 | Bullis et al. |
| 2010/0312484 A1 | 12/2010 | DuHamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0027743 A1* | 2/2011 | Cinader, Jr. ............ A61C 7/006 433/11 |
| 2011/0045428 A1 | 2/2011 | Boltunov et al. |
| 2011/0056350 A1 | 3/2011 | Gale et al. |
| 2011/0065060 A1 | 3/2011 | Teixeira et al. |
| 2011/0081625 A1 | 4/2011 | Fuh |
| 2011/0091832 A1 | 4/2011 | Kim et al. |
| 2011/0102549 A1 | 5/2011 | Takahashi |

(56) References Cited

U.S. PATENT DOCUMENTS

| | | |
|---|---|---|
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |
| 2011/0159452 A1 | 6/2011 | Huang |
| 2011/0164810 A1 | 7/2011 | Zang et al. |
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0262881 A1 | 10/2011 | Mauclaire |
| 2011/0269092 A1 | 11/2011 | Kuo et al. |
| 2011/0316994 A1 | 12/2011 | Lemchen |
| 2012/0028210 A1 | 2/2012 | Hegyi et al. |
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizuyama et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |
| 2012/0166213 A1 | 6/2012 | Arnone et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0150689 A1 | 6/2013 | Shaw-Klein |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0100495 A1 | 4/2014 | Haseley |
| 2014/0106289 A1 | 4/2014 | Kozlowski |
| 2014/0122027 A1 | 5/2014 | Andreiko et al. |
| 2014/0136222 A1 | 5/2014 | Arnone et al. |
| 2014/0142902 A1 | 5/2014 | Chelnokov et al. |
| 2014/0178829 A1 | 6/2014 | Kim |
| 2014/0220520 A1 | 8/2014 | Salamini |
| 2014/0265034 A1 | 9/2014 | Dudley |
| 2014/0272774 A1 | 9/2014 | Dillon et al. |
| 2014/0280376 A1 | 9/2014 | Kuo |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342299 A1 | 11/2014 | Jung |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0031940 A1 | 1/2015 | Floyd |
| 2015/0079530 A1 | 3/2015 | Bergersen |
| 2015/0079531 A1 | 3/2015 | Heine |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0132708 A1 | 5/2015 | Kuo |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Iowe et al. |
| 2015/0182303 A1 | 7/2015 | Abraham et al. |
| 2015/0216626 A1 | 8/2015 | Ranjbar |
| 2015/0216716 A1 | 8/2015 | Anitua Aldecoa |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0306486 A1 | 10/2015 | Logan et al. |
| 2015/0320320 A1 | 11/2015 | Kopelman et al. |
| 2015/0320532 A1 | 11/2015 | Matty et al. |
| 2015/0325044 A1 | 11/2015 | Lebovitz |
| 2015/0338209 A1 | 11/2015 | Knüttel |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0022185 A1 | 1/2016 | Agarwal et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0067013 A1 | 3/2016 | Morton et al. |
| 2016/0081768 A1* | 3/2016 | Kopelman ............... A61C 7/10 433/6 |
| 2016/0081769 A1* | 3/2016 | Kimura .................. A61C 7/002 433/6 |
| 2016/0095668 A1 | 4/2016 | Kuo et al. |
| 2016/0100924 A1 | 4/2016 | Wilson et al. |
| 2016/0106520 A1 | 4/2016 | Borovinskih et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0163115 A1 | 6/2016 | Furst |
| 2016/0217708 A1 | 7/2016 | Levin et al. |
| 2016/0220105 A1 | 8/2016 | Durent |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0302885 A1 | 10/2016 | Matov et al. |
| 2016/0328843 A1 | 11/2016 | Graham et al. |
| 2016/0338799 A1 | 11/2016 | Wu et al. |
| 2016/0346063 A1 | 12/2016 | Schulhof et al. |
| 2016/0367188 A1 | 12/2016 | Malik et al. |
| 2016/0367339 A1 | 12/2016 | Khardekar et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0020633 A1 | 1/2017 | Stone-Collonge et al. |
| 2017/0049326 A1 | 2/2017 | Alfano et al. |
| 2017/0056131 A1 | 3/2017 | Alauddin et al. |
| 2017/0071705 A1 | 3/2017 | Kuo |
| 2017/0079747 A1* | 3/2017 | Graf ...................... A61C 7/002 |
| 2017/0086943 A1 | 3/2017 | Mah |
| 2017/0100209 A1 | 4/2017 | Wen |
| 2017/0100212 A1 | 4/2017 | Sherwood et al. |
| 2017/0100213 A1 | 4/2017 | Kuo |
| 2017/0100214 A1 | 4/2017 | Wen |
| 2017/0105815 A1 | 4/2017 | Matov et al. |
| 2017/0135792 A1 | 5/2017 | Webber |
| 2017/0135793 A1 | 5/2017 | Webber et al. |
| 2017/0156821 A1 | 6/2017 | Kopelman et al. |
| 2017/0165032 A1 | 6/2017 | Webber et al. |
| 2017/0215739 A1 | 8/2017 | Miyasato |

(56) References Cited

U.S. PATENT DOCUMENTS

| | | |
|---|---|---|
| 2017/0251954 A1 | 9/2017 | Lotan et al. |
| 2017/0258555 A1 | 9/2017 | Kopelman |
| 2017/0265970 A1 | 9/2017 | Verker |
| 2017/0319054 A1 | 11/2017 | Miller et al. |
| 2017/0319296 A1 | 11/2017 | Webber et al. |
| 2017/0325690 A1 | 11/2017 | Salah et al. |
| 2017/0340411 A1 | 11/2017 | Akselrod |
| 2017/0340415 A1 | 11/2017 | Choi et al. |
| 2018/0000563 A1 | 1/2018 | Shanjani et al. |
| 2018/0000565 A1 | 1/2018 | Shanjani et al. |
| 2018/0028064 A1 | 2/2018 | Elbaz et al. |
| 2018/0028065 A1 | 2/2018 | Elbaz et al. |
| 2018/0055602 A1 | 3/2018 | Kopelman et al. |
| 2018/0071054 A1 | 3/2018 | Ha |
| 2018/0071055 A1 | 3/2018 | Kuo |
| 2018/0085059 A1 | 3/2018 | Lee |
| 2018/0125610 A1 | 5/2018 | Carrier et al. |
| 2018/0153648 A1 | 6/2018 | Shanjani et al. |
| 2018/0153649 A1 | 6/2018 | Wu et al. |
| 2018/0153733 A1 | 6/2018 | Kuo |
| 2018/0168788 A1 | 6/2018 | Fernie |
| 2018/0192877 A1 | 7/2018 | Atiya et al. |
| 2018/0228359 A1 | 8/2018 | Meyer et al. |
| 2018/0280118 A1 | 10/2018 | Cramer |
| 2018/0280125 A1* | 10/2018 | Longley ............... A61C 7/10 |
| 2018/0284727 A1 | 10/2018 | Cramer et al. |
| 2018/0318042 A1 | 11/2018 | Baek et al. |
| 2018/0318043 A1 | 11/2018 | Li et al. |
| 2018/0353264 A1 | 12/2018 | Riley et al. |
| 2018/0360567 A1 | 12/2018 | Xue et al. |
| 2018/0368961 A1 | 12/2018 | Shanjani et al. |
| 2019/0019187 A1 | 1/2019 | Miller et al. |
| 2019/0021817 A1 | 1/2019 | Sato et al. |
| 2019/0026599 A1 | 1/2019 | Salah et al. |
| 2019/0029522 A1 | 1/2019 | Sato et al. |
| 2019/0029784 A1 | 1/2019 | Moalem et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |
| 2019/0076026 A1 | 3/2019 | Elbaz et al. |
| 2019/0076214 A1 | 3/2019 | Nyukhtikov et al. |
| 2019/0076216 A1 | 3/2019 | Moss et al. |
| 2019/0090983 A1 | 3/2019 | Webber et al. |
| 2019/0095539 A1 | 3/2019 | Elbaz et al. |
| 2019/0099129 A1 | 4/2019 | Kopelman et al. |
| 2019/0105130 A1 | 4/2019 | Grove et al. |
| 2019/0125494 A1 | 5/2019 | Li et al. |
| 2019/0314119 A1 | 10/2019 | Kopelman et al. |
| 2020/0046463 A1 | 2/2020 | Kimura et al. |
| 2021/0068926 A1 | 3/2021 | Wu et al. |

FOREIGN PATENT DOCUMENTS

| | | |
|---|---|---|
| CA | 1121955 A1 | 4/1982 |
| CN | 1655732 A | 8/2005 |
| CN | 1655733 A | 8/2005 |
| CN | 201101586 Y | 8/2008 |
| CN | 101426449 A | 5/2009 |
| CN | 101677842 A | 3/2010 |
| CN | 102017658 A | 4/2011 |
| CN | 103889364 A | 6/2014 |
| CN | 104000662 A | 8/2014 |
| CN | 204092220 | 1/2015 |
| CN | 104379087 A | 2/2015 |
| CN | 105266907 A | 1/2016 |
| CN | 105496575 A | 4/2016 |
| CN | 105997274 A | 10/2016 |
| CN | 106667594 A | 5/2017 |
| DE | 2749802 A1 | 5/1978 |
| DE | 3526198 A1 | 2/1986 |
| DE | 4207169 A1 | 9/1993 |
| DE | 69327661 T2 | 7/2000 |
| DE | 102005043627 A1 | 3/2007 |
| DE | 102009023357 A1 | 12/2010 |
| DE | 202010017014 U1 | 3/2011 |
| DE | 102011051443 A1 | 1/2013 |
| DE | 202012011899 U1 | 1/2013 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |
| EP | 2211753 A1 | 8/2010 |
| EP | 2437027 A2 | 4/2012 |
| EP | 2447754 A1 | 5/2012 |
| EP | 1989764 B1 | 7/2012 |
| EP | 2332221 B1 | 11/2012 |
| EP | 2596553 B1 | 12/2013 |
| EP | 2612300 B1 | 2/2015 |
| EP | 2848229 A1 | 3/2015 |
| ES | 463897 A1 | 1/1980 |
| ES | 2455066 A1 | 4/2014 |
| FR | 2369828 A1 | 6/1978 |
| FR | 2867377 A1 | 9/2005 |
| FR | 2930334 A1 | 10/2009 |
| GB | 1550777 A | 8/1979 |
| JP | 53-058191 A | 5/1978 |
| JP | 04-028359 A | 1/1992 |
| JP | 08-508174 A | 9/1996 |
| JP | 09-19443 A | 1/1997 |
| JP | 2003245289 A | 9/2003 |
| JP | 2000339468 A | 9/2004 |
| JP | 2005527320 A | 9/2005 |
| JP | 2005527321 A | 9/2005 |
| JP | 2006043121 A | 2/2006 |
| JP | 2007151614 A | 6/2007 |
| JP | 2007260158 A | 10/2007 |
| JP | 2007537824 A | 12/2007 |
| JP | 2008067732 A | 3/2008 |
| JP | 2008523370 A | 7/2008 |
| JP | 04184427 B1 | 11/2008 |
| JP | 2009000412 A | 1/2009 |
| JP | 2009018173 A | 1/2009 |
| JP | 2009078133 A | 4/2009 |
| JP | 2009101386 A | 5/2009 |
| JP | 2009205330 A | 9/2009 |
| JP | 2010017726 A | 1/2010 |
| JP | 2011087733 A | 5/2011 |
| JP | 2012045143 A | 3/2012 |
| JP | 2013007645 A | 1/2013 |
| JP | 2013192865 A | 9/2013 |
| JP | 201735173 A | 2/2017 |
| KR | 10-20020062793 A | 7/2002 |
| KR | 10-20070108019 A | 11/2007 |
| KR | 10-20090065778 A | 6/2009 |
| KR | 10-1266966 B1 | 5/2013 |
| KR | 10-2016-041632 A | 4/2016 |
| KR | 10-2016-0071127 A | 6/2016 |
| KR | 10-1675089 B1 | 11/2016 |
| KR | 20160133921 A | 11/2016 |
| TW | 480166 B | 3/2002 |
| WO | WO91/004713 A1 | 4/1991 |
| WO | WO92/03102 A1 | 3/1992 |
| WO | WO94/010935 A1 | 5/1994 |
| WO | 9623452 | 8/1996 |
| WO | WO98/032394 A1 | 7/1998 |
| WO | WO98/044865 A1 | 10/1998 |
| WO | WO01/08592 A1 | 2/2001 |
| WO | 0180762 A2 | 11/2001 |
| WO | WO01/85047 A2 | 11/2001 |
| WO | WO02/017776 A2 | 3/2002 |
| WO | WO02/062252 A1 | 8/2002 |
| WO | WO02/095475 A1 | 11/2002 |
| WO | WO03/003932 A | 1/2003 |
| WO | WO2006/096558 A2 | 9/2006 |
| WO | WO2006/100700 A1 | 9/2006 |
| WO | WO2006/133548 A1 | 12/2006 |
| WO | WO2007/019709 A2 | 2/2007 |
| WO | WO2007/071341 A1 | 6/2007 |
| WO | WO2007/103377 A2 | 9/2007 |
| WO | WO2008/115654 A1 | 9/2008 |

(56) References Cited

FOREIGN PATENT DOCUMENTS

| | | |
|---|---|---|
| WO | WO2009/016645 A2 | 2/2009 |
| WO | WO2009/085752 A2 | 7/2009 |
| WO | WO2009/089129 A1 | 7/2009 |
| WO | WO2009/146788 A1 | 12/2009 |
| WO | WO2009/146789 A1 | 12/2009 |
| WO | WO2010/059988 A1 | 5/2010 |
| WO | WO2010/123892 A2 | 10/2010 |
| WO | WO2012/007003 A1 | 1/2012 |
| WO | 2012042547 A1 | 4/2012 |
| WO | WO2012/064684 A2 | 5/2012 |
| WO | WO2012/074304 A2 | 6/2012 |
| WO | WO2012/078980 A2 | 6/2012 |
| WO | WO2012/083968 A1 | 6/2012 |
| WO | WO2012/140021 A2 | 10/2012 |
| WO | WO2013/058879 A2 | 4/2013 |
| WO | WO2014/068107 A1 | 5/2014 |
| WO | WO2014/091865 A1 | 6/2014 |
| WO | WO2014/143911 A1 | 9/2014 |
| WO | WO2015/015289 A2 | 2/2015 |
| WO | WO2015/063032 A1 | 5/2015 |
| WO | WO2015/112638 A1 | 7/2015 |
| WO | WO2015/176004 A1 | 11/2015 |
| WO | WO2016/004415 A1 | 1/2016 |
| WO | WO2016/028106 A1 | 2/2016 |
| WO | WO2016/042393 A1 | 3/2016 |
| WO | WO2016/061279 A1 | 4/2016 |
| WO | WO2016/084066 A1 | 6/2016 |
| WO | WO2016/099471 A1 | 6/2016 |
| WO | WO2016/113745 A1 | 7/2016 |
| WO | WO2016/116874 A1 | 7/2016 |
| WO | WO2016/200177 A1 | 12/2016 |
| WO | WO2017/006176 A1 | 1/2017 |
| WO | WO2017/182654 A1 | 10/2017 |
| WO | WO2018/057547 A1 | 3/2018 |
| WO | WO2018/085718 A2 | 5/2018 |
| WO | WO2018/232113 A1 | 12/2018 |
| WO | WO2019/018784 A1 | 1/2019 |

OTHER PUBLICATIONS

Invitation to Pay Additional Fees and Partial Search Report from related PCT Application No. US2017/064340, dated Feb. 26, 2018, 13 pages.

Bernabe et al.; Are the lower incisors the best predictors for the unerupted canine and premolars sums? An analysis of peruvian sample; The Angle Orthodontist; 75(2); pp. 202-207; Mar. 2005.

Collins English Dictionary; Teeth (definition); 9 pages; retrieved from the internet (https:www.collinsdictionary.com/us/dictionary/english/teeth) on May 13, 2019.

Dental Monitoring; Basics: How to put the cheek retractor?; 1 page (Screenshot); retrieved from the interenet (https://www.youtube.com/watch?v=6K1HXw4Kq3c); May 27, 2016.

Dental Monitoring; Dental monitoring tutorial; 1 page (Screenshot); retrieved from the internet (https:www.youtube.com/watch?v=Dbe3udOf9_c); Mar. 18, 2015.

dictionary.com; Plural (definition); 6 pages; retrieved from the internet ( https://www.dictionary.com/browse/plural#) on May 13, 2019.

dictionary.com; Quadrant (definition); 6 pages; retrieved from the internet ( https://www.dictionary.com/browse/quadrant?s=t) on May 13, 2019.

Ecligner Selfie; Change your smile; 1 page (screenshot); retrieved from the internet (https:play.google.com/store/apps/details?id=parklict.ecligner); on Feb. 13, 2018.

Martinelli et al.; Prediction of lower permanent canine and premolars width by correlation methods; The Angle Orthodontist; 75(5); pp. 805-808; Sep. 2005.

Nourallah et al.; New regression equations for prediciting the size of unerupted canines and premolars in a contemporary population; The Angle Orthodontist; 72(3); pp. 216-221; Jun. 2002.

Paredes et al.; A new, accurate and fast digital method to predict unerupted tooth size; The Angle Orthodontist; 76(1); pp. 14-19; Jan. 2006.

Sobral De Agular et al.; The gingival crevicular fluid as a source of biomarkers to enhance efficiency of orthodontic and functional treatment of growing patients; Bio. Med. Research International; vol. 2017; pp. 1-7; Article ID 3257235; (year of pub. sufficiently earlier than effective US filing date and any foreign priority date) 2017.

Levin; U.S. Appl. No. 16/282,431 entitled "Estimating a surface texture of a tooth," filed Feb. 2, 2019.

Chen et al.; U.S. Appl. No. 16/223,019 entitled "Release agent receptacle," filed Dec. 17, 2018.

International Search Report and Written Opinion from related PCT Application No. PCT/US2017/064340, dated May 24, 2018 (17 pages).

AADR. American Association for Dental Research; Summary of Activities; Los Angeles, CA; p. 195; March 20-23,(year of pub. sufficiently earlier than effective US filing date and any foreign priority date) 1980.

Alcaniz et al.; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.

Alexander et al.; The DigiGraph Work Station Part 2 Clinical Management; J. Clin. Orthod.; pp. 402-407; (Author Manuscript); Jul. 1990.

Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.

Allesee Orthodontic Appliance: Important Tip About Wearing the Red White & Blue Active Clear Retainer System; Allesee Orthodontic Appliances—Pro Lab; 1 page; (year of pub. sufficiently earlier than effective US filing date and any foreign priority date); 1998.

Allesee Orthodontic Appliances: DuraClearTM; Product information; 1 page; (year of pub. sufficiently earlier than effective US filing date and any foreign priority date) 1997.

Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.

Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.

Allesee Orthodontic Appliances; The Choice is Clear: Red, White & Blue . . . The Simple, Affordable, No-Braces Treatment;(Patient Information); retrieved from the internet (http://ormco.com/aoa/appliancesservices/RWB/patients.html); 2 pages on May 19, 2003.

Allesee Orthodontic Appliances; The Red, White & Blue Way to Improve Your Smile; (information for patients), 2 pages; (year of pub. sufficiently earlier than effective US filing date and any foreign priority date) 1992.

Allesee Orthodontic Appliances; You may be a candidate for this invisible no-braces treatment; product information for patients; 2 pages; (year of pub. sufficiently earlier than effective US filing date and any foreign priority date) 2002.

Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.

Altschuler et al.; Laser Electro-Optic System for Rapid Three-Dimensional (3D) Topographic Mapping of Surfaces; Optical Engineering; 20(6); pp. 953-961; Dec. 1981.

(56) References Cited

OTHER PUBLICATIONS

Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.
Altschuler; 3D Mapping of Maxillo-Facial Prosthesis; AADR Abstract #607; 2 pages total, (year of pub. sufficiently earlier than effective US filing date and any foreign priority date) 1980.
Alves et al.; New trends in food allergens detection: toward biosensing strategies; Critical Reviews in Food Science and Nutrition; 56(14); pp. 2304-2319; doi: 10.1080/10408398.2013.831026; Oct. 2016.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub. sufficiently earlier than effective US filing date and any foreign priority date) 1989.
Arakawa et al; Mouthguard biosensor with telemetry system for monitoring of saliva glucose: A novel cavitas sensor; Biosensors and Bioelectronics; 84; pp. 106-111; Oct. 2016.
Bandodkar et al.; All-printed magnetically self-healing electrochemical devices; Science Advances; 2(11); 11 pages; e1601465; Nov. 2016.
Bandodkar et al.; Self-healing inks for autonomous repair of printable electrochemical devices; Advanced Electronic Materials; 1(12); 5 pages; 1500289; Dec. 2015.
Bandodkar et al.; Wearable biofuel cells: a review; Electroanalysis; 28(6); pp. 1188-1200; Jun. 2016.
Bandodkar et al.; Wearable chemical sensors: present challenges and future prospects; Acs Sensors; 1(5); pp. 464-482; May 11, 2016.
Barone et al.; Creation of 3D multi-body orthodontic models by using independent imaging sensors; Sensors; 13(2); pp. 2033-2050; Feb. 5, 2013.
Bartels et al.; An Introduction to Splines for Use in Computer Graphics and Geometric Modeling; Morgan Kaufmann Publishers; pp. 422-425 Jan. 1, 1987.
Baumrind et al, "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.
Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.
Baumrind; Integrated Three-Dimensional Craniofacial Mapping: Background, Principles, and Perspectives; Seminars in Orthodontics; 7(4); pp. 223-232; Dec. 2001.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Begole et al.; A Computer System for the Analysis of Dental Casts; The Angle Orthodontist; 51(3); pp. 252-258; Jul. 1981.
Berland; The use of smile libraries for cosmetic dentistry; Dental Tribunne: Asia pacfic Edition; pp. 16-18; Mar. 29, 2006.
Bernard et al; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988.
Bhatia et al.; A Computer-Aided Design for Orthognathic Surgery; British Journal of Oral and Maxillofacial Surgery; 22(4); pp. 237-253; Aug. 1, 1984.

Biggerstaff et al.; Computerized Analysis of Occlusion in the Postcanine Dentition; American Journal of Orthodontics; 61(3); pp. 245-254; Mar. 1972.
Biggerstaff; Computerized Diagnostic Setups and Simulations; Angle Orthodontist; 40(I); pp. 28-36; Jan. 1970.
Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.
Blu et al.; Linear interpolation revitalized; IEEE Transactions on Image Processing; 13(5); pp. 710-719; May 2004.
Bookstein; Principal warps: Thin-plate splines and decomposition of deformations; IEEE Transactions on pattern analysis and machine intelligence; 11(6); pp. 567-585; Jun. 1989.
Bourke, Coordinate System Transformation; 1 page; retrived from the internet (http://astronomy.swin.edu.au/' pbourke/prolection/coords) on Nov. 5, 2004; Jun. 1996.
Boyd et al.; Three Dimensional Diagnosis and Orthodontic Treatment of Complex Malocclusions With the Invisalipn Appliance; Seminars in Orthodontics; 7(4); pp. 274-293; Dec. 2001.
Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.
Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.
Burstone et al.; Precision Adjustment of the Transpalatal Lingual Arch: Computer Arch Form Predetermination; American Journal of Orthodontics; 79(2);pp. 115-133; Feb. 1981.
Burstone; Dr. Charles J. Burstone on The Uses of the Computer in Orthodontic Practice (Part 1); Journal of Clinical Orthodontics; 13(7); pp. 442-453; (interview); Jul. 1979.
Burstone; Dr. Charles J. Burstone on The Uses of the Computer in Orthodontic Practice (Part 2); journal of Clinical Orthodontics; 13(8); pp. 539-551 (interview); Aug. 1979.
Cadent Inc.; OrthoCAD ABO user guide; 38 pages; Dec. 21, 2005.
Cadent Inc.; Reviewing and modifying an orthoCAD case; 4 pages; Feb. 14, 2005.
Cardinal Industrial Finishes; Powder Coatings; 6 pages; retrieved from the internet (http://www.cardinalpaint.com) on Aug. 25, 2000,.
Carnaghan, An Alternative to Holograms for the Portrayal of Human Teeth; 4th Int'l. Conf. on Holographic Systems, Components and Applications; pp. 228-231; Sep. 15, 1993.
Chaconas et al,; The DigiGraph Work Station, Part 1, Basic Concepts; Journal of Clinical Orthodontics; 24(6); pp. 360-367; (Author Manuscript); Jun. 1990.
Chafetz et al.; Subsidence of the Femoral Prosthesis, A Stereophotogrammetric Evaluation; Clinical Orthopaedics and Related Research; No. 201; pp. 60-67; Dec. 1985.
Chiappone; Constructing the Gnathologic Setup and Positioner; Journal of Clinical Orthodontics; 14(2); pp. 121-133; Feb. 1980.
Chishti et al.; U.S. Appl. No. 60/050,342 entitled "Procedure for moving teeth using a seires of retainers," filed Jun. 20, 1997.
Cottingham; Gnathologic Clear Plastic Positioner; American Journal of Orthodontics; 55(1); pp. 23-31; Jan. 1969.
Crawford; CAD/CAM in the Dental Office: Does It Work?; Canadian Dental Journal; 57(2); pp. 121-123 Feb. 1991.
Crawford; Computers in Dentistry: Part 1: CAD/CAM: The Computer Moves Chairside, Part 2: F. Duret A Man With A Vision, Part 3: The Computer Gives New Vision—Literally, Part 4: Bytes 'N Bites The Computer Moves From The Front Desk To The Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.

(56) References Cited

OTHER PUBLICATIONS

Cureton; Correcting Malaligned Mandibular Incisors with Removable Retainers; Journal of Clinical Orthodontics; 30(7); pp. 390-395; Jul. 1996.

Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.

Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.

Daniels et al.; The development of the index of complexity outcome and need (ICON); British Journal of Orthodontics; 27(2); pp. 149-162; Jun. 2000.

DCS Dental AG; The CAD/CAM 'DCS Titan System' for Production of Crowns/Bridges; DSC Production; pp. 1-7; Jan. 1992.

Defranco et al.; Three-Dimensional Large Displacement Analysis of Orthodontic Appliances; Journal of Biomechanics; 9(12); pp. 793-801; Jan. 1976.

Dental Institute University of Zurich Switzerland; Program for International Symposium on Computer Restorations: State of the Art of the CEREC-Method; 2 pages; May 1991.

Dentrac Corporation; Dentrac document; pp. 4-13; (year of pub. sufficiently earlier than effective US filing date and any foreign priority date) 1992.

Dentrix; Dentrix G3, new features; 2 pages; retrieved from the internet (http://www.dentrix.com/g3/new_features/index.asp); on Jun. 6, 2008.

Dent-X; Dentsim . . . Dent-x's virtual reality 3-D training simulator . . . A revolution in dental education; 6 pages; retrieved from the internet (http://www.dent-x.com/DentSim.htm); on Sep. 24, 1998.

Dicom to surgical guides; (Screenshot)1 page; retrieved from the internet at YouTube (https://youtu.be/47KtOmCEFQk); Published Apr. 4, 2016.

Di Giacomo et al.; Clinical application of sterolithographic surgical guides for implant placement: Preliminary results; Journal Periodontolgy; 76(4); pp. 503-507; Apr. 2005.

Di Muzio et al.; Minimum intensity projection (MinIP); 6 pages; retrieved from the internet (https://radiopaedia.org/articles/minimum-intensity-projection-minip) on Sep. 6, 2018.

Doruk et al.; The role of the headgear timer in extraoral co-operation; European Journal of Orthodontics; 26; pp. 289-291; Jun. 1, 2004.

Doyle; Digital Dentistry; Computer Graphics World; pp. 50-52 andp. 54; Oct. 2000.

Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.

Duret et al.; CAD/CAM Imaging in Dentistry; Current Opinion in Dentistry; 1(2); pp. 150-154; Apr. 1991.

Duret et al; CAD-CAM in Dentistry; Journal of the American Dental Association; 117(6); pp. 715-720; Nov. 1988.

Duret; The Dental CAD/CAM, General Description of the Project; Hennson International Product Brochure, 18 pages; Jan. 1986.

Duret; Vers Une Prosthese Informatisee; Tonus; 75(15); pp. 55-57; (English translation attached); 23 pages; Nov. 15, 1985.

Economides; The Microcomputer in the Orthodontic Office; Journal of Clinical Orthodontics; 13(11); pp. 767-772; Nov. 1979.

Ellias et al.; Proteomic analysis of saliva identifies potential biomarkers for orthodontic tooth movement; The Scientific World Journal; vol. 2012; Article ID 647240; dio:10.1100/2012/647240; 7 pages; Jul. 2012.

Elsasser; Some Observations on the History and Uses of the Kesling Positioner; American Journal of Orthodontics; 36(5); pp. 368-374; May 1, 1950.

English translation of Japanese Laid-Open Publication No. 63-11148 to inventor T. Ozukuri (Laid-Open on Jan. 18, 1998) pp. 1-7.

Faber et al.; Computerized Interactive Orthodontic Treatment Planning; American Journal of Orthodontics; 73(1); pp. 36-46; Jan. 1978.

Farooq et al.; Relationship between tooth dimensions and malocclusion; JPMA: The Journal of the Pakistan Medical Association; 64(6); pp. 670-674; Jun. 2014.

Felton et al.; A Computerized Analysis of the Shape and Stability of Mandibular Arch Form; American Journal of Orthodontics and Dentofacial Orthopedics; 92(6); pp. 478-483; Dec. 1987.

Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.

Friede et al.; Accuracy of Cephalometric Prediction in Orthognathic Surgery; Journal of Oral and Maxillofacial Surgery; 45(9); pp. 754-760; Sep. 1987.

Friedrich et al; Measuring system for in vivo recording of force systems in orthodontic treatment-concept and analysis of accuracy; J. Biomech.; 32(1); pp. 81-85; (Abstract Only) Jan. 1999.

Futterling et al.; Automated Finite Element Modeling of a Human Mandible with Dental Implants; JS WSCG '98—Conference Program; 8 pages; retrieved from the Internet (https://dspace5.zcu.cz/bitstream/11025/15851/1/Strasser_98.pdf); on Aug. 21, 2018.

Gansky; Dental data mining: potential pitfalls and practical issues; Advances in Dental Research; 17(1); pp. 109-114; Dec. 2003.

Gao et al.; 3-D element Generation for Multi-Connected Complex Dental and Mandibular Structure; IEEE Proceedings International Workshop in Medical Imaging and Augmented Reality; pp. 267-271; Jun. 12, 2001.

Geomagic; Dental reconstruction; 1 page; retrieved from the internet (http://geomagic.com/en/solutions/industry/detal_desc.php) on Jun. 6, 2008.

Gim-Alldent Deutschland, "Das DUX System: Die Technik," 3 pages; (English Translation Included); (year of pub. sufficiently earlier than effective US filing date and any foreign priority date); 2002.

Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982 &Month=06&ArticleNum+); 21 pages; Jun. 1982.

Gottschalk et al.; OBBTree: A hierarchical structure for rapid interference detection; 12 pages; (http://www.cs.unc.edu/?geom/OBB/OBBT.html); relieved from te internet (https://www.cse.iitk.ac.in/users/amit/courses/RMP/presentations/dslamba/presentation/sig96.pdf) on Apr. 25, 2019.

gpsdentaire.com; Get a realistic smile simulation in 4 steps with GPS; a smile management software; 10 pages; retrieved from the internet (http://www.gpsdentaire.com/en/preview/) on Jun. 6, 2008.

Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.

Grest, Daniel; Marker-Free Human Motion Capture in Dynamic Cluttered Environments from a Single View-Point, PhD Thesis; 171 pages; Dec. 2007.

Guess et al.; Computer Treatment Estimates In Orthodontics and Orthognathic Surgery; Journal of Clinical Orthodontics; 23(4); pp. 262-268; 11 pages; (Author Manuscript); Apr. 1989.

Heaven et al.; Computer-Based Image Analysis of Artificial Root Surface Caries; Abstracts of Papers #2094; Journal of Dental Research; 70:528; (Abstract Only); Apr. 17-21, 1991.

Highbeam Research; Simulating stress put on jaw. (ANSYS Inc.'s finite element analysis software); 2 pages; retrieved from the Internet (http://static.highbeam.eom/t/toolingampproduction/november011996/simulatingstressputonfa . . . ); on Nov. 5, 2004.

Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.

(56) References Cited

OTHER PUBLICATIONS

Hoffmann et al.; Role of Cephalometry for Planning of Jaw Orthopedics and Jaw Surgery Procedures; Informatbnen, pp. 375-396; (English Abstract Included); Mar. 1991.

Hojjatie et al.; Three-Dimensional Finite Element Analysis of Glass-Ceramic Dental Crowns; Journal of Biomechanics; 23(11); pp. 1157-1166; Jan. 1990.

Huckins; CAD-CAM Generated Mandibular Model Prototype from MRI Data; AAOMS, p. 96; (Abstract Only); (year of pub. sufficiently earlier than effective US filing date and any foreign priority date) 1999.

Imani et al.; A wearable chemical-electrophysiological hybrid biosensing system for real-time health and fitness monitoring; Nature Communications; 7; 11650. doi 1038/ncomms11650; 7 pages; May 23, 2016.

Invisalign; You were made to move. There's never been a better time to straighten your teeth with the most advanced clear aligner in the world; Product webpage; 2 pages; retrieved from the internet (www.invisalign.com/) on Dec. 28, 2017.

JCO Interviews; Craig Andreiko, DDS, MS on the Elan and Orthos Systems; Interview by Dr. Larry W. White; Journal of Clinical Orthodontics; 28(8); pp. 459-468; 14 pages; (Author Manuscript); Aug. 1994.

JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.

Jeerapan et al.; Stretchable biofuel cells as wearable textile-based self-powered sensors; Journal of Materials Chemistry A; 4(47); pp. 18342-18353; Dec. 21, 2016.

Jerrold; The Problem, Electronic Data Transmission and the Law; American Journal of Orthodontics and Dentofacial Orthopedics; 113(4); pp. 478-479; 5 pages; (Author Manuscript); Apr. 1998.

Jia et al.; Epidermal biofuel cells: energy harvesting from human perspiration; Angewandle Chemie International Edition; 52(28); pp. 7233-7236; Jul. 8, 2013.

Jia et al.; Wearable textile biofuel cells for powering electronics; Journal of Materials Chemistry A; 2(43); pp. 18184-18189; Oct. 14, 2014.

Jones et al.; An Assessment of the Fit of a Parabolic Curve to Pre- and Post-Treatment Dental Arches; British Journal of Orthodontics; 16(2); pp. 85-93; May 1989.

Kamada et.al.; Case Reports On Tooth Positioners Using LTV Vinyl Silicone Rubber; J. Nihon University School of Dentistry; 26(1); pp. 11-29; (year of pub. sufficiently earlier than effective US filing date and any foreign priority date) 1984.

Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.

Kanazawa et al.; Three-Dimensional Measurements of the Occlusal Surfaces of Upper Molars in a Dutch Population; Journal of Dental Research; 63(11); pp. 1298-1301; Nov. 1984.

Karaman et al.; A practical method of fabricating a lingual retainer; Am. Journal of Orthodontic and Dentofacial Orthopedics; 124(3); pp. 327-330; Sep. 2003.

Kesling et al.; The Philosophy of the Tooth Positioning Appliance; American Journal of Orthodontics and Oral surgery; 31(6); pp. 297-304; Jun. 1945.

Kesling; Coordinating the Predetermined Pattern and Tooth Positioner with Conventional Treatment; American Journal of Orthodontics and Oral Surgery; 32(5); pp. 285-293; May 1946.

Kim et al.; A wearable fingernail chemical sensing platform: pH sensing at your fingertips; Talanta; 150; pp. 622-628; Apr. 2016.

Kim et al.; Advanced materials for printed wearable electrochemical devices: A review; Advanced Electronic Materials; 3(1); 15 pages; 1600260; Jan. 2017.

Kim et al.; Noninvasive alcohol monitoring using a wearable tatto-based iontophoretic-biosensing system; Acs Sensors; 1(8); pp. 1011-1019; Jul. 22, 2016.

Kim et al.; Non-invasive mouthguard biosensor for continuous salivary monitoring of metabolites; Analyst; 139(7); pp. 1632-1636; Apr. 7, 2014.

Kim et al.; Wearable salivary uric acid mouthguard biosensor with integrated wireless electronics; Biosensors and Bioelectronics; 74; pp. 1061-1068; 19 pages; (Author Manuscript); Dec. 2015.

Kleeman et al.; The Speed Positioner; J. Clin. Orthod.; 30(12); pp. 673-680; Dec. 1996.

Kochanek; Interpolating Splines with Local Tension, Continuity and Bias Control; Computer Graphics; 18(3); pp. 33-41; Jan. 1, 1984.

Kumar et al.; All-printed, stretchable Zn—Ag2o rechargeable battery via, hyperelastic binder for self-powering wearable electronics; Advanced Energy Materials; 7(8); 8 pages; 1602096; Apr. 2017.

Kumar et al.; Biomarkers in orthodontic tooth movement; Journal of Pharmacy Bioallied Sciences; 7(Suppl 2); pp. S325-S330; 12 pages; (Author Manuscript); Aug. 2015.

Kumar et al.; Rapid maxillary expansion: A unique treatment modality in dentistry; J. Clin. Diagn. Res.; 5(4); pp. 906-911; Aug. 2011.

Kunii et al.; Articulation Simulation for an Intelligent Dental Care System; Displays; 15(3); pp. 181-188; Jul. 1994.

Kuroda et al.; Three-Dimensional Dental Cast Analyzing System Using Laser Scanning; American Journal of Orthodontics and Dentofacial Orthopedics; 110(4); pp. 365-369; Oct. 1996.

Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.

Leinfelder et al.; A New Method for Generating Ceramic Restorations: a CAD-CAM System; Journal of the American Dental Association; 118(6); pp. 703-707; Jun. 1989.

Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.

Mantzikos et al.; Case report: Forced eruption and implant site development; The Angle Orthodontist; 68(2); pp. 179-186; Apr. 1998.

Mccann; Inside the ADA; J. Amer. Dent. Assoc, 118:286-294; Mar. 1989.

Mcnamara et al.; Invisible Retainers; J. Clin Orthod.; pp. 570-578; 11 pages; (Author Manuscript); Aug. 1985.

Mcnamara et al.; Orthodontic and Orthopedic Treatment in the Mixed Dentition; Needham Press; pp. 347-353; Jan. 1993.

Methot; Get the picture with a gps for smile design in 3 steps; Spectrum; 5(4); pp. 100-105; (year of pub. sufficiently earlier than effective US filing date and any foreign priority date) 2006.

Moermann et al, Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.

Moles; Correcting Mild Malalignments—As Easy As One, Two, Three; AOA/Pro Corner; 11(2); 2 pages; (year of pub. sufficiently earlier than effective US filing date and any foreign priority date) 2002.

Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.

Nahoum; The Vacuum Formed Dental Contour Appliance; N. Y. State Dent. J.; 30(9); pp. 385-390; Nov. 1964.

Nash; CEREC CAD/CAM Inlays: Aesthetics and Durability in a Single Appointment; Dentistry Today; 9(8); pp. 20, 22-23 and 54; Oct. 1990.

Nedelcu et al.; "Scanning Accuracy and Precision in 4 Intraoral Scanners: An In Vitro Comparison Based on 3-Dimensional Analysis"; J. Prosthet. Dent.; 112(6); pp. 1461-1471; Dec. 2014.

Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.

(56) References Cited

OTHER PUBLICATIONS

Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.
Ogawa et al.; Mapping, profiling and clustering of pressure pain threshold (PPT) in edentulous oral muscosa; Journal of Dentistry; 32(3); pp. 219-228; Mar. 2004.
Ogimoto et al.; Pressure-pain threshold determination in the oral mucosa; Journal of Oral Rehabilitation; 29(7); pp. 620-626; Jul. 2002.
ormco.com; Increasing clinical performance with 3D interactive treatment planning and patient-specific appliances; 8 pages; retrieved from the internet (http://www.konsident.com/wp-content/files_mf/1295385693http_ormco.com_index_cmsfilesystemaction_fileOrmcoPDF_whitepapers.pdf) on Feb. 27, 2019.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Parrilla et al.; A textile-based stretchable multi-ion potentiometric sensor; Advanced Healthcare Materials; 5(9); pp. 996-1001; May 2016.
Patterson Dental; Cosmetic imaging; 2 pages retrieved from the internet (http://patterson.eaglesoft.net/cnt_di_cosimg.html) on Jun. 6, 2008.
Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.
Pinkham; Foolish Concept Propels Technology; Dentist, 3 pages , Jan./Feb. 1989.
Pinkham; Inventor's CAD/CAM May Transform Dentistry; Dentist; pp. 1 and 35, Sep. 1990.
Ponitz; Invisible retainers; Am. J. Orthod.; 59(3); pp. 266-272; Mar. 1971.
Procera Research Projects; Procera Research Projects 1993 Abstract Collection; 23 pages; (year of pub. sufficiently earlier than effective US filing date and any foreign priority date) 1993.
Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.
Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.
Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.
Redmond et al.; Clinical Implications of Digital Orthodontics; American Journal of Orthodontics and Dentofacial Orthopedics; 117(2); pp. 240-242; Feb. 2000.
Rekow et al.; CAD/CAM for Dental Restorations—Some of the Curious Challenges; IEEE Transactions on Biomedical Engineering; 38(4); pp. 314-318; Apr. 1991.
Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.
Rekow; A Review of the Developments in Dental CAD/CAM Systems; Current Opinion in Dentistry; 2; pp. 25-33; Jun. 1992.
Rekow; CAD/CAM in Dentistry: A Historical Perspective and View of the Future; Journal Canadian Dental Association; 58(4); pp. 283, 287-288; Apr. 1992.
Rekow; Computer-Aided Design and Manufacturing in Dentistry: A Review of the State of the Art; Journal of Prosthetic Dentistry; 58(4); pp. 512-516; Dec. 1987.
Rekow; Dental CAD-CAM Systems: What is the State of the Art?; The Journal of the American Dental Association; 122(12); pp. 43-48; Dec. 1991.
Rekow; Feasibility of an Automated System for Production of Dental Restorations, Ph.D. Thesis; Univ. of Minnesota, 250 pages, Nov. 1988.
Richmond et al.; The Development of the PAR Index (Peer Assessment Rating): Reliability and Validity.; The European Journal of Orthodontics; 14(2); pp. 125-139; Apr. 1992.
Richmond et al.; The Development of a 3D Cast Analysis System; British Journal of Orthodontics; 13(1); pp. 53-54; Jan. 1986.
Richmond; Recording The Dental Cast In Three Dimensions; American Journal of Orthodontics and Dentofacial Orthopedics; 92(3); pp. 199-206; Sep. 1987.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Rudge; Dental Arch Analysis: Arch Form, A Review of the Literature; The European Journal of Orthodontics; 3(4); pp. 279-284; Jan. 1981.
Sahm et al.; "Micro-Electronic Monitoring of Functional Appliance Wear"; Eur J Orthod.; 12(3); pp. 297-301; Aug. 1990.
Sahm; Presentation of a wear timer for the clarification of scientific questions in orthodontic orthopedics; Fortschritte der Kieferorthopadie; 51 (4); pp. 243-247; (Translation Included) Jul. 1990.
Sakuda et al.; Integrated Information-Processing System In Clinical Orthodontics: An Approach with Use of a Computer Network System; American Journal of Orthodontics and Dentofacial Orthopedics; 101(3); pp. 210-220; 20 pages; (Author Manuscript) Mar. 1992.
Sarment et al.; Accuracy of implant placement with a sterolithographic surgical guide; journal of Oral and Maxillofacial Implants; 118(4); pp. 571-577; Jul. 2003.
Schafer et al.; "Quantifying patient adherence during active orthodontic treatment with removable appliances using microelectronic wear-time documentation"; Eur J Orthod.; 37(1)pp. 1-8; doi:10.1093/ejo/cju012; Jul. 3, 2014.
Schellhas et al.; Three-Dimensional Computed Tomography in Maxillofacial Surgical Planning; Archives of Otolaryngology—Head and Neck Surgery; 114(4); pp. 438-442; Apr. 1988.
Schroeder et al; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.
Shilliday; Minimizing finishing problems with the mini-positioner; American Journal of Orthodontics; 59(6); pp. 596-599; Jun. 1971.
Shimada et al.; Application of optical coherence tomography (OCT) for diagnosis of caries, cracks, and defects of restorations; Current Oral Health Reports; 2(2); pp. 73-80; Jun. 2015.
Siemens; CEREC—Computer-Reconstruction, High Tech in der Zahnmedizin; 15 pagesl; (Includes Machine Translation); (year of pub. sufficiently earlier than effective US filing date and any foreign priority date); 2004.
Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.
Sirona Dental Systems GmbH, CEREC 3D, Manuel utiiisateur, Version 2.0X (in French); 114 pages; (English translation of table of contents included); (year of pub. sufficiently earlier than effective US filing date and any foreign priority date); 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.

(56) References Cited

OTHER PUBLICATIONS

Smile-Vision_The smile-vision cosmetic imaging system; 2 pages; retrieved from the internet (http://www.smile-vision.net/cos_imaging.php) on Jun. 6, 2008.
Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.
Sturman; Interactive Keyframe Animation of 3-D Articulated Models; Proceedings Graphics Interface '84; vol. 86; pp. 35-40; May-Jun. 1984.
Szeliski; Introduction to computer vision: Structure from motion; 64 pages; retrieved from the internet (http://robots.stanford.edu/cs223b05/notes/CS%20223-B%20L10%structurefrommotion1b.ppt, on Feb. 3, 2005.
The American Heritage, Stedman's Medical Dictionary; Gingiva; 3 pages; retrieved from the interent (http://reference.com/search/search?q=gingiva) on Nov. 5, 2004.
The Dental Company Sirona: Cerc omnicam and cerec bluecam brochure: The first choice in every case; 8 pages; (year of pub. sufficiently earlier than effective US filing date and any foreign priority date) 2014.
Thera Mon; "Microsensor"; 2 pages; retrieved from the internet (www.english.thera-mon.com/the-product/transponder/index.html); on Sep. 19, 2016.
Thorlabs; Pellin broca prisms; 1 page; retrieved from the internet (www.thorlabs.com); Nov. 30, 2012.
Tiziani et al.; Confocal principle for macro and microscopic surface and defect analysis; Optical Engineering; 39(1); pp. 32-39; Jan. 1, 2000.
Truax; Truax Clasp-Less(TM) Appliance System; The Functional Orthodontist; 9(5); pp. 22-24, 26-28; Sep.-Oct. 1992.
Tru-Tatn Orthodontic & Dental Supplies, Product Brochure, Rochester, Minnesota 55902, 16 pages; (year of pub. sufficiently earlier than effective US filing date and any foreign priority date) 1996.
U.S. Department of Commerce, National Technical Information Service, Holodontography: An Introduction to Dental Laser Holography; School of Aerospace Medicine Brooks AFB Tex; Mar. 1973, 40 pages; Mar. 1973.
U.S. Department of Commerce, National Technical Information Service; Automated Crown Replication Using Solid Photography SM; Solid Photography Inc., Melville NY,; 20 pages; Oct. 1977.
Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.
Van Der Linden et al.; Three-Dimensional Analysis of Dental Casts by Means of the Optocom; Journal of Dental Research; 51(4); p. 1100; Jul.-Aug. 1972.
Van Der Linden; A New Method to Determine Tooth Positions and Dental Arch Dimensions; Journal of Dental Research; 51(4); p. 1104; Jul.-Aug. 1972.
Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.
Van Hilsen et al.; Comparing potential early caries assessment methods for teledentistry; BMC Oral Health; 13(16); doi: 10.1186/1472-6831-13-16; 9 pages; Mar. 2013.
Varady et al.; Reverse Engineering of Geometric Models An Introduction; Computer-Aided Design; 29(4); pp. 255-268; 20 pages; (Author Manuscript); Apr. 1997.
Verstreken et al.; An Image-Guided Planning System for Endosseous Oral Implants; IEEE Transactions on Medical Imaging; 17(5); pp. 842-852; Oct. 1998.
Vevin et al.; Pose estimation of teeth through crown-shape matching; In Medical Imaging: Image Processing of International Society of Optics and Photonics; vol. 4684; pp. 955-965; May 9, 2002.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.
Warunek et.al.; Clinical Use of Silicone Elastomer Applicances; JCO; 23(10); pp. 694-700; Oct. 1989.
Watson et al.; Pressures recorded at te denture base-mucosal surface interface in complete denture wearers; Journal of Oral Rehabilitation 14(6); pp. 575-589; Nov. 1987.
Wells; Application of the Positioner Appliance in Orthodontic Treatment; American Journal of Orthodontics; 58(4); pp. 351-366; Oct. 1970.
Wiedmann; According to the laws of harmony to find the right tooth shape with assistance of the computer; Digital Dental News; 2nd vol.; pp. 0005-0008; (English Version Included); Apr. 2008.
Wikipedia; Palatal expansion; 3 pages; retrieved from the internet (https://en.wikipedia.org/wiki/Palatal_expansion) on Mar. 5, 2018.
Williams; Dentistry and CAD/CAM: Another French Revolution; J. Dent. Practice Admin.; 4(1); pp. 2-5 Jan./Mar. 1987.
Williams; The Switzerland and Minnesota Developments in CAD/CAM; Journal of Dental Practice Administration; 4(2); pp. 50-55; Apr./Jun. 1987.
Windmiller et al.; Wearable electrochemical sensors and biosensors: a review; Electroanalysis; 25(1); pp. 29-46; Jan. 2013.
Wireless Sensor Networks Magazine; Embedded Teeth for Oral Activity Recognition; 2 pages; retrieved on Sep. 19, 2016 from the internet (www.wsnmagazine.com/embedded-teeth/); Jul. 29, 2013.
Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.
Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.
Wolf; Three-dimensional structure determination of semi-transparent objects from holographic data; Optics Communications; 1(4); pp. 153-156; Sep. 1969.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yaltara Software; Visual planner; 1 page; retrieved from the internet (http://yaltara.com/vp/) on Jun. 6, 2008.
Yamada et al.; Simulation of fan-beam type optical computed-tomography imaging of strongly scattering and weakly absorbing media; Applied Optics; 32(25); pp. 4808-4814; Sep. 1, 1993.
Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.

(56) References Cited

OTHER PUBLICATIONS

Yoshii; Research on a New Orthodontic Appliance: The Dynamic Positioner (D.P.); III. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Zhang et al.; Visual speech features extraction for improved speech recognition; 2002 IEEE International conference on Acoustics, Speech and Signal Processing; vol. 2; 4 pages; May 13-17, 2002.
Zhou et al.; Biofuel cells for self-powered electrochemical biosensing and logic biosensing: A review; Electroanalysis; 24(2); pp. 197-209; Feb. 2012.
Zhou et al.; Bio-logic analysis of injury biomarker patterns in human serum samples; Talanta; 83(3); pp. 955-959; Jan. 15, 2011.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
O'Leary et al.; U.S. Appl. No. 16/195,701 entitled "Orthodontic retainers," filed Nov. 19, 2018.
Shanjani et al., U.S. Appl. No. 16/206,894 entitled "Sensors for monitoring oral appliances," filed Nov. 28, 2019.
Shanjani et al., U.S. Appl. No. 16/231,906 entitled "Augmented reality enhancements for dental practitioners." filed Dec. 24, 2018.
Kopleman et al., U.S. Appl. No. 16/220,381 entitled "Closed loop adaptive orthodontic treatment methods and apparatuses," filed Dec. 14, 2018.
Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.
Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.

\* cited by examiner

FORCE CONTROL, STOP MECHANISM, REGULATING STRUCTURE OF REMOVABLE ARCH ADJUSTMENT APPLIANCE

BACKGROUND

The present disclosure is related generally to the field of dental treatment. More particularly, the present disclosure is related to methods, systems, and devices for adjusting an arch of a patient.

Dental treatments may involve, for instance, restorative and/or orthodontic procedures. Restorative procedures may be designed to implant a dental prosthesis (e.g., a crown, bridge inlay, onlay, veneer, etc.) intraorally in a patient. Orthodontic procedures may include repositioning misaligned teeth and/or changing bite configurations for improved cosmetic appearance and/or dental function. Orthodontic repositioning can be accomplished, for example, by applying controlled forces to one or more teeth over a period of time.

As an example, orthodontic repositioning may be provided through a dental process that uses positioning appliances for realigning teeth. Such appliances may utilize a thin shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement.

Such systems typically utilize materials that are lightweight and/or transparent to provide a set of appliances that can be used serially such that as the teeth move, a new appliance can be implemented to further move the teeth toward the desired goal.

In some instances, the width of a dental arch of a patient's upper dentition can be insufficient (e.g., too narrow). A dental arch that is insufficient can result in malocclusions such as crossbite, crowding of teeth, impacted teeth, and/or the patient's smile may not be aesthetically pleasing in appearance. For instance, a patient's smile may be "narrow", resulting in a sunken appearance in the buccal corridors due to the inability to see the back teeth from the front view.

In certain types of front-to-back bite correction (e.g., Class II and Class III correction), a need for transverse width correction exists, without which the upper and lower arches may not be properly coordinated. For Class II correction, the upper needs to be expanded so that when the lower is advanced, the teeth in the buccal regions (typically the bicuspids and molars) are fitting together correctly in the buccal-lingual dimension. For Class III correction, the reverse is required, and the lower needs to be expanded since it is usually the one that has compensated for the Class III bite by constricting. When both Class II and Class III are corrected to a more ideal Class I bite, the respective compensations need to be undone, and a transverse width dimension of movement is necessary in addition to the anterior-to-posterior movement.

There are several ways in which the arch of a patient can be expanded. For example, palatal expansion expands the upper jaw of the patient by spreading the maxilla. In some situations, the teeth of the upper jaw can be moved or angled outward thereby expanding the width of the arch of the patient. This technique can be referred to as dental expansion.

In young patients, the midpalatal suture has not fused the left and right maxillary palates together and therefore, the movement of the plates with respect to each other can be accomplished more easily and with less force than in older patients. When the fusing of the suture is new, it may still be possible to split the suture apart.

For example, currently available orthodontic appliances can include a jackscrew and/or other mechanism that is employed to deliver a horizontal stretching force to the molar teeth to split the upper jaw of the patient along the midpalatal suture. Such a mechanism typically spreads the left and right maxillary plates of the palate apart and then new bone material grows in between to fill the gap. As such, a large horizontal force (e.g., 10 to 50 Newtons (N) with cumulative loads reaching 40 to 150 N across the suture) is applied during a short period, in many cases. The insertion of such a mechanism is typically accomplished by a treatment professional and can cause discomfort and/or pain for a patient.

In some instances, the screw and/or other mechanism can be employed incrementally one or more times a day (e.g., 0.25 mm expansion twice a day—one activation in the morning and once at night). For example, a pinhole can be present in the orthodontic appliance and a patient can insert an activation key into the pinhole to incrementally increase a distance between portions of the orthodontic appliance.

Such orthodontic appliances can be difficult for a patient to use, and often require assistance from another person (e.g., a parent) to turn the key. Not only are such appliances often not aesthetically pleasing, they often times interfere with the patient's speech, temporarily affect their ability to chew and/or swallow, and/or can be painful when activated.

Adding to the challenges of such an appliance is the need to retain the expansion while the bone is filling into the suture, long after the active expansion has taken place. The active expansion process may be completed within 2 or 3 weeks' time, but the retention period can last around 6 months while waiting for the gap between the maxillary halves to fill in with new bony tissue.

DETAILED DESCRIPTION

Figure 1:
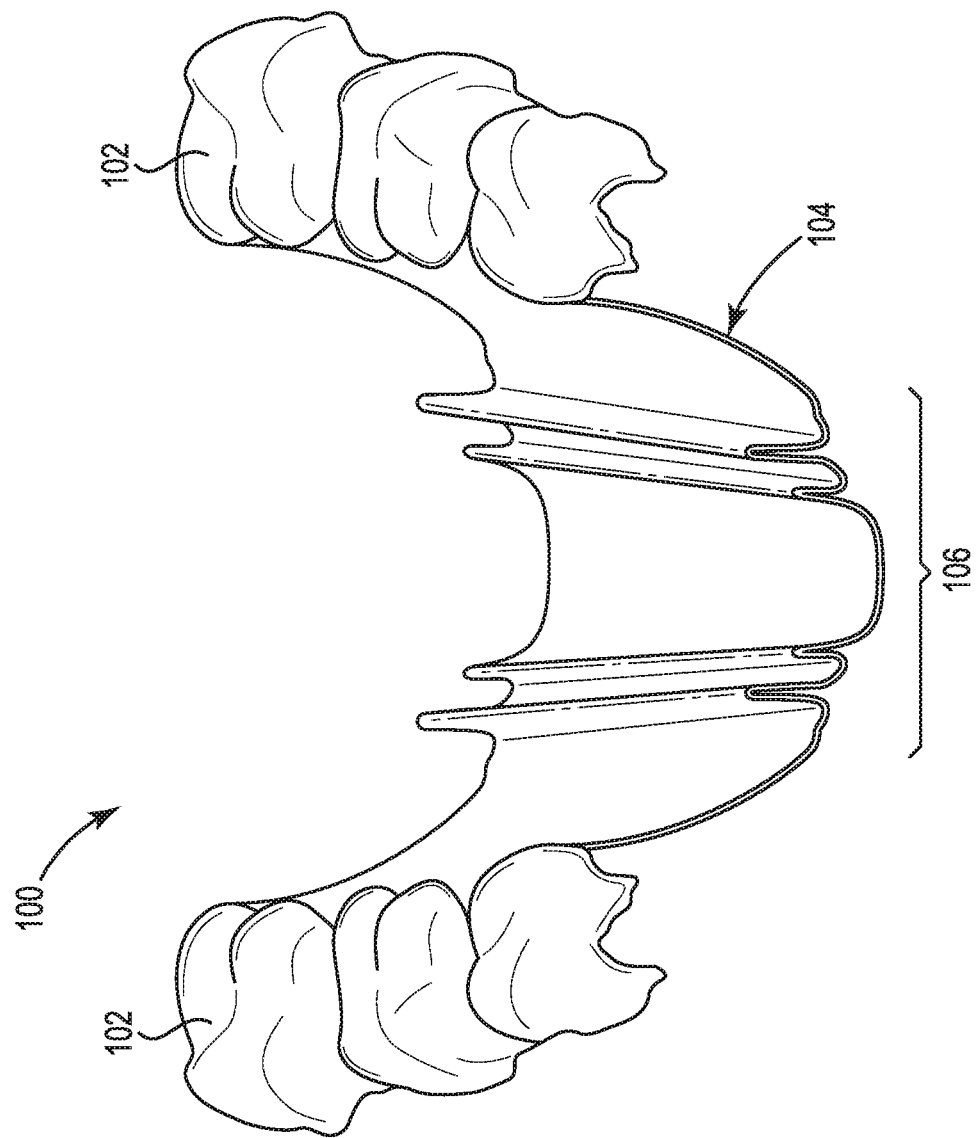
FIG. 1 illustrates an example of a removable arch adjustment appliance having a transpalatal element that includes a number of flexing elements according to a number of embodiments of the present disclosure.

As discussed above, the present disclosure provides methods, systems, and devices for expanding an arch of a patient. As used herein, expanding a dental arch can include dental and/or skeletal expansion and is inclusive of both dental arch expansion and palatal expansion. Such expansion can be part of an orthodontic treatment, which is a process of moving and reorienting teeth for functional and/or aesthetic purposes, although expansion can be provided for other purposes. The expansion of the dental arch can include movement of posterior teeth (e.g., molars) and/or other teeth of the dental arch in a transverse direction and/or stretching of the maxillary suture of the patient (e.g., separating the maxillary halves in the region of the suture), along with a stretching of the surrounding soft tissues (e.g., the palatal gingiva) during the expansion. A transverse direction in this context is outward along the arch.

Some orthodontic treatment plans can include a dental arch expansion process. Such a process typically occurs in an early stage of the plan in order to provide more room for the teeth to be arranged. A narrow dental arch can prevent the anterior-posterior bite relationship from being corrected properly during orthodontic treatment. A dental arch, as used herein, can include a curved row of teeth on a particular jaw of a patient. An insufficient dental arch can include a dental arch that has a width too narrow to support the row of teeth in a correct alignment.

A narrow arch can also prevent the anterior-posterior bite relationship from being corrected properly. An arch of teeth, as used herein, can include a curved row of teeth on a particular jaw of a patient. An insufficient arch can include an arch that has a width too narrow to support the row of teeth in a correct alignment, for instance. The arch width of a patient's teeth can be expanded, for instance, using an orthodontic appliance (e.g., a dental appliance).

As discussed above, patients that are children or teenagers may have a maxilla where the midpalatal suture has not yet fused. Usually in the mid to late teens, the palatal suture fuses and the halves of the maxilla join together to become a single maxillary bone.

The maxilla (e.g., the upper jaw) is a bone that is fixed to the skull and forms the palate of the patient. The mandible (e.g., lower jaw) is a bone that is also attached to the skull by numerous muscles that power its movement. The mandible articulates at its posterior upward extremities with the temporal bone to form the jaw joint. The jaw joint is a loosely connected joint that accommodates the variety of movements of the mandible relative to the maxilla during biting and chewing.

In correctly shaped and positioned jaws, the upper teeth occupy an arch that is wider than the arch comprising the lower teeth. In other words, the upper teeth are designed to be buccally positioned relative to the teeth in the lower jaw. Malocclusions, such as crossbite, occur when this normal arrangement is reversed and one or more of the upper teeth are positioned lingual to the teeth in the lower jaw.

A patient with an un-fused maxilla can, for instance, have their palate skeletally expanded. This is in contrast to dental expansion where the teeth are uprighted or moved within the boundaries of the jaw in which they are contained. With skeletal expansion, the underlying bone is moved and the teeth are moved along with the changes to the shape of the bone.

Expanding a palate can, for instance, include splitting the left and right sides of the maxilla so that the teeth on the upper left side move as a single unit relative to the teeth on the right side. Because of this phenomenon, a gap between the top two front teeth can open up during the expansion process if they are not restrained from separating.

As discussed above, expansion of the palate, such as those methods performed prior to an orthodontic treatment involving braces and wires, currently includes having a treatment professional place an orthodontic appliance that may include anchoring bands, support bars, springs, and/or jack screws. The appliance is firmly affixed to the teeth at the anchor points and the springs or jackscrew applies forces on the teeth in order to move the underlying portions of the palate of the patient, thereby causing the arch of the patient's dentition to widen.

To adjust the appliance and increase the amount of expansion, the patient and/or another person can insert a key into the pinhole and turn the key to increase the width of the orthodontic appliances. In some examples, prior approaches can include a removable appliance which contains a jack-screw expander that is activated with a pinhole key.

After expanding the arch of the patient to the desired width (and sometimes overcorrecting in order to anticipate potential relapse toward the narrowness initially present), further orthodontic treatment can be performed to move and re-orient the teeth of the patient. This type of additional orthodontic treatment is typically performed after the expansion phase and a retention period where the jaw position is stabilized for a period of time while the musculature and bone adjust to the new positioning.

Further, palate expansion devices that are used primarily for skeletal expansion are typically temporarily anchored to posterior teeth, which can include the molars and/or premolars of the patient for the duration of the expansion and cannot be removed except by a dental professional because they are cemented into place. The forces that are applied to the molars and/or premolars are rather high in order to separate the suture during a short time period (e.g., one or more days), and therefore, the treatment can be uncomfortable to the patient due to the high pressure that is generated during the activation period. Once the suture splits, the majority of the pressure is relieved and subsequent activations in close proximity to the initial activation are not as uncomfortable.

In contrast, expanding an arch of a patient (whether skeletally with a fixed appliance or dentally with a removable appliance) according to embodiments of the present disclosure, can include utilizing a set of one or more appliances, such as positioners, retainers, and/or other removable appliances (e.g., clear plastic polymer shells and/or aligners) having a shell to be worn over the teeth of a patient and having a transpalatal element thereon that is designed to expand an arch of teeth of the patient by: moving the teeth of the patient to a wider position within the jaw; by expanding the palate of the patient; or a combination of the two. A transpalatal element can extend from the removable shell and across at least a portion of the arch width of the removable shell. The arch width can be from molar to molar, from premolar to premolar, from canine to canine, or from any tooth on the left side to any tooth on the right side. For example, in transpalatal elements, the transpalatal element can extend across the palate (trans-palatal) and can extend across at the posterior, anterior, in parts of one or the other, or in both areas of the patient's mouth.

Palatal expansion may be accomplished, for example, by force driven appliances. As used herein, force driven appliances can include appliances that use a calculated force to expand an arch and/or a palate of a patient by a threshold distance. For instance, the transpalatal element of an appliance can expand an arch and/or a palate of a patient by providing a calculated force on the teeth of the patient to expand an arch and/or a palate of a patient by a threshold distance. However, force driven palatal expansion can result in over expansion of the arch and/or palate of the patient. Therefore, controlling the force provided by the appliance by utilizing force control elements and/or using stop mechanisms to stop the expansion of the appliance at a predetermined threshold distance may aid in preventing over expansion of the arch and/or palate of the patient.

One or more appliance embodiments can include a removable shell formed of a first material having a plurality of cavities therein, wherein the cavities are shaped to receive teeth of the patient. These appliances are not fixed to the teeth of the patient and therefore can be removed by the patient for periods of time during treatment without aid from other people or intervention by a treatment professional.

In some instances, applying an expansion force to multiple teeth via tooth engagement structures can result in one or more teeth moving differently than other teeth such that the dental arch expands unequally in an undesired or unplanned manner. In contrast, according to a number of embodiments of the present disclosure, a removable arch adjustment appliance can include regulating structures connected between the transpalatal element and the tooth engagement structures. The regulating structures can be configured to balance and direct the expansion force from the transpalatal element to the tooth engagement structures.

In some embodiments, a transpalatal element of the appliance can be formed of a first material and from a second material that is a different than the first material in at least one physical property. For example, the first material may be a polyurethane material and the second material may also be a polyurethane material with the same chemical formula, but of different hardness or rigidity due to greater crosslinking. Or, the first material can be of one chemical composition (e.g. polyurethane), and the second material of an entirely different chemical composition (e.g. polyvinyl chloride).

In some embodiments, the second material is more resilient than the first material. This can be beneficial in embodiments, for example, where there is an initial need for a more rigid transpalatal element and then a more resilient transpalatal element later in treatment, among other situations where such an embodiment may be utilized.

In some examples, the transpalatal element of the appliance can have a width specific to a stage of a treatment plan and can be designed to expand an arch of the teeth of the patient to that specified width, which may be less than the full width in which that arch is to be expanded (i.e., the arch expansion can be incrementally accomplished by expanding the arch a little distance at a time over the use of several differently designed sequential dental appliances). In some examples, the transpalatal element can include force control elements specific to a stage of a treatment plan and can be designed to expand an arch and/or palate of the patient to a specified width of that stage of the treatment plan, which may be less than the full width in which the arch and/or palate of the patient is to be expanded. In some examples, the transpalatal element can include stop mechanisms that allow expansion of an arch and/or palate of the patient by a predefined expansion length, where the stop mechanisms and/or the predefined expansion length may be specific to a stage of a treatment plan. The predefined expansion length may be less than the full expansion length in which the arch and/or palate of the patient is to be expanded. The expansion length of each stage of the treatment plan may be predefined by a treatment professional.

For example, rather than providing a strong force, such as 10 to 50 N for a short period of a few days to a few weeks, embodiments of the present disclosure can provide a lesser predetermined force, such as 3 to 9 N, for a longer period, such as a month to six months. This force can be used, for example, to move palatal plates, move teeth outward, and/or maintain the teeth and/or jaw in a particular orientation while musculature and bone are adjusting to the orientation and to prevent movement of the teeth or jaw back toward their pre-expansion orientation.

In some embodiments, the second material can include, for instance, a more rigid material than the first material designed to provide greater resistance and/or force in a horizontal direction (i.e., transverse direction) against the posterior teeth (e.g., molars and bicuspids) of the arch of the patient. In various embodiments, this second material can be designed to impart force to the molars and/or other teeth on the jaw of the patient in order to either help preserve or change the transverse dimensions of the arch. Additionally, in some embodiments, with the use of appliances on the upper jaw, the force can be imparted to parts of the opposing jaw (e.g., teeth, jaw bone, etc.).

The expansion of an arch of teeth in the patient can be used to treat malocclusions such as crossbites, sagittal problems, crowding, and/or to help prevent or resolve impacted teeth, in various embodiments. The transverse support elements can be designed to not interfere with the shells of the dental appliance. In this manner, a dental appliance in accordance with embodiments of the present disclosure can be used to concurrently expand or constrict an arch of the patient while also repositioning a number of teeth of the patient.

For example, in some embodiments, the shell of the dental appliance can be used to provide force on one or more teeth to change their location or orientation. Embodiments of the present disclosure can be utilized to treat Class I, Class II, and Class III malocclusions.

For instance, with Class I malocclusions, teeth of the patient are inserted into cavities in the shell and the shell applies force to one or more teeth to change their location or orientations. With Class II (overbite or overjet) and Class III (underbite) malocclusions, the appliance can include other features, such as cut outs (areas cut out of the appliance shell material to allow access to the tooth surface through the appliance or to form, for example, a hook to attach a resilient member (e.g., an elastic band material) between the upper and lower jaw, to for instance treat a overbite or overjet.)

As discussed above, in some embodiments, a plurality of appliances can be worn by a patient successively to achieve gradual expansion (or constriction) of the arch of teeth in the patient. For instance, each of a plurality of dental appliances can include an incrementally wider width to expand the arch of the patient in incremental distances (e.g., expansion lengths). In some such embodiments, since this arch expansion technique can be accomplished concurrently with other orthodontic treatments, the arch expansion can be accomplished over a series of appliances that can be utilized, for example, over a period of less than six months, thereby making any pain and/or discomfort of the patient more consistent and less arbitrary without prolonging the overall time for orthodontic treatment. Additionally, force control elements and/or stop mechanisms can prevent over expansion of the arch and/or palate in any one stage of a treatment plan.

In some embodiments, an appliance can be formed using a thermoforming process. For instance, a transpalatal element of a removable shell can be formed of a material using a virtual model of the palate of the patient and a virtual model of a number of teeth of the patient.

The transpalatal element of a removable shell can be wider than the arch width of the number of teeth of the jaw of the patient and can be shaped to substantially follow contours of the palate of the patient. For expansion, this difference in the width can facilitate the movement of the arch outward toward the wider position of the transpalatal element generating a transverse expansion force.

The removable shell can be formed over a set of molded teeth. The removable shell can include a plurality of cavities formed therein and shaped to receive the number of teeth of patient.

The transpalatal element of a removable shell can, for example, be connected to the removable shell to form the dental appliance. The transpalatal element can be connected, in accordance with various embodiments of the present disclosure, for example, by thermoforming the removable shell over the set of molded teeth with the transpalatal element placed within the set of molded teeth (e.g., encapsulated), or via direct fabrication of the transpalatal element from a virtual model, then by fusing the two materials together (e.g., ultrasonic welding), by adhering the transpalatal element to the removable shell using an agent subsequent to forming the first portion and the removable shell. In this manner, a dental appliance can be formed that has two distinct material properties, but is unitary in nature (e.g., forms a single body that can be used by the patient even though it is formed of two materials).

In the detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" a particular thing can refer to one or more of such things (e.g., a number of teeth can refer to one or more teeth).

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an example of a removable arch adjustment appliance having a transpalatal element that includes a number of flexing elements according to a number of embodiments of the present disclosure. The appliance 100, illustrated in the embodiment of FIG. 1, can include an upper dentition appliance (e.g., an appliance placed on the upper jaw of the patient). An upper jaw can include a maxilla and can include a number of teeth of a patient's upper dentition.

Appliances can include any positioners, retainers, and/or other removable dental appliances for finishing and maintaining teeth positioning in connection with a dental treatment. These appliances may be utilized by a treatment professional in performing a treatment plan. For example, a treatment plan can include the use of a set of appliances, created according to models described herein. Appliances, in some embodiments, can include flexible dental appliances which serve, in part, as a prosthesis for aesthetics and/or dental function.

An appliance can, for example, be fabricated from a polymeric shell, and/or formed from other material, having a cavity shaped to receive and apply force to reposition one or more teeth from one teeth arrangement to a successive teeth arrangement. The shell may be designed to fit over a number of, or in many instances all, teeth present in the upper jaw. The shell can include an interior surface (e.g., adjacent to a surface of the teeth place therein) and an exterior surface. The interior surface is configured to receive and apply forces to the teeth therein to reposition a number of teeth of the patient, for example.

In accordance with some embodiments of the present disclosure, the appliance 100 can include a removable shell 102 formed of a material and having a plurality of cavities formed therein. As discussed above, the plurality of cavities can be shaped to receive teeth of the patient, where the number of teeth include at least one molar on each side of the patient's jaw.

The appliance 100 can include an elastic transpalatal element 104 extending from the removable shell 102 in a lingual direction and across an arch width of the removable shell 102. The arch width of the removable shell 102, as used herein, is a space between the cavities of the removable shell 102. For instance, the transpalatal element 104 can expand across a surface of the mouth of the patient when the dental appliance 100 is placed over the teeth of the patient. The surface of the mouth can include, for instance, a palate and/or floor of the mouth.

The transpalatal element 104, as illustrated by FIG. 1, can be formed of a first material and can include a predetermined force characteristic. For example, the transpalatal element 104 can be formed such that transpalatal element 104 provides a certain force output that expands the space between the molars one each side of a patient's jaw or the palate of the patient. For instance, the force output can vary based the size of the space between the molars on each side of a patient's jaw or the palate of the patient, as well as the stage of the treatment plan, as will be further described herein.

As discussed above, the transpalatal element can be designed to expand an arch of teeth of the patient. For instance, the width of the transpalatal element 104 can be wider than the actual arch width of the teeth of the patient in order to define the desired arch width incremental target for the teeth. An arch width of the teeth of the patient can include a distance between teeth of the left posterior side of the patient's dentition and teeth of the right posterior side of the patient's dentition (e.g., a space between the posterior teeth, such as the molars and/or pre-molars, on each side of a patient's jaw or palate). As an example, the transpalatal element 104 can be 0.25 millimeters wider than the arch width of the teeth of the patient.

In some embodiments, the transpalatal element, or a portion thereof, can be made from a second material that can be different in at least one material property (e.g., chemical property of a material, weight of material used, mixture of chemicals used, etc.) than the first material. For instance, the rigidity of the second material can apply a force to at least a portion of the number of teeth in a transverse direction (e.g., horizontal direction) to expand the arch of teeth of the patient.

In some embodiments, the first material of the transpalatal element can form a first layer and the second material of the transpalatal element can form a second layer. The first layer of the first material can be formed integrally with and of a same material as the removable shell 102, for instance. The second layer of the second material can be formed in a separate process and attached to the first layer of the first material, for example.

In some embodiments, the transpalatal element can follow contours of a surface of the mouth of the patient when the appliance 100 is placed over the teeth of the patient. For example, the transpalatal element can be shaped to substantially follow the contours of the palate of the patient. This can be accomplished, for example, by taking a mold or scan of the surface of the palate of the patient and then forming the surface of the transpalatal element to substantially match (i.e., the surface may not be identical, as the transpalatal element may be designed to be wider as discussed above and therefore is not an identical copy of the mold/scan surface, and therefore may substantially match, but not be identical) the mold/scan surface using the physical data of the palate (e.g., the space between the molars on each side of the patient's jaw or the palate of the patient), where the physical data is obtained by the mold or the scan of the patient.

The contours of the palate in the appliance may be interpolated in anticipation of a stretching of the tissues during the expansion, in order to better accommodate the seating of the appliance in the patient's mouth. In other words, the shape of the appliance is designed to include an expected stretching of the patient's palatal lingual tissues during dental expansion, and not just a movement of the teeth.

The appliance 100 can be used for repositioning the number of teeth of the patient concurrently with expansion of the arch of teeth of the patient utilizing the transpalatal element. The expansion of the arch of teeth can include movement of posterior teeth (e.g., molars) and/or other teeth of the arch of the patient in a transverse direction and/or stretching of the maxillary suture of the patient (e.g., separates the maxillary halves in the region of the suture), along with a stretching of the surrounding soft tissues (e.g., the palatal gingiva) during the expansion.

The simultaneous treatment of misalignment of a patient's dental arch (e.g., insufficient dental arch width) in conjunction with teeth alignment issues (e.g., rotation, tipping, etc.) can, for example, potentially eliminate a second phase of a two phase treatment protocol, make the second phase less complex or a little more comfortable for the patient, shorten treatment times when compared to linear two-phase treatment protocols that first treat the misalignment of a patient's dental arch followed by treatment of misalignment of the patient's teeth. That is, the transpalatal element can, in accordance with a number of embodiments, avoid and/or not interfere with engagement of the removable shell 102 with the teeth therein and thereby allow for correction of various tooth misalignment issues during the arch expansion process. Therefore, the appliance can reposition the teeth of the patient concurrently as the transpalatal element expands at least one of the spaces between the molars on each side of a patient's jaw or palate so that both arch expansion and alignment correction occurs in tandem rather than as separate phases.

The transpalatal element 104 can include a number of force control elements to control the force provided by the transpalatal element 104 that expands the at least one molar on each side of the patient's jaw or the palate of the patient. As used herein, force control elements can control the force provided by the transpalatal element 104 as the patient's jaw and/or the palate of the patient expand. For example, force control elements can allow transpalatal element 104 to provide more or less expansion force as the patient's jaw and/or the palate of the patient is expanded.

The expansion force provided by the appliance 100 can be defined by Equation 1:

$$k = \frac{3EI}{l^3} \quad \text{(Eq. 1)}$$

where k is the spring constant of the first and/or second material, E is the modulus of elasticity of the first and/or second material, l is the length of the member, and I is a material constant (e.g., the second moment of area of the appliance).

The number of force control elements of the transpalatal element 104 can provide a non-linear force that expands the space between the molars on each side of a patient's jaw or the palate of the patient. In some embodiments, the number of force control elements of the transpalatal element 104 can provide a force that increases (e.g., exponentially) as the space between the molars on each side of the patient's jaw or the palate of the patient increases. In some embodiments, the number of force control elements of the transpalatal element 104 can provide a force that decreases (e.g., exponentially) as the space between the molars on each side of the patient's jaw or the palate of the patient increases. The force can increase and/or decrease until a specified distance, can increase exponentially and/or linearly, and/or decrease to zero.

The number of force control elements can include a number of flexing elements 106 in the transpalatal element 104 of the shell 102. The number of flexing elements 106 can control the force provided by the transpalatal element 104. For instance, the number of flexing elements 106 can control the force provided by the transpalatal element 104 such that the force provided by the transpalatal element 104 increases or decreases as the space between the molars on each side of the patient's jaw or the palate of the patient increases.

As shown in FIG. 1, the number of flexing elements 106 can include four flexing elements to control the force provided by the transpalatal element 104 of the shell 102. The four flexing elements 106 can be located substantially near an apex of the transpalatal element 104. The four flexing elements 106 can extend in a direction towards the tongue of the patient.

Flexing elements 106 can provide different non-linear force characteristics based on different design parameters. For instance, the non-linear force characteristics of the flexing elements 106 can be represented by Equation 1 above. The spring constant of appliance 100, as represented by Equation 1, may be influenced by design parameters including the number of flexing elements, length of the flexing elements (e.g., a distance the flexing element extends towards the tongue of the patient), the thickness of the flexing element, a distance between each flexing element, a bending curvature of each flexing element (e.g., a curvature of the length of the flexing element), and a bending/folding radius connecting adjacent flexing elements. Thus, the spring constant of each flexing element of an appliance, and consequently of an appliance itself, can vary non-linearly with length and thickness. Further, the curvature (e.g., the bending/folding radius) of segments connecting each flexing element may determine an extent of each flexing element bend until it settles on the adjacent element.

In some examples, a greater number of flexing elements may provide more non-linear force than a lesser number of flexing elements. In some examples, a first fold with a radius greater than a radius of a second fold may provide more non-linear force than the second fold. In some examples, a first fold with a length greater than the length of a second fold may provide more non-linear force than the second fold. In some examples, a greater distance between each fold of the number of flexing elements may provide more non-linear force than a smaller distance between each fold. The four flexing elements can control the force provided by the transpalatal element 104 of the shell 102. For example, the four flexing elements can provide a force that exponentially increases as the space between the molars on each side of the patient's jaw or the palate of the patient increases. In some embodiments, the four flexing elements can provide a force that exponentially decreases as the space between the molars on each side of the patient's jaw or the palate of the patient increases (e.g., as the transpalatal element 104 expands and the number of flexing elements are activated and flatten out).

Although the number of flexing elements 106 are shown in FIG. 1 as being the same length, embodiments of the present disclosure are not so limited. In some examples, the four flexing elements 106 can be longer or shorter. In some examples, two of the four flexing elements can be longer or shorter than the other two flexing elements.

Although the four flexing elements are shown in FIG. 1 and described as extending towards the tongue of the patient, embodiments of the present disclosure are not so limited. For example, the four flexing elements 106 can be bent towards the surface of the transpalatal element 104 such that they lie closer to and in a more substantially parallel fashion next to the surface of the transpalatal element 104.

The number of flexing elements 106 can be activated in different steps of expansion of the transpalatal element 104 of the shell. For example, as the expansion of the force providing portion 104 of the shell occurs, the two respective flexing elements located nearest the respective buccal sides of the patient's mouth may be activated to provide more or less expansion force as the space between the molars on each side of the patient's jaw or the palate of the patient increases. The two remaining flexing elements may be activated following activation of the two previous flexing elements. The two remaining flexing elements may be activated during expansion of the first two flexing elements, or after expansion of the first two flexing elements is finished.

Although not shown in FIG. 1 for clarity and so as not to obscure embodiments of the present disclosure, appliance 100 can include an expansion limiter. An expansion limiter can include a ball joint, a universal joint, an arm, mesh, a spring, and/or a hinge, although embodiments of the present disclosure are not limited to the above listed expansion limiters. The expansion limiter can direct the force output of appliance 100.

In some embodiments of the present disclosure, the appliance 100 can be a portion of a treatment plan. For instance, the treatment plan can include a series of appliances designed to incrementally implement a treatment plan. Each of the series of appliances can be a stage of the incremental treatment plan, for instance. The series can be used to reposition the teeth of the patient concurrently as the transpalatal element expands at least one of the spaces between the molars on each side of a patient's jaw or palate.

For instance, a first appliance, of a series of appliances designed to incrementally implement a treatment plan can comprise a first shell formed of a first material having a plurality of cavities therein designed to receive teeth of a jaw. The first appliance can include a first transpalatal element formed of a first layer of the first material and a second layer of the second material different than the first material.

The first transpalatal element can extend from the first shell across an arch width of the first shell. For instance, the first transpalatal element can have a first width specific to a first stage of the treatment plan and/or can be designed to expand at least one of the spaces between the molars on each side of a patient's jaw or the palate of the patient. The transpalatal element of the first appliance can provide force to expand the at least one of the space between the molars on each side of the patient's jaw or the palate of the patient by a predefined expansion length according to the first stage of the treatment plan. The predefined expansion length can be based on a stage of the treatment plan.

A second appliance, of the series of appliances, can comprise a second shell having a plurality of cavities therein designed to receive teeth of the jaw. The second appliance can include a second transpalatal element. For example, the second transpalatal element can have a second width specific to a second stage of the treatment plan. In some examples, the predefined expansion length of the transpalatal element of the second appliance can be different than the predefined expansion length of the transpalatal element of the first shell (e.g., can be more or less). In some examples, the predefined expansion length of the transpalatal element of the second appliance can be the same as the predefined expansion length of the transpalatal element of the first shell.

The second width can be wider than the first width. For instance, the second width can include an incremental increase in width as compared to the first width. The successive incremental increase in the arch width of the appliances can correspond to the desired gradual increase in at least one of the space between the molars on each side of a patient's jaw or the palate of the patient. For instance, the transpalatal element of the second appliance can provide force to expand the at least one of the space between the molars on each side of the patient's jaw or the palate of the patient by a predefined expansion length according to the second stage of the treatment plan.

A shape of the transpalatal elements of the shells and/or the shape of the force control elements can be specific to stages of the treatment plan. For example, the force control elements and/or the force providing portion of a first appliance specific to a first stage of a treatment plan may be shaped to provide more force than force control elements and/or the force providing portion of a second appliance specific to a second stage of the treatment plan.

Although the present embodiments illustrate two stages of a treatment plan, embodiments in accordance with the present disclosure are not so limited. Treatment plans can include a variety of number of stages, including more or less than two treatment stages. At least a portion of the stages can include treatment for gradual expansion of an arch of teeth of a patient. Alternatively and/or in addition, one or more of the stages may not include transpalatal elements, in various embodiments.

In an example embodiment, a system can include: a first appliance, of a series of appliances designed to incrementally implement a treatment plan, can include a removable shell having a plurality of cavities formed therein and shaped to receive teeth of a patient and wherein the teeth include at least one molar on each side of a patient's jaw, wherein the shell includes an elastic transpalatal element with a predetermined force characteristic that spans a palate of the patient and provides force to expand at least one of a space between the molars on each side of a patient's jaw or the palate of the patient, and wherein the transpalatal element includes a number of force control elements to control the force provided by the transpalatal element that expands the at least one of the space between the molars on each side of a patient's jaw or the palate of the patient. A second appliance, of the series of appliances, can including a removable shell having a plurality of cavities formed therein and shaped to receive teeth of a patient, wherein the shell includes an elastic transpalatal element with a predetermined force characteristic that spans a palate of the patient and provides force to expand at least one of the space between the molars on each side of a patient's jaw or the palate of the patient, and wherein the transpalatal element includes a number of force control elements to control the force provided by the transpalatal element that expands the at least one of the space between the molars on each side of a patient's jaw or the palate of the patient.

In some embodiments, a virtual appliance including a transpalatal element can be formed of a material using a virtual model of a palate of a patient and a virtual model of a number of teeth of the patient. The transpalatal element can be wider than an arch width of the number of teeth of the first jaw of the patient, specific to a stage of a treatment plan, and can be shaped to substantially follow contours of the palate of the patient (that may also include modeling of anticipated changes to the palatal contours due to tissue stretching), for instance.

The palatal contours in the model can also be specifically raised in a vertical direction so that any appliance which is formed over the model is slightly raised in comparison to the actual contours of the palate. In other words, a slight gap between the actual palate and the palatal coverage portion of the appliance can be designed to be present. This gap allows the transverse benefits of the appliance design to be in effect while not necessarily requiring an exact fit of the appliance to the contours of the tissue.

A slight offset in the vertical dimension can minimize any disruption in speech, swallowing, or feel due to changes in tongue position that may result in the alteration. More importantly, intentionally raising the vertical dimension of only the palatal tissue regions has the benefit of not needing perfect modeling of any non-linear stretching that might take place in the tissue. This can greatly reduce the risk of uncomfortable pressure spots and sores caused by the appliance. Having to relieve pressure spots in the appliance can be very time consuming for the treatment professional, and if the appliance is thin to begin with, such adjustments can lead to weakened areas in the appliance.

A virtual model of a number of teeth of the patient can, for example, include an initial virtual dental model and/or an intermediate virtual dental model. A virtual model of the palate (and/or other tissue surfaces of the patient's mouth) can include the contours of the palate. In some embodiments, the virtual model of the palate and the virtual model of the number of teeth can include a single virtual model and/or two separate virtual models.

The transpalatal element and/or stop mechanisms (e.g., as will be further described in connection with FIGS. 7-13) can be formed by a rapid prototyping process, such as, for example, by a Computer-aided manufacturing (CAM) milling, stereolithography, 3D printing, fused deposition modeling (FDM), selective laser sintering (SLS), and/or photolithography. Advantages of such techniques can include, for example, that multiple materials can be used in a single build, various cross sectional thickness's can be designed and built for rigidity, and easy fabrication of a complex organic geometry.

In some embodiments, the flexibility of the appliance is such that it can be compressed in the transverse direction during seating in order to activate the expansion force. This force then gets released and directed towards the teeth, soft tissues, and/or jaw bone when then the appliance is seated in the mouth.

As discussed above, in some embodiments, the transpalatal element can be shaped to substantially follow contours of the palate of the patient using the virtual model of the palate. Alternatively and/or in addition, the transpalatal element can be shaped to substantially follow contours of the floor of the mouth of the patient using a virtual model of the floor of the mouth.

To form an appliance, a removable shell can, for example, be formed over a set of molded teeth. The removable shell can include a plurality of cavities formed therein, wherein the plurality of cavities are shaped to receive the number of teeth of the patient. In various embodiments, the removable shell can include a second portion of the transpalatal element formed of the same material as the plurality of cavities. The second portion of the transpalatal element can be formed integrally with and/or during a same process as the plurality of cavities, for instance.

The material forming the first portion of the transpalatal element can be more rigid than the material forming the second portion of the transpalatal element, for instance. In some embodiments, the second portion of the transpalatal element can include the same width as the first portion of the transpalatal element.

Alternatively and/or in addition, the first portion of the transpalatal element can be designed to be adjacent to and/or in contact with a surface of the patient's mouth (e.g., the palate and/or floor of the patient's mouth) when the dental appliance is placed over the teeth of the patient. The second portion of the transpalatal element can be designed to be adjacent to and/or in contact with a tongue of the patient when the dental appliance is placed over the teeth of the patient.

The dental appliance can be made, for example, by thermoforming a piece of plastic over a physical dental model. The physical dental model, for instance, can represent an incremental position to which a patient's teeth are to be moved. This desired position of the patient's teeth includes any underlying desired changes to the skeletal structure which holds the teeth in place.

In some embodiments, a treatment file can be accessed by a rapid prototyping apparatus machine, such as a SLA or printing, to form and/or create the dental model. The result of the dental model can include a set of molded teeth (e.g., a physical set of molded teeth). The set of molded teeth can include at least a replica of a number of teeth of the patient. The dental model can be used to make a dental appliance, for example, by creating a negative impression of the dental model using polymeric sheets of material and vacuum forming heated sheets of the polymer over the dental model, as discussed above.

For instance, a dental appliance can be created by layering a thermoformable sheet of material and/or multiple sheets of one or more materials over the dental model. The materials can include at least one polymeric material, for instance.

Generally, the dental appliance can be produced and/or formed, for example, by heating the polymeric thermoformable sheet and vacuum or pressure forming the sheet over the dental model (i.e., over a number of the teeth in the mold). The shape of the sheet of material can be designed to intentionally vary in thickness in some portions of the sheet (beyond natural variations in thickness during the shaping process) as it conforms to the mold shape. A dental appliance can, for example, include a negative impression of the dental model. The appliance and/or parts thereof may be transparent, semi-transparent, or opaque in such a way as to emulate a natural tooth shade.

Force control elements of an arch adjustment appliance can eliminate the need for a patient to utilize screws and/or other mechanisms to incrementally activate expansion. Force control elements can allow for more precise forces to be applied to expand the space between the molars on each side of a patient's jaw or the palate of the patient, which may shorten the length of a treatment plan and avoid discomfort and/or pain for the patient. Additionally, the arch adjustment appliances can be more aesthetically pleasing.

Figure 2:
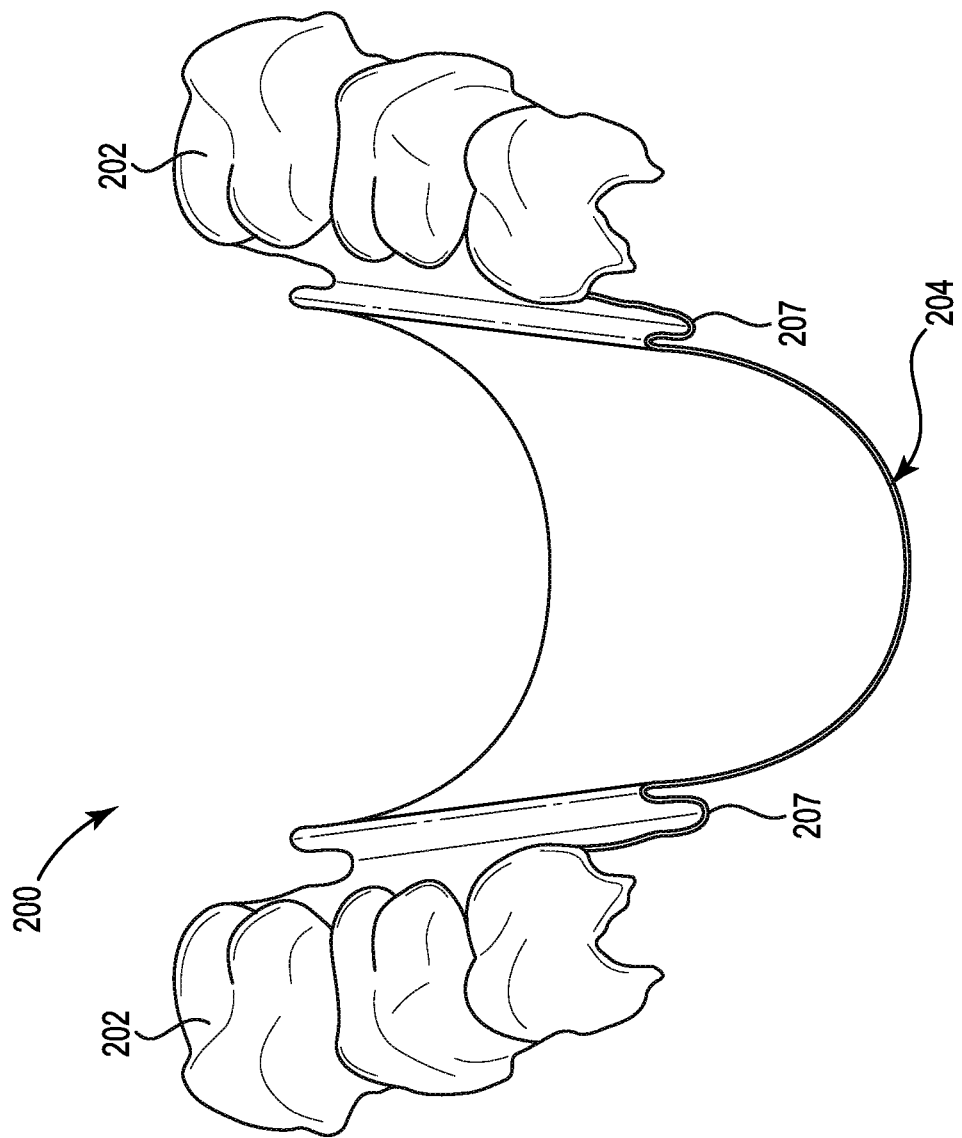
FIG. 2 illustrates an example of a removable arch adjustment appliance having a transpalatal element that includes a number of flexing elements according to the present disclosure.

FIG. 2 illustrates an example of a removable arch adjustment appliance having a transpalatal element that includes a number of flexing elements according to the present disclosure. As illustrated by the embodiment of FIG. 2, the appliance 200 can include a removable shell 202, a transpalatal element 204, and a number of flexing elements 207.

As previously described in connection with FIG. 1, the removable shell 202 can include a plurality of cavities formed therein, wherein the plurality of cavities are shaped to receive the number of teeth of the patient. The removable shell 202, as illustrated in FIG. 2, can include a virtual removable shell, a physical removable shell, and/or material to be thermoformed over a dental model.

Additionally, as previously described in connection with FIG. 1, the transpalatal element 204 can include a number of force control elements to control the force provided by the force expansion providing portion 204. The number of force control elements can include a number of flexing elements 207 that can be activated in different steps of expansion of the transpalatal element 204 of the shell 202.

As shown in FIG. 2, the number of flexing elements 207 can include two flexing elements to control the force provided by the transpalatal element 204 of the shell 202. The two flexing elements can be located substantially near the removable shell 202. The two flexing elements can extend in a direction towards the palate of the patient.

The number of flexing elements 207 can provide different non-linear force characteristics based on different design parameters. In some examples, a greater number of flexing elements may provide more non-linear force than a lesser number of flexing elements. In some examples, a first flexing element with a radius greater than a radius of a second flexing element may provide more non-linear force than the second flexing element. In some examples, a first flexing element with a length greater than the length of a second flexing element may provide more non-linear force than the second flexing element. In some examples, a greater distance between each flexing element of the number of flexing elements may provide more non-linear force than a smaller distance between each flexing element.

The two flexing elements can control the force provided by the transpalatal element 204 of the shell 202. For example, the two flexing elements can provide a force that exponentially increases as the space between the molars on each side of the patient's jaw or the palate of the patient increases. In some embodiments, the two flexing elements can provide a force that exponentially decreases as the space between the molars on each side of the patient's jaw or the palate of the patient increases.

Although the two flexing elements are shown in FIG. 1 and described as extending towards the palate of the patient, embodiments of the present disclosure are not so limited. For example, the two flexing elements can be bent towards the surface of the transpalatal element 204 such that they lie closer to and in a more substantially parallel fashion next to the surface of the transpalatal element 204.

Although the number of flexing elements 207 are shown in FIG. 2 as being the same length, embodiments of the present disclosure are not so limited. In some examples, the two flexing elements 207 can be longer or shorter. In some examples, one of the two flexing elements 207 can be longer or shorter than the second of the two flexing elements 207.

Although not shown in FIG. 2 for clarity and so as not to obscure embodiments of the present disclosure, appliance 200 can include an expansion limiter. An expansion limiter can include a ball joint, a universal joint, an arm, mesh, a spring, and/or a hinge, although embodiments of the present disclosure are not limited to the above listed expansion limiters. The expansion limiter can direct the force output of appliance 200.

Figure 3:
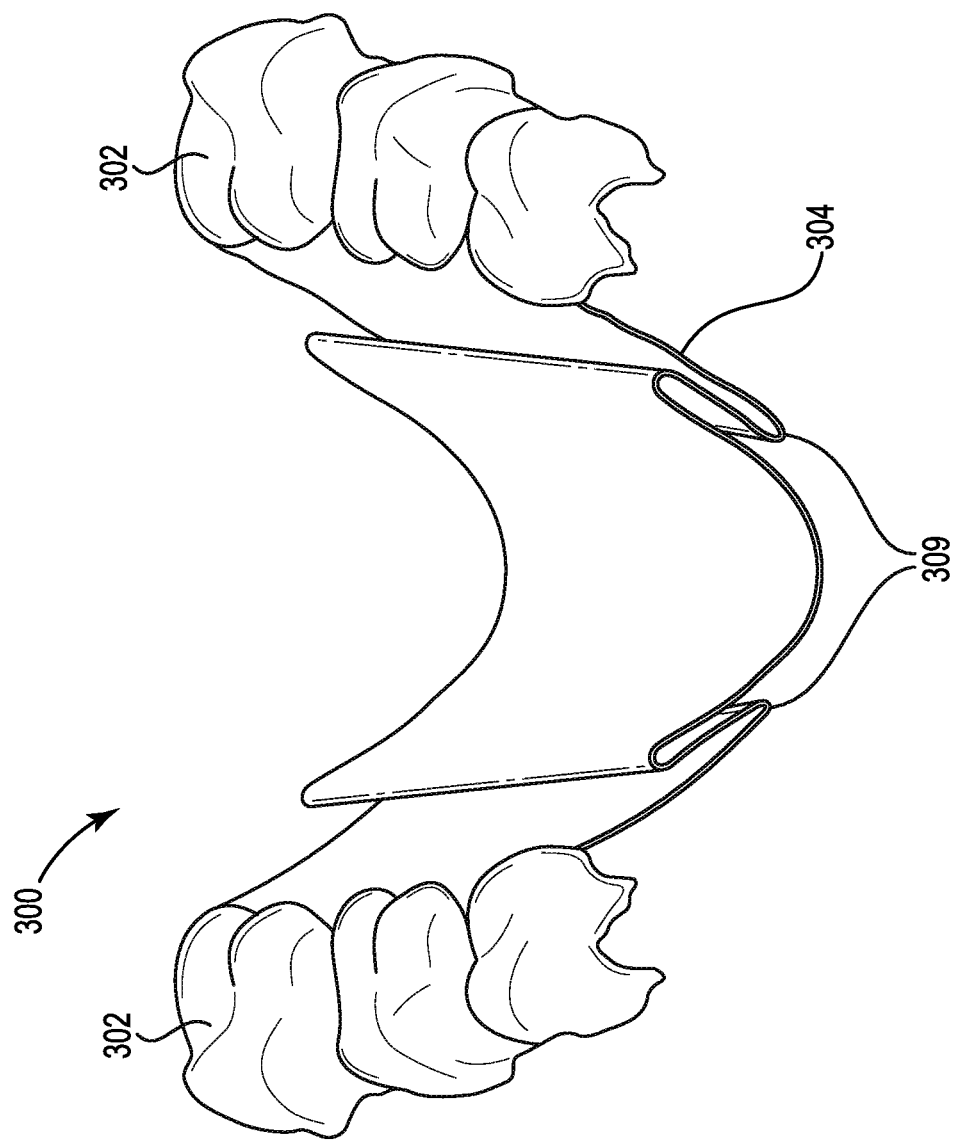
FIG. 3 illustrates an example of a removable arch adjustment appliance having a transpalatal element that includes a number of flexing elements according to a number of embodiments of the present disclosure.

FIG. 3 illustrates an example of a removable arch adjustment appliance having a transpalatal element that includes a number of flexing elements according to a number of embodiments of the present disclosure. As illustrated by the embodiment of FIG. 3, the appliance 300 can include a removable shell 302, a transpalatal element 304, and a number of flexing elements 309.

As previously described in connection with FIG. 1, the removable shell 302 can include a plurality of cavities formed therein, wherein the plurality of cavities are shaped to receive the number of teeth of the patient. The removable shell 302, as illustrated in FIG. 3, can include a virtual removable shell, a physical removable shell, and/or material to be thermoformed over a dental model.

Additionally, as previously described in connection with FIG. 1, the transpalatal element 304 can include a number of force control elements to control the force provided by the force expansion providing portion 304. The number of force control elements can include a number of flexing elements 309 that can be activated in different steps of expansion of the transpalatal element 304 of the shell 302.

As shown in FIG. 3, the number of flexing elements 309 can include two flexing elements to control the force provided by the transpalatal element 304 of the shell 302. The two flexing elements can be located substantially between an apex of the transpalatal element 304 of the shell 302 and the plurality of cavities of the shell 302. The two flexing elements can extend in a direction towards the palate of the patient.

The number of flexing elements 309 can provide different non-linear force characteristics based on different design parameters. In some examples, a greater number of flexing elements may provide more non-linear force than a lesser number of flexing elements. In some examples, a first flexing element with a radius greater than a radius of a second flexing element may provide more non-linear force than the second flexing element. In some examples, a first flexing element with a length greater than the length of a second flexing element may provide more non-linear force than the second flexing element. In some examples, a greater distance between each flexing element of the number of flexing elements may provide more non-linear force than a smaller distance between each flexing element.

The two flexing elements can control the force provided by the transpalatal element 304 of the shell 302. For example, the two flexing elements can provide a force that exponentially increases as the space between the molars on each side of the patient's jaw or the palate of the patient increases. In some embodiments, the two flexing elements can provide a force that exponentially decreases as the space between the molars on each side of the patient's jaw or the palate of the patient increases.

Although the number of flexing elements 309 are shown in FIG. 3 as being the same length, embodiments of the present disclosure are not so limited. In some examples, the two flexing elements 309 can be longer or shorter. In some examples, one of the two flexing elements 309 can be longer or shorter than the second of the two flexing elements 309.

Although not shown in FIG. 3 for clarity and so as not to obscure embodiments of the present disclosure, appliance 300 can include an expansion limiter. An expansion limiter can include a ball joint, a universal joint, an arm, mesh, a spring, and/or a hinge, although embodiments of the present disclosure are not limited to the above listed expansion limiters. The expansion limiter can direct the force output of appliance 300.

Figure 4:
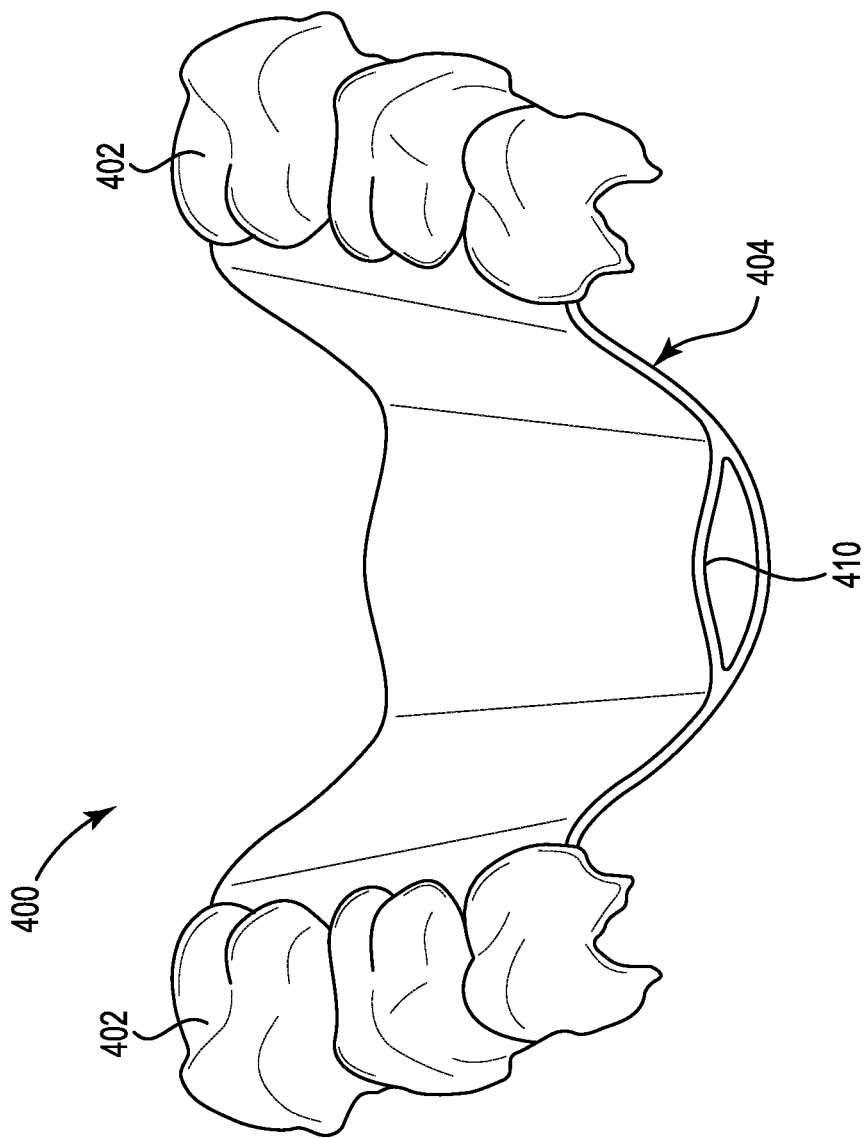
FIG. 4 illustrates an example of a removable arch adjustment appliance having a transpalatal element that includes a member according to one or more embodiments of the present disclosure.

FIG. 4 illustrates an example of a removable arch adjustment appliance having a transpalatal element that includes a member according to one or more embodiments of the present disclosure. As illustrated by the embodiment of FIG. 4, the appliance 400 can include a removable shell 402, a transpalatal element 404, and a member that is a cross member 410.

As previously described in connection with FIG. 1, the removable shell 402 can include a plurality of cavities formed therein, wherein the plurality of cavities are shaped to receive the number of teeth of the patient. The removable shell 402, as illustrated in FIG. 4, can include a virtual removable shell, a physical removable shell, and/or material to be thermoformed over a dental model.

Additionally, as previously described in connection with FIG. 1, the transpalatal element 404 can include a number of force control elements to control the force provided by the force expansion providing portion 404. The number of force control elements can include a cross member 410.

The cross member 410 can control the force provided by the transpalatal element 404 of the shell 402. For example, the cross member 410 can provide a force that exponentially increases as the space between the molars on each side of the patient's jaw or the palate of the patient increases. In some embodiments, the cross member 410 can provide a force that exponentially decreases as the space between the molars on each side of the patient's jaw or the palate of the patient increases.

Cross member 410 can provide different non-linear force characteristics based on a size of the cross member and/or a material of the cross member. In some examples, a larger cross-sectional area of the cross member can generate more force, and a smaller cross-sectional area of the cross member can generate less force. In some examples, a cross member made of a first material can generate more force than a cross member made of a second material.

In some embodiments, the cross member 410 can act as a stop mechanism. In some examples, the cross member 410 can be attached to the transpalatal element 404 such that the cross member 410 includes a loaded force. In some examples, the cross member 410 can be attached to the transpalatal element 404 such that the cross member 410 does not include a loaded force, but a loaded force is induced when the cavities of the removable shell 402 receive the teeth of the patient (e.g., appliance 400 is placed in the patient's mouth). In either example, expansion of the space between the molars on each side of a patient's jaw or the palate of the patient can cause the loaded force of cross member 410 to be removed. Once the loaded force of cross member 410 is removed, the expansion force of the transpalatal element 404 goes to zero as the cross member 410 prevents the transpalatal element 404 from further expansion.

In some embodiments, the cross member 410 can be of the same material as the shell 402. In some embodiments, the cross member 410 can be of the same material as the transpalatal element 404.

Although not shown in FIG. 4 for clarity and so as not to obscure embodiments of the present disclosure, appliance 400 can include an expansion limiter. An expansion limiter can include a ball joint, a universal joint, an arm, mesh, a spring, and/or a hinge, although embodiments of the present disclosure are not limited to the above listed expansion limiters. The expansion limiter can direct the force output of appliance 400.

Figure 5:
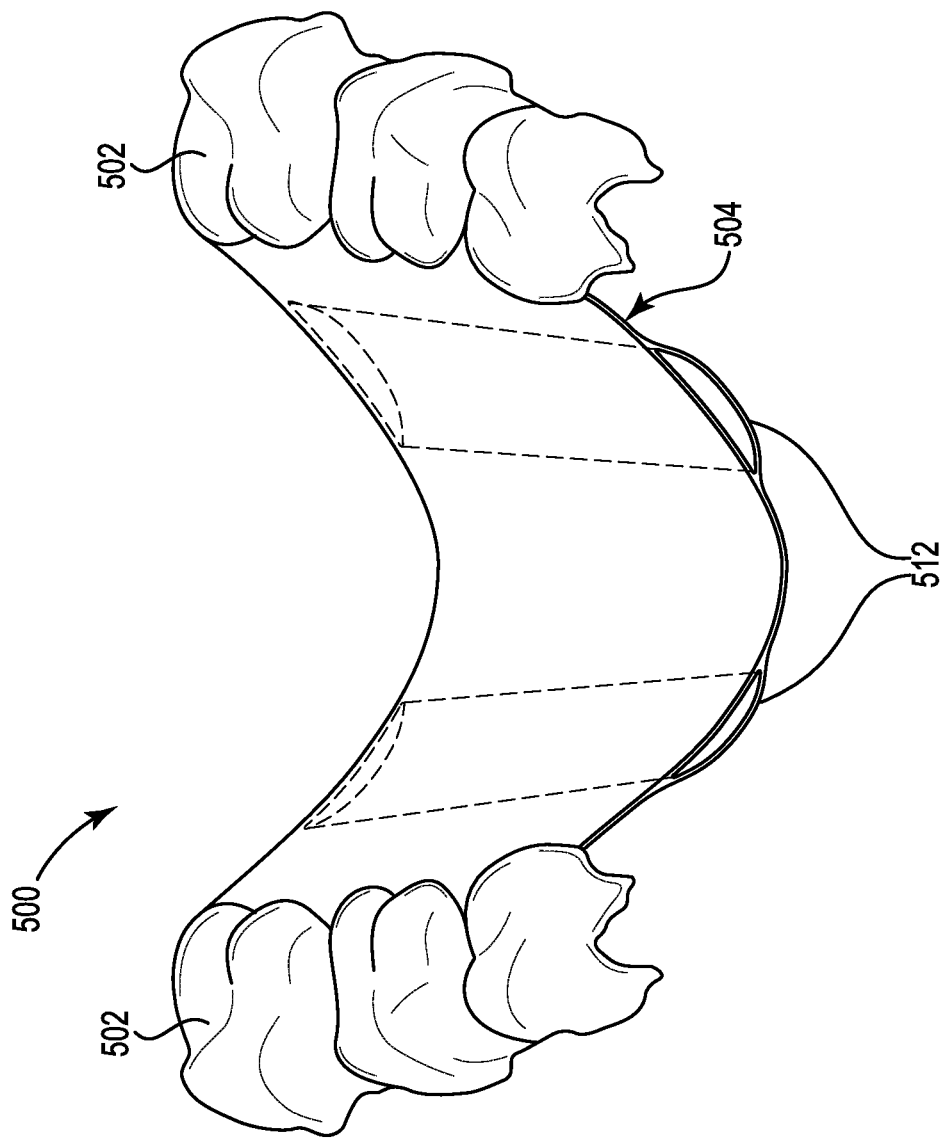
FIG. 5 illustrates an example of a removable arch adjustment appliance having a transpalatal element that includes two members attached thereto according to one or more embodiments of the present disclosure.

FIG. 5 illustrates an example of a removable arch adjustment appliance having a transpalatal element that includes two members attached thereto according to one or more embodiments of the present disclosure. As illustrated by the embodiment of FIG. 5, the appliance 500 can include a removable shell 502, a transpalatal element 504, and two members 512.

As previously described in connection with FIG. 1, the removable shell 502 can include a plurality of cavities formed therein, wherein the plurality of cavities are shaped to receive the number of teeth of the patient. The removable shell 502, as illustrated in FIG. 5, can include a virtual removable shell, a physical removable shell, and/or material to be thermoformed over a dental model.

Additionally, as previously described in connection with FIG. 1, the transpalatal element 504 can include a number of force control elements to control the force provided by the force expansion providing portion 504. The number of force control elements can include two members 512 attached to the side of the transpalatal element 504 of the shell 502 that face the palate of the patient.

The two members 512 can control the force provided by the transpalatal element 504 of the shell 502. For example, the two members 512 can provide a force that exponentially increases as the space between the molars on each side of the patient's jaw or the palate of the patient increases. In some embodiments, the two members 512 can provide a force that exponentially decreases as the space between the molars on each side of the patient's jaw or the palate of the patient increases.

The two members 512 can provide different non-linear force characteristics based on a size of the two members and/or a material of the two members. In some examples, a larger cross-sectional area of the two members can generate more force, and a smaller cross-sectional area the two members can generate less force. In some examples, the members made of a first material can generate more force than two members made of a second material.

In some embodiments, the two members 512 can be of the same material as the shell 502. In some embodiments, the two members 512 can be of the same material as the transpalatal element 504. In some embodiments, one of the two members 512 can be of a different material than the other of the two members 512.

Although not shown in FIG. 5 for clarity and so as not to obscure embodiments of the present disclosure, appliance 500 can include an expansion limiter. An expansion limiter can include a ball joint, a universal joint, an arm, mesh, a spring, and/or a hinge, although embodiments of the present disclosure are not limited to the above listed expansion limiters. The expansion limiter can direct the force output of appliance 500.

Figure 6:
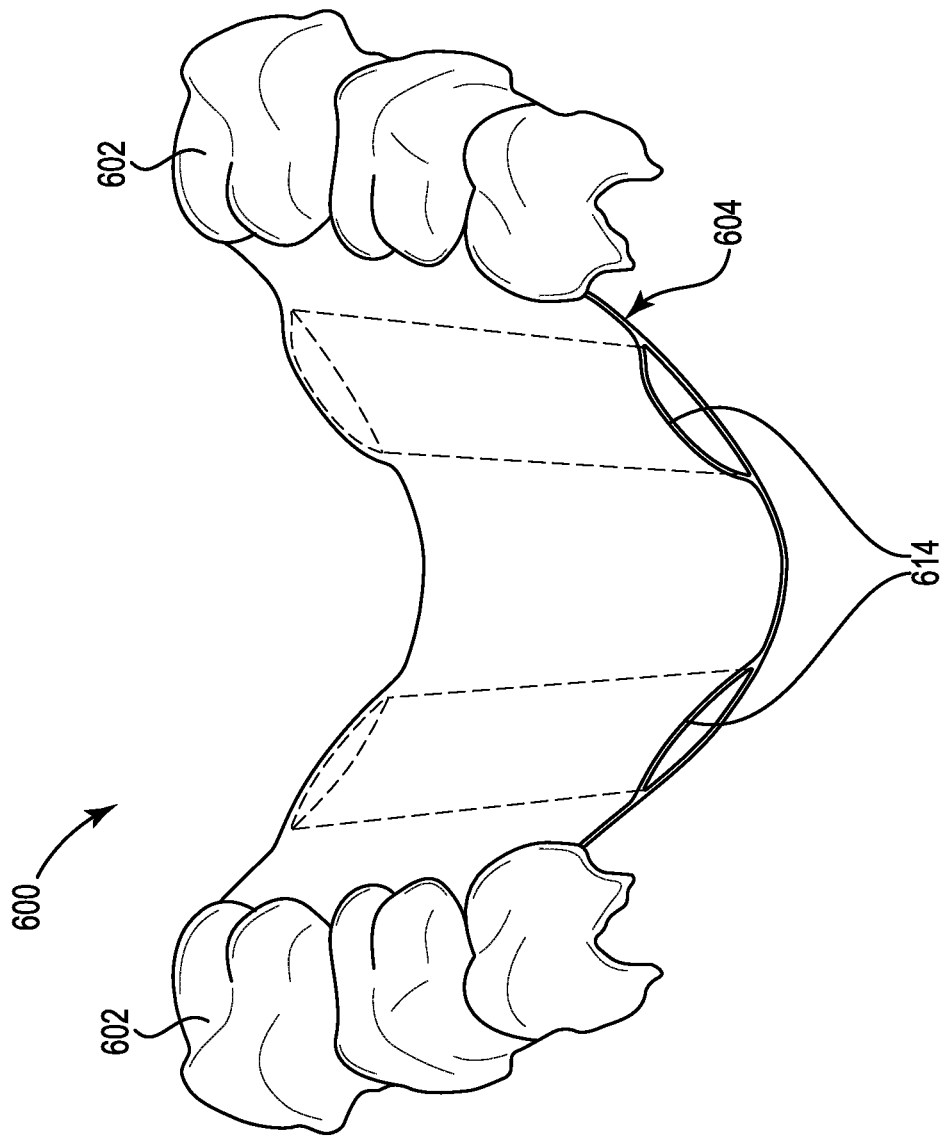
FIG. 6 illustrates an example of a removable arch adjustment appliance having a transpalatal element that includes two members attached thereto according to one or more embodiments of the present disclosure.

FIG. 6 illustrates an example of a removable arch adjustment appliance having a transpalatal element that includes two members attached thereto according to one or more embodiments of the present disclosure. As illustrated by the embodiment of FIG. 6, the appliance 600 can include a removable shell 602, a transpalatal element 604, and two members 614.

As previously described in connection with FIG. 1, the removable shell 602 can include a plurality of cavities formed therein, wherein the plurality of cavities are shaped to receive the number of teeth of the patient. The removable shell 602, as illustrated in FIG. 6, can include a virtual removable shell, a physical removable shell, and/or material to be thermoformed over a dental model.

Additionally, as previously described in connection with FIG. 1, the transpalatal element 604 can include a number of force control elements to control the force provided by the force expansion providing portion 604. The number of force control elements can include two members 614 attached to the side of the transpalatal element 604 of the shell 602 that face the tongue of the patient.

The two members 614 can control the force provided by the transpalatal element 604 of the shell 602. For example, the two members 614 can provide a force that exponentially increases as the space between the molars on each side of the patient's jaw or the palate of the patient increases. In some embodiments, the two members 614 can provide a force that exponentially decreases as the space between the molars on each side of the patient's jaw or the palate of the patient increases.

The two members 614 can provide different non-linear force characteristics based on a size of the two members and/or a material of the two members. In some examples, a larger cross-sectional area of the two members can generate more force, and a smaller cross-sectional area the two members can generate less force. In some examples, the members made of a first material can generate more force than two members made of a second material.

In some embodiments, the two members 614 can be of the same material as the shell 602. In some embodiments, the two members 614 can be of the same material as the transpalatal element 604. In some embodiments, one of the two members 614 can be of a different material than the other of the two members 614.

Embodiments of the present disclosure can also provide other beneficial functions. For example, embodiments can maintain space in the patient's mouth when the patient's primary and permanent dentition have a size discrepancy.

For instance, unlike the anterior teeth, the permanent premolars may be smaller than the primary teeth they replace. On average, the mandibular primary second molar is 2 mm larger than the second premolar and, in the maxillary arch, the primary second molar is only 1.5 mm larger. The primary first molar is only 0.5 mm larger than the first premolar. Accordingly, on average, this results in 2.5 mm of space, called leeway space, in the mandibular arch and 1.5 mm in the maxillary arch. The leeway space is usually taken by mesial movement of the permanent molars (the permanent first molars move mesially relatively rapidly).

This creates an opportunity to gain arch length and relieve crowding by stopping the first molar mesial movement by, for example, using a pontic along with the appliance by filling the appliance tooth space and leaving clearance for an erupting tooth. The filled pontic material can be used to keep the first molar from moving into the leeway space while allowing the permanent premolar to erupt.

It should be noted that in some embodiments, portions of the appliance may not be visible to people when they see the appliance in the patient's mouth and as such the material does not have to be clear, and this therefore allows for more options with regard to the choice of material that can be utilized. With some manufacturing processes, as discussed herein, the appliance can be fabricated from multiple materials or can be manufactured in parts wherein the parts are made from different materials and are attached together to create the appliance.

Although not shown in FIG. 6 for clarity and so as not to obscure embodiments of the present disclosure, appliance 600 can include an expansion limiter. An expansion limiter can include a ball joint, a universal joint, an arm, mesh, a spring, and/or a hinge, although embodiments of the present disclosure are not limited to the above listed expansion limiters. The expansion limiter can direct the force output of appliance 600.

Figure 7:
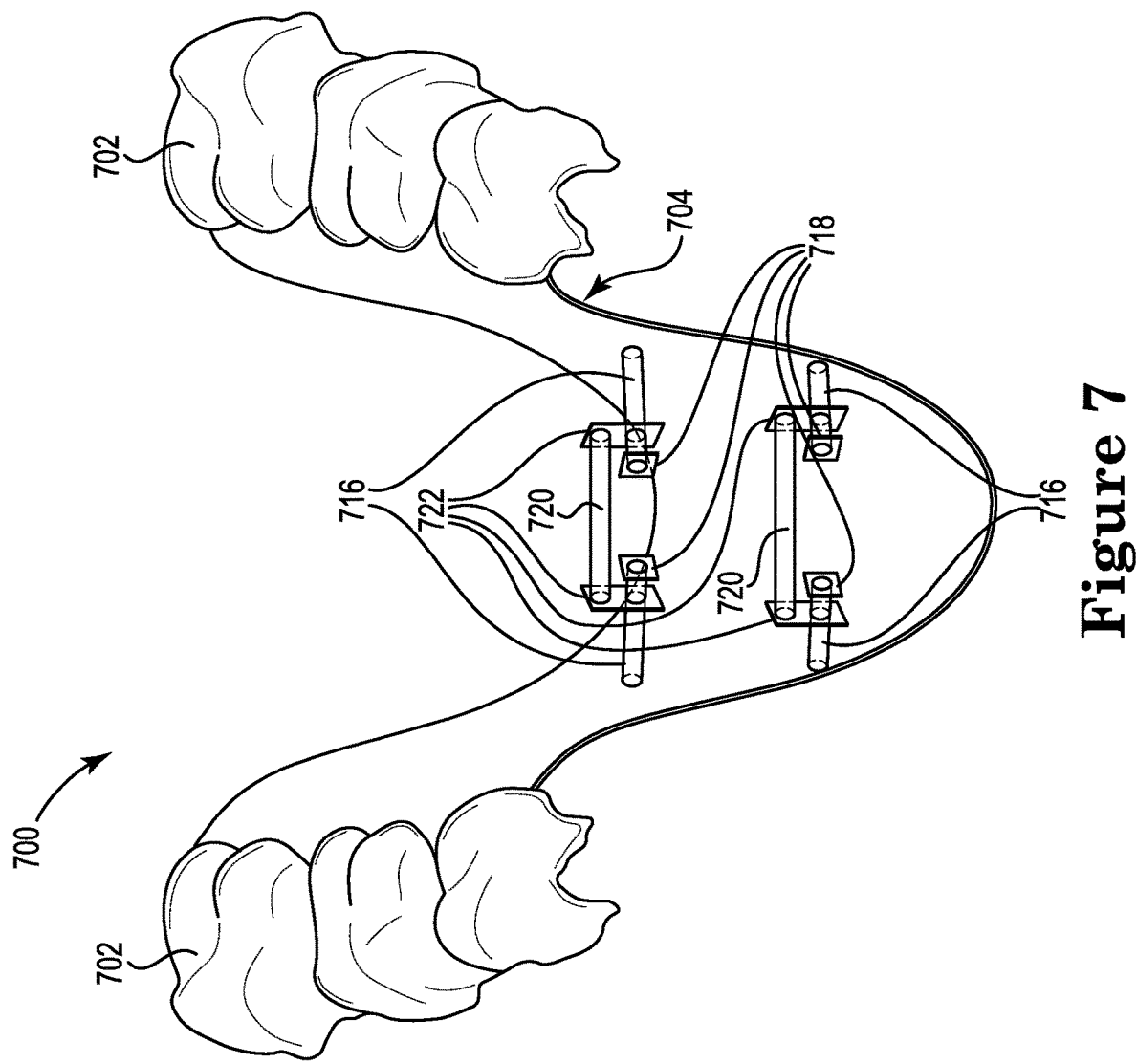
FIG. 7 illustrates an example of a removable arch adjustment appliance having a transpalatal element that includes a sliding stop mechanism according to a number of embodiments of the present disclosure.

FIG. 7 illustrates an example of a removable arch adjustment appliance having a transpalatal element that includes a sliding stop mechanism according to a number of embodiments of the present disclosure. As illustrated by the embodiment of FIG. 7, the appliance 700 can include a removable shell 702, a transpalatal element 704, two opposing members 716, tabs of the two opposing members 718, connection member 720, and tabs of the connection member 722.

The appliance 700 shown in FIG. 7 can be similar to the appliance previously described in connection to FIG. 1. For example, appliance 700 can include a removable shell 702 having a plurality of cavities formed therein, wherein the plurality of cavities are shaped to receive teeth of a patient and wherein the teeth include at least one molar on each side of a patient's jaw, and wherein the shell 702 includes an elastic transpalatal element 704 with a predetermined force characteristic that spans a palate of the patient, wherein the transpalatal element 704 provides force to expand at least one of the space between the molars on each side of a patient's jaw or the palate of the patient.

Appliance 700 can include a stop mechanism located on shell 702 that provides a mechanical force on the transpalatal element 704 of the shell 702 at a predefined expansion length of the transpalatal element 704. As used herein, a stop mechanism can provide a mechanical force on the transpalatal element 704 to reduce and/or prevent any further expansion of the space between the molars on each side of the patient's jaw and/or the palate of the patient after expansion of the space between the molars on each side of the patient's jaw and/or the palate of the patient by a predefined expansion length. That is, the mechanical force can reduce and/or counteract the force provided by the transpalatal element that expands the at least one of the space between the molars on each side of a patient's jaw or the palate of the patient.

The stop mechanism can be a sliding stop mechanism. As shown in FIG. 7, the sliding stop mechanism can include two opposing members 716 partially spanning, in a lingual direction, the transpalatal element 704 of the shell 702. Each of the opposing members 716 can include a tab 718, as will be further described herein.

The stop mechanism can include a connection member 720 connected to the two opposing members 716. The connection member 720 can include two tabs 722. The connection member 720 can be connected to the two opposing members 716 by way of the two tabs 722. For example, each of the two tabs 722 can include a hole large enough such that each of the two opposing members 716 may fit through each of the holes of the two tabs 722. This connection can allow for the two opposing members 716 and the connection member 720 to slide relative to each other during expansion of the appliance 700.

The two opposing members 716 and the connection member 720 can slide relative to each other during expansion of the appliance 700 until the predefined expansion length. That is, the two tabs 722 of the connection member 720 provide mechanical force on the transpalatal element 704 of the shell 702 by way of the two tabs 718 of the two opposing members 716 at the predefined expansion length that is equal to and opposite of the force provided by the transpalatal element 704 of the shell 702. In other words, the two tabs 722 stop expansion of the appliance 700 at the predefined expansion length, preventing the appliance 700 from over expanding the space between the molars on each side of the patient's jaw and/or the palate of the patient.

The components of the stop mechanism (e.g., two opposing members 716, tabs 718 of the two opposing members 716, connection member 720, and tabs 722 of the connection member 720) can be assembled by a one piece direct fabrication process. Alternatively, the components of the stop mechanism can be fabricated separately and then assembled.

The stop mechanisms can stop expansion of the appliance 700 at a predefined expansion length that can be based on a stage of a treatment plan. For example, a first appliance can include a first stop mechanism designed to stop expansion of the first appliance at a predefined expansion length based on a first stage of a treatment plan. A second appliance can include a second stop mechanism designed to stop expansion of the second appliance at a predefined expansion length based on a second stage of the treatment plan, where the predefined expansion lengths at each stage of the treatment plan can be different.

In an example embodiment, a system can include: a first appliance, of a series of appliances designed to incrementally implement a treatment plan, including a stop mechanism and a removable shell having a plurality of cavities formed therein and shaped to receive teeth of a patient and wherein the teeth include at least one molar on each side of a patient's jaw, wherein the shell includes an elastic transpalatal element with a predetermined force characteristic that spans a palate of the patient and provides force to expand at least one of a space between the molars on each side of a patient's jaw or the palate of the patient, and wherein the stop mechanism is located on the shell and provides a mechanical force on the transpalatal element of the shell of the first appliance at a predefined expansion length of the transpalatal element to reduce the force provided by the transpalatal element that expands the at least one of the space between the molars on each side of a patient's jaw or the palate of the patient. A second appliance, of the series of appliances, can include a stop mechanism and a removable shell having a plurality of cavities formed therein and shaped to receive teeth of a patient, wherein the shell includes an elastic transpalatal element with a predetermined force characteristic that spans a palate of the patient and provides force to expand at least one of the space between the molars on each side of a patient's jaw or the palate of the patient, and wherein the stop mechanism is located on the shell and provides a mechanical force on the transpalatal element of the shell of the first appliance at a predefined expansion length of the transpalatal element to reduce the force provided by the transpalatal element that expands the at least one of the space between the molars on each side of a patient's jaw or the palate of the patient.

Stop mechanisms of an arch adjustment appliance can help reduce the risk of over expansion of the space between the molars on each side of a patient's jaw or the palate of the patient. The reduced risk of over expansion can allow for different forces to be applied at stages of a treatment plan, which may shorten the length of a treatment plan and avoid discomfort and/or pain for the patient.

Figure 8:
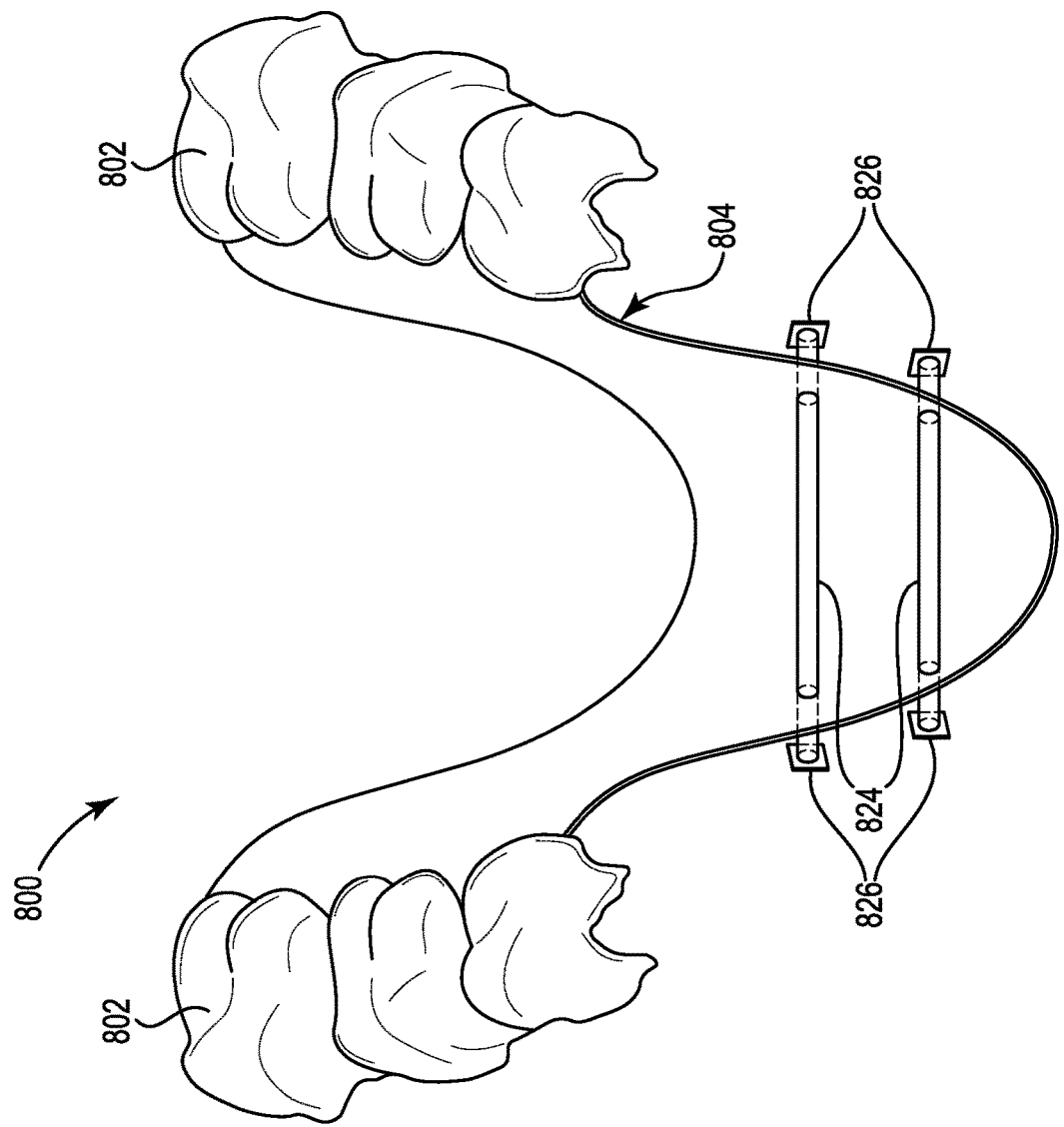
FIG. 8 illustrates an example of a removable arch adjustment appliance having a transpalatal element that includes a sliding stop mechanism according to a number of embodiments of the present disclosure.

FIG. 8 illustrates an example of a removable arch adjustment appliance having a transpalatal element that includes a sliding stop mechanism according to a number of embodiments of the present disclosure. As illustrated by the embodiment of FIG. 8, the appliance 800 can include a removable shell 802, a transpalatal element 804, spanning member 824, and tabs 826 of the spanning member 824.

Similar to the appliance described in connection with FIG. 7, appliance 800 can include a stop mechanism. The stop mechanism can be a sliding stop mechanism. As shown in FIG. 8, the sliding stop mechanism can include a member 824 spanning, in a lingual direction, the transpalatal element 804 of the shell 802. The member 824 can include tabs 826 on opposing sides of the member 824.

The transpalatal element 804 can include holes large enough such that the spanning member 824 may fit through each of the holes of the transpalatal element 804. This connection can allow for the transpalatal element 804 to slide along/relative to the spanning member 824 during expansion of the appliance 800.

The transpalatal element 804 can slide along/relative to the spanning member 824 during expansion of the appliance 800 up until the predefined expansion length. That is, the two tabs 826 of the spanning member 824 provide mechanical force on the transpalatal element 804 of the shell 802 at the predefined expansion length that is equal to and opposite of the force provided by the transpalatal element 804 of the shell 802. In other words, the two tabs 826 stop expansion of the appliance 800 at the predefined expansion length, preventing the appliance 800 from over expanding the space between the molars on each side of the patient's jaw and/or the palate of the patient, where the predefined expansion length can be based on a stage of a treatment plan.

The components of the stop mechanism (e.g., spanning member 824 and tabs 826 of the spanning member 824) can be assembled by a one piece direct fabrication process. Alternatively, the components of the stop mechanism can be fabricated separately and then assembled.

Figure 9:
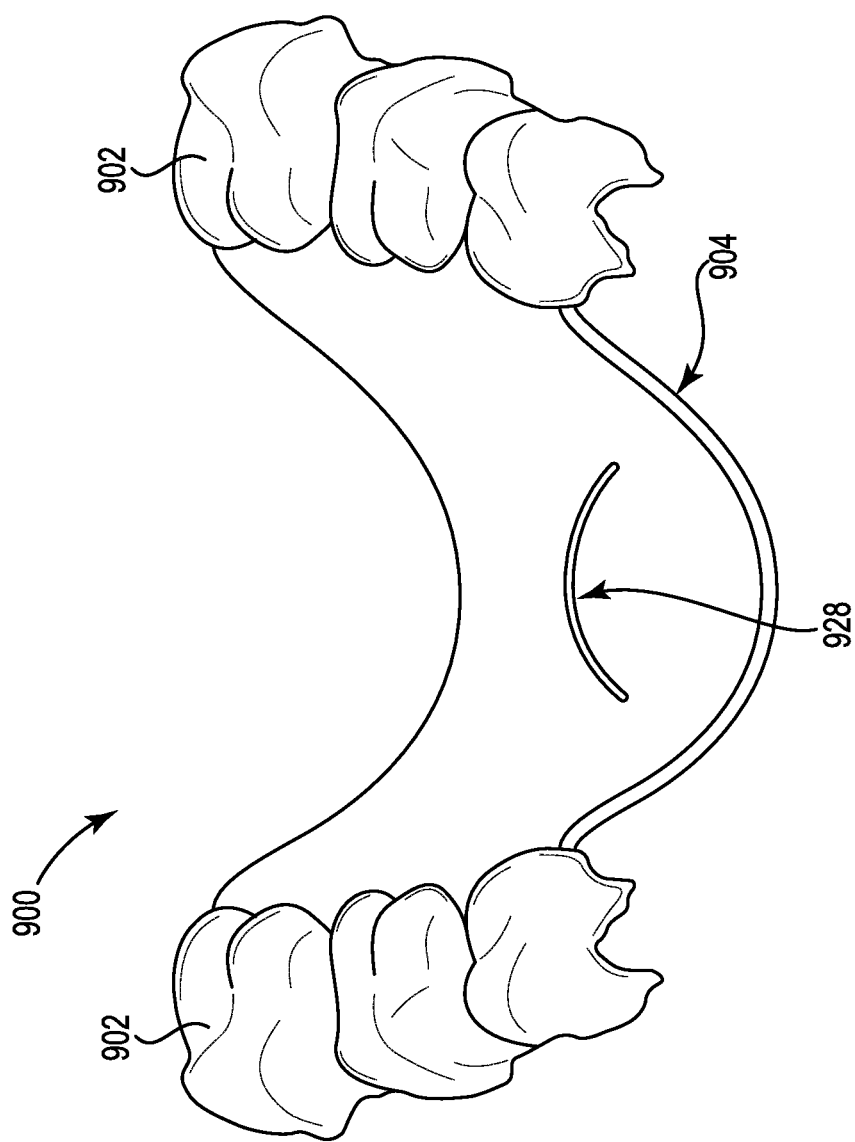
FIG. 9 illustrates an example of a removable arch adjustment appliance having a transpalatal element that includes a tension stop mechanism according to a number of embodiments of the present disclosure.

FIG. 9 illustrates an example of a removable arch adjustment appliance having a transpalatal element that includes a tension stop mechanism according to a number of embodiments of the present disclosure. As illustrated by the embodiment of FIG. 9, the appliance 900 can include a removable shell 902, a transpalatal element 904, and flexible member 928.

Appliance 900 can include a stop mechanism, such as a tension stop mechanism. As shown in FIG. 9, the tension stop mechanism can include a flexible member 928 that spans, in a lingual direction, the transpalatal element 904 of the shell 902. The flexible member 928 can be of different materials, such as fabric (e.g., a string), polymeric, metallic (e.g., a chain), etc.

The flexible member 928 can be slack when inserted into a patient's mouth for expansion of the space between the molars on each side of the patient's jaw and/or the palate of the patient. During expansion of the appliance 900, the flexible member 928 can become taut. That is, the flexible member 928 can provide mechanical force on the transpalatal element 904 of the shell 902 at the predefined expansion length that is equal to and opposite of the force provided by the transpalatal element 904 of the shell 902. In other words, the flexible member 928 stops expansion of the appliance 900 at the predefined expansion length, preventing the appliance 900 from over expanding the space between the molars on each side of the patient's jaw and/or the palate of the patient, where the predefined expansion length can be based on a stage of a treatment plan.

Figure 10:
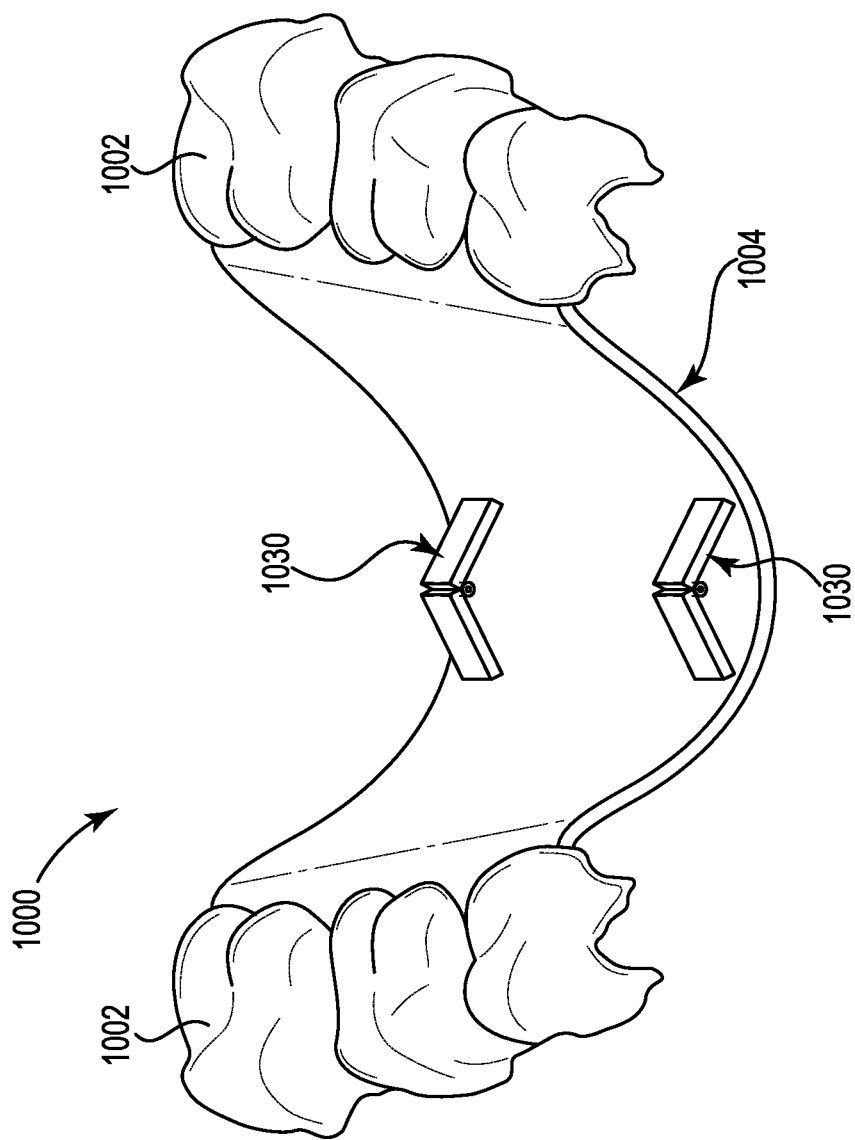
FIG. 10 illustrates an example of a removable arch adjustment appliance having a transpalatal element that includes a tension stop mechanism according to a number of embodiments of the present disclosure.

FIG. 10 illustrates an example of a removable arch adjustment appliance having a transpalatal element that includes a tension stop mechanism according to a number of embodiments of the present disclosure. As illustrated by the embodiment of FIG. 10, the appliance 1000 can include a removable shell 1002, a transpalatal element 1004, and one or more hinged members 1030.

Appliance 1000 can include a stop mechanism, such as a tension stop mechanism. As shown in FIG. 10, the tension stop mechanism can include one or more hinged members 1030 that spans, in a lingual direction, the transpalatal element 1004 of the shell 1002.

The one or more hinged members 1030 can be in a hinged orientation (e.g., not straight) when inserted into a patient's mouth for expansion of the space between the molars on each side of the patient's jaw and/or the palate of the patient. During expansion of the appliance 1000, the one or more hinged members 1030 can move to an unhinged orientation (e.g., is pulled upwards and straightens out) as the appliance 1000 expands. That is, the one or more hinged members 1030 can provide mechanical force on the transpalatal element 1004 of the shell 1002 at the predefined expansion length that is equal to and opposite of the force provided by the transpalatal element 1004 of the shell 1002. In other words, the one or more hinged members 1030 stop expansion of the appliance 1000 at the predefined expansion length, preventing the appliance 1000 from over expanding the space between the molars on each side of the patient's jaw and/or the palate of the patient, where the predefined expansion length can be based on a stage of a treatment plan.

Figure 11:
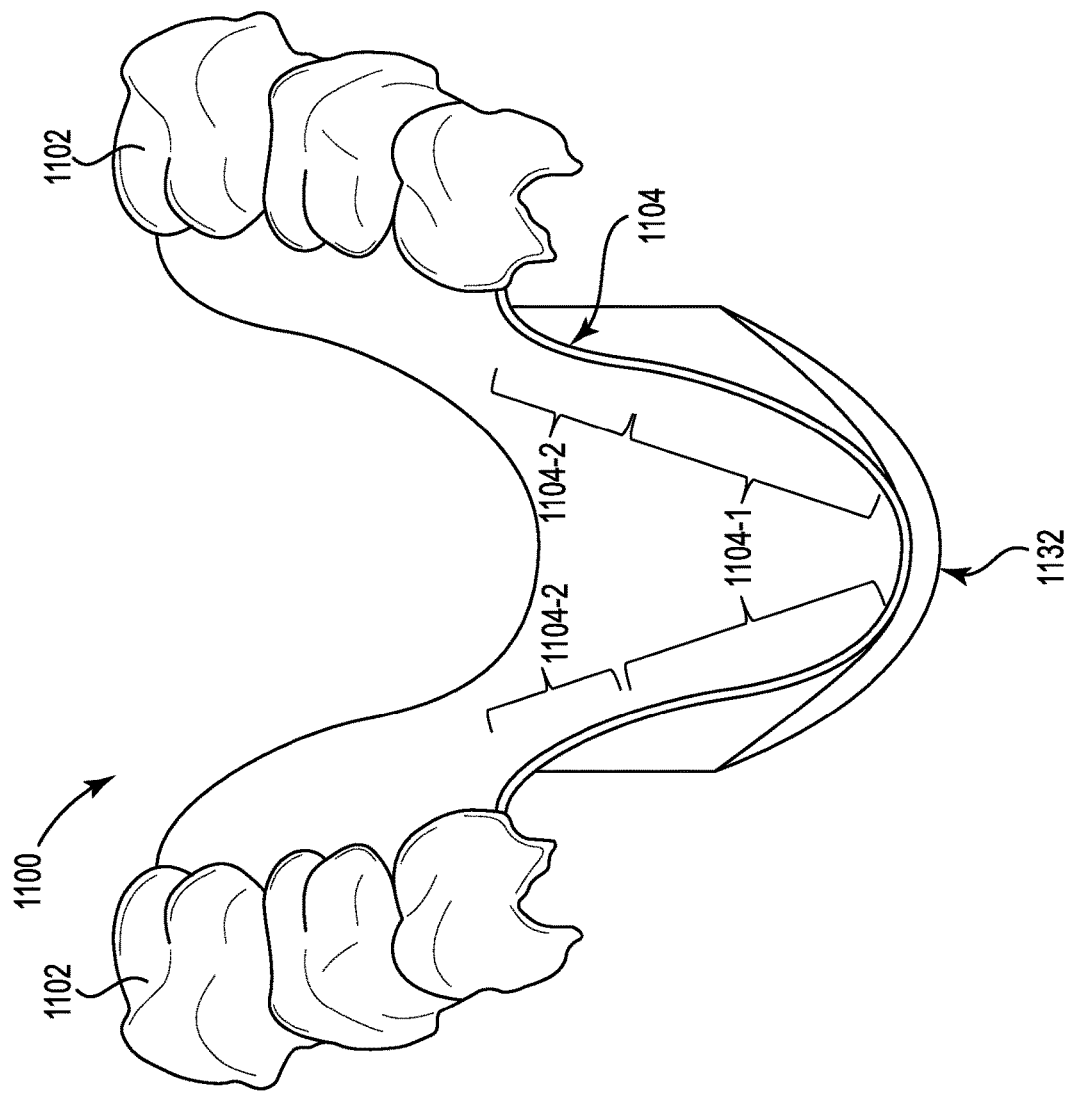
FIG. 11 illustrates an example of a removable arch adjustment appliance having a transpalatal element that includes a deflection limit stop mechanism according to a number of embodiments of the present disclosure.

FIG. 11 illustrates an example of a removable arch adjustment appliance having a transpalatal element that includes a deflection limit stop mechanism according to a number of embodiments of the present disclosure. As illustrated by the embodiment of FIG. 11, the appliance 1100 can include a removable shell 1102, a transpalatal element 1104, first portion of transpalatal element 1104-1, second portion of transpalatal element 11-4-2, and curved stop mechanism 1132.

Appliance 1100 can include a stop mechanism, such as a deflection limit stop mechanism. As shown in FIG. 11, the deflection limit stop mechanism can include a curved stop mechanism 1132 with substantially the same shape as the transpalatal element 1104 of the shell 1102. The curved stop mechanism 1132 can be located at the apex of the transpalatal element 1104 and on the side of the transpalatal element 1104 facing the palate of the patient. The curved stop mechanism 1132 can be of the same material as the transpalatal element 1104, or of a different material.

Prior to expansion of the appliance 1100 (e.g., as shown in FIG. 11), the transpalatal element 1104 does not lie next to (e.g., adjacent to) the curved stop mechanism 1132. During expansion of the appliance 1100, a first portion 1104-1 of the transpalatal element 1104 can become adjacent to the curved stop mechanism 1132, while a second portion 1104-2 of the transpalatal element 1104 can continue to expand. That is, the curved stop mechanism 1132 can provide mechanical force on the first portion 1104-1 of the transpalatal element 1104 of the shell 1102 at the predefined expansion length that is equal to and opposite of the force provided by the first portion 1104-1 of the transpalatal element 1104 of the shell 1102, where the second portion 1104-2 of the transpalatal element 1104 is uninhibited by the curved stop mechanism 1132. In other words, the curved stop mechanism 1132 stops expansion of the first portion 1104-1 of the transpalatal element 1104, while the second portion 1104-2 of the transpalatal element 1104 can continue to expand. The curved stop mechanism 1132 can stop expansion of the first portion 1104-1 at a predefined expansion length based on a stage of a treatment plan.

Allowing the second portion 1104-2 to continue to expand once the curved stop mechanism 1132 has prevented the first portion 1104-1 from expanding can allow for different force characteristics for the transpalatal element 1104. For example, the force provided by the second portion 1104-2 may be higher as the appliance 1100 continues to expand, which may be beneficial based on a stage of a treatment plan.

The first portion 1104-1 and the second portion 1104-2 can be the same length, or can be different lengths. For example, the first portion 1104-1 can be longer than the second portion 1104-2, or, alternatively, the first portion 1104-1 can be shorter than the second portion 1104-2. The lengths of the first portion 1104-1 and the second portion 1104-2 can depend on the force characteristic needed for expansion of the space between the molars on each side of the patient's jaw and/or the palate of the patient, and/or can be based on a stage of a treatment plan.

Although not shown in FIG. 11 for clarity and so as not to obscure embodiments of the present disclosure, the stop mechanism 1132 can be substantially planar in a lingual direction. The stop mechanism 1132 can include two protruding members on opposite sides of the planar stop mechanism, where the two protruding members are normal to the planar stop mechanism.

Prior to expansion of the appliance, the transpalatal element 1104 does not contact either of the protruding members. During expansion of the appliance 1100, a first portion 1104-1 of the transpalatal element 1104 can come into contact with the protruding members, while a second portion 1104-2 of the transpalatal element 1104 can continue to expand. That is, the protruding members can provide mechanical force on the first portion 1104-1 of the transpalatal element 1104 of the shell 1102 at the predefined expansion length that is equal to and opposite of the force provided by the first portion 1104-1 of the transpalatal element 1104 of the shell 1102, where the second portion 1104-2 of the transpalatal element 1104 is uninhibited by the protruding members. In other words, the protruding members can stop expansion of the first portion 1104-1 of the transpalatal element 1104, while the second portion 1104-2 of the transpalatal element 1104 can continue to expand. The protruding members can stop expansion of the first portion 1104-1 at a predefined expansion length based on a stage of a treatment plan.

Figure 12:
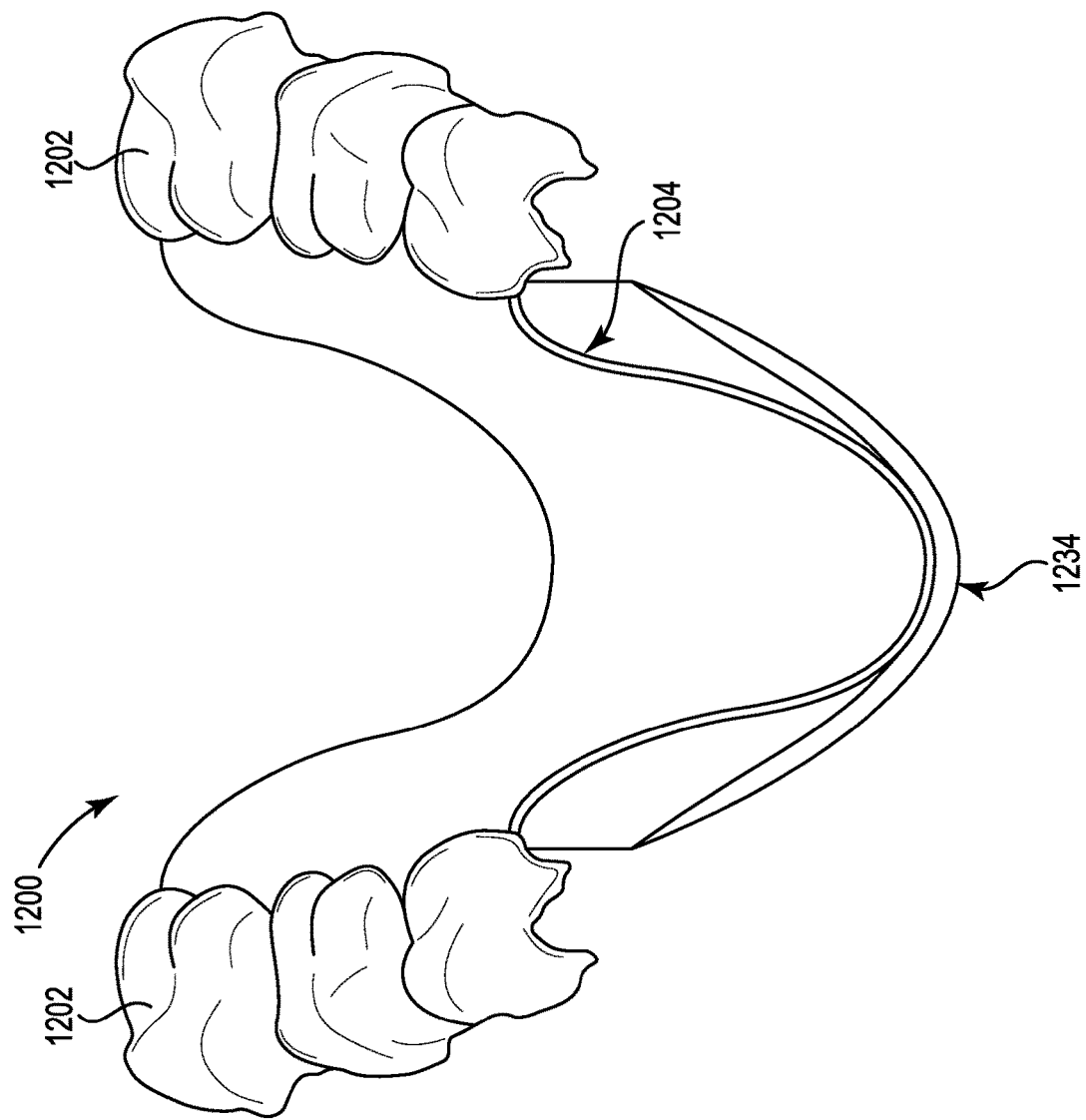
FIG. 12 illustrates an example of a removable arch adjustment appliance having a transpalatal element that includes a deflection limit stop mechanism according to a number of embodiments of the present disclosure.

FIG. 12 illustrates an example of a removable arch adjustment appliance having a transpalatal element that includes a deflection limit stop mechanism according to a number of embodiments of the present disclosure. As illustrated by the embodiment of FIG. 12, the appliance 1200 can include a removable shell 1202, a transpalatal element 1204, and curved stop mechanism 1234.

Appliance 1200 can include a stop mechanism, such as a deflection limit stop mechanism. As shown in FIG. 12, the deflection limit stop mechanism can include a curved stop mechanism 1234 with substantially the same shape as the transpalatal element 1204 of the shell 1202. The curved stop mechanism 1234 can be located at the apex of the transpalatal element 1204 and on the side of the transpalatal element 1204 facing the palate of the patient. The curved stop mechanism 1234 can be of the same material as the transpalatal element 1204, or of a different material.

Prior to expansion of the appliance 1200 (e.g., as shown in FIG. 12), the transpalatal element 1204 does not lie next to (e.g., adjacent to) the curved stop mechanism 1234. During expansion of the appliance 1200, the transpalatal element 1204 can gradually become adjacent to the curved stop mechanism 1234. That is, the curved stop mechanism 1234 can gradually provide mechanical force on the transpalatal element 1204 that is equal to and opposite of the force provided by the transpalatal element 1204 as the transpalatal element 1204 gradually becomes adjacent to the curved stop mechanism 1234. The mechanical force from the curved stop mechanism 1234 increases as the transpalatal element 1204 of the shell 1202 expands. In other words, the curved stop mechanism 1234 gradually stops expansion of the transpalatal element 1204 at the predefined expansion length, preventing the appliance 1200 from over expanding the space between the molars on each side of the patient's jaw and/or the palate of the patient, where the predefined expansion length can be based on a stage of a treatment plan.

Each of the stop mechanisms can be used in different stages of a treatment plan. For example, a sliding stop mechanism may be used in a first stage of a treatment plan, and a tension stop mechanism may be used in a second stage of the treatment plan. In other examples, different combinations of stop mechanisms (e.g., sliding stop mechanisms, tension stop mechanisms, and/or deflection limit stop mechanisms) may be used in different stages of a treatment plan.

Figure 13A:
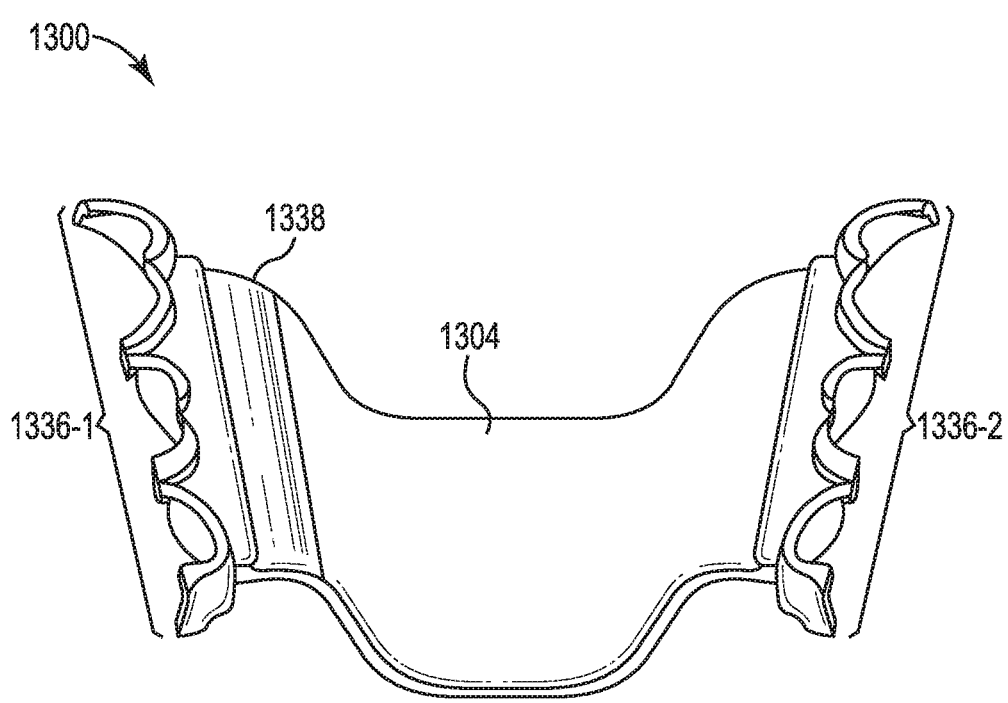
FIG. 13A illustrates a removable arch adjustment appliance including a regulating structure for a plurality of tooth engagement structures according to a number of embodiments of the present disclosure.

FIGS. 13A, 13B, 13C, 13D, and 13E illustrate examples of removable arch adjustment appliances according to a number of embodiments of the present disclosure. FIG. 13A illustrates a removable arch adjustment appliance including a regulating structure for a plurality of tooth engagement structures according to a number of embodiments of the present disclosure. As illustrated in FIG. 13A, the removable arch adjustment appliance 1300 does not have a shell with a plurality of cavities for the placement of teeth therein, but rather has a transpalatal element 1304, a first plurality of tooth engagement structures 1336-1 shaped to mate with molars of a patient along a first side of a dental arch of a patient, and a second plurality of tooth engagement structures 1336-2 shaped to mate with molars of a patient along a second side of the dental arch. Each of the individual tooth engagement structures is shaped to mate with a respective molar of the patient. As illustrated in FIG. 13A, each of the first plurality of tooth engagement structures 1336-1 and the second plurality of tooth engagement structures 1336-2 (referred to collectively as tooth engagement structures 1336) may extend along a portion of a side surface of a respective tooth of a patient. See FIGS. 13B-13C for contrasting examples of tooth engagement structures 1336.

The transpalatal element 1304 of the removable arch adjustment appliance 1300 can be configured to apply an expansion force via the tooth engagement structures 1336. The force can be applied outwardly from the transpalatal element 1304 in opposite directions via the first plurality of tooth engagement structures 1336-1 and via the second plurality of tooth engagement structures 1336-2 to expand a dental arch. The transpalatal element 1304 can expand across a surface of the mouth of the patient when the removable arch adjustment appliance 1300 is worn by the patient.

The transpalatal element 1304 can be shaped to span at least a portion of the surface of a patient's palate. In some embodiments, the transpalatal element 1304 can follow contours of a surface of the mouth of the patient when the removable arch adjustment appliance 1300 is worn by the patient. For example, the transpalatal element 1304 can be shaped to substantially follow the contours of the palate of the patient. This can be accomplished, for example, by scanning a mold of the surface of the palate of the patient or scanning the surface of the palate directly and then forming the surface of transpalatal element 1304 to substantially match the surface of the palate. The surfaces may not be identical, as the transpalatal element 1304 may be designed to be wider than the dental arch and therefore is not an identical copy of the scan data. As such, the surfaces may substantially match, but may not be identical.

The transpalatal element 1304 can be designed to expand a dental arch by applying an expansion force via the tooth engagement structures 1336. For example, such expansion can include moving the teeth of the patient to a wider position within the jaw, by expanding the palate of the patient, or a combination of the two. As indicated, some embodiments discussed herein may also expand the palate to a degree, but the dental expansion may be more gradual than some previous approaches (e.g., on the order of 0.5 mm per month as opposed to 0.5 mm per day). For instance, the width of the transpalatal element 1304 can be wider than the actual width of the dental arch in order to define the desired width of the dental arch. A width of a dental arch can be from molar to molar, from premolar to premolar, from canine to canine, or from any tooth on the left side to any tooth on the right side. For example, the width of the dental arch can include a distance between teeth of the left posterior side of the patient's dentition and teeth of the right posterior side of the patient's dentition. As an example, the transpalatal element 1304 can be 0.25 millimeters wider than the width of the dental arch. By the transpalatal element 1304 being wider than the width of the dental arch, it can apply force outwardly to the dental arch when worn by the patient.

The transpalatal element 1304 can have a width specific to a stage of a treatment plan. The transpalatal element 1304 can be designed to expand a dental arch to that specified width, which may be less than the full width to which the dental arch is to be expanded. The dental arch expansion can be incrementally accomplished by expanding the dental arch a little at a time over the use of several differently designed arch adjustment appliances according to the treatment plan. Or the dental arch may be over-expanded to compensate for incomplete biological response to the desired outcome, where the actual width of the dental arch is less than the width programmed or built into the stage(s) of the treatment plan which can provide a constant transverse expansion force to achieve slow palatal expansion.

The removable arch adjustment appliance 1300 can be flexible allowing it to be compressed enough such that the transpalatal element 1304 will fit within the dental arch and then begin to apply force via the tooth engagement structures 1336 once the compression is relaxed. For example, the patient can squeeze the removable arch adjustment appliance 1300 during insertion and then release the removable arch adjustment appliance 1300 after insertion, allowing force to be applied via the tooth engagement structures 1336.

The contours of the transpalatal element 1304 may be shaped in anticipation of a stretching of the palate during the expansion in order to better accommodate the seating of the removable arch adjustment appliance 1300 in the patient's mouth. The shape of the removable arch adjustment appliance 1300 can be designed to include an expected stretching of the patient's palate during dental expansion and/or a movement of the teeth. Such shaping can be achieved through treatment planning, as described herein, that accounts for expansion of the dental arch and/or movement of the teeth of the patient.

One side of the transpalatal element 1304 can be adjacent to and/or in contact with a tongue of the patient. The other side of the transpalatal element 1304 can be adjacent to and/or in contact with a surface of the patient's mouth (e.g., the palate of the patient's mouth). Using the scan data, the transpalatal element 1304 may be designed to contact the palate (e.g., if more support is desired) or it may be designed not to contact the palate (e.g., for patient comfort).

Design and fabrication of the removable arch adjustment appliance 1300 for some embodiments that include a transpalatal element 1304 that does not contact the palate can include raising the palatal contours in a vertical direction in a virtual or physical model of the palate so that any appliance which is formed over the physical model is slightly raised in comparison to the actual contours of the palate. In other words, a slight gap between the actual palate and the transpalatal element 1304 can be designed to be present. This gap allows the transpalatal element 1304 to apply force via the tooth engagement structures while not necessarily requiring an exact fit of the transpalatal element 1304 to the contours of the palate. Such a slight offset in the vertical dimension can reduce any disruption in speech, swallowing, or feel due to changes in tongue position that may otherwise result from wearing the removable arch adjustment appliance 1300. Raising the vertical dimension of the transpalatal element 1304 has the benefit of not needing perfect modeling of any non-linear stretching that might take place in the palate. This can greatly reduce the risk of uncomfortable pressure spots and sores caused by the removable arch adjustment appliance 1300. Having to relieve pressure spots in the appliance can be very time consuming for the doctor, and if the appliance is thin to begin with, such adjustments can lead to weakened areas in the appliance.

The removable arch adjustment appliance 1300 can include a regulating structure 1338. In FIG. 13A, the removable arch adjustment appliance 1300 includes a regulating structure on only one side of the removable arch adjustment appliance 1300. The regulating structure 1338 is illustrated generically in FIGS. 13A-13E and specifically in FIGS. 14-19. The discussion of the regulating structure 1338 with respect to FIGS. 13A-13E applies to each of the embodiments illustrated and described with respect to FIGS. 13A-19. The discussion of the regulating structures in FIGS. 14-19 may be specific to those individual embodiments.

Figure 13B:
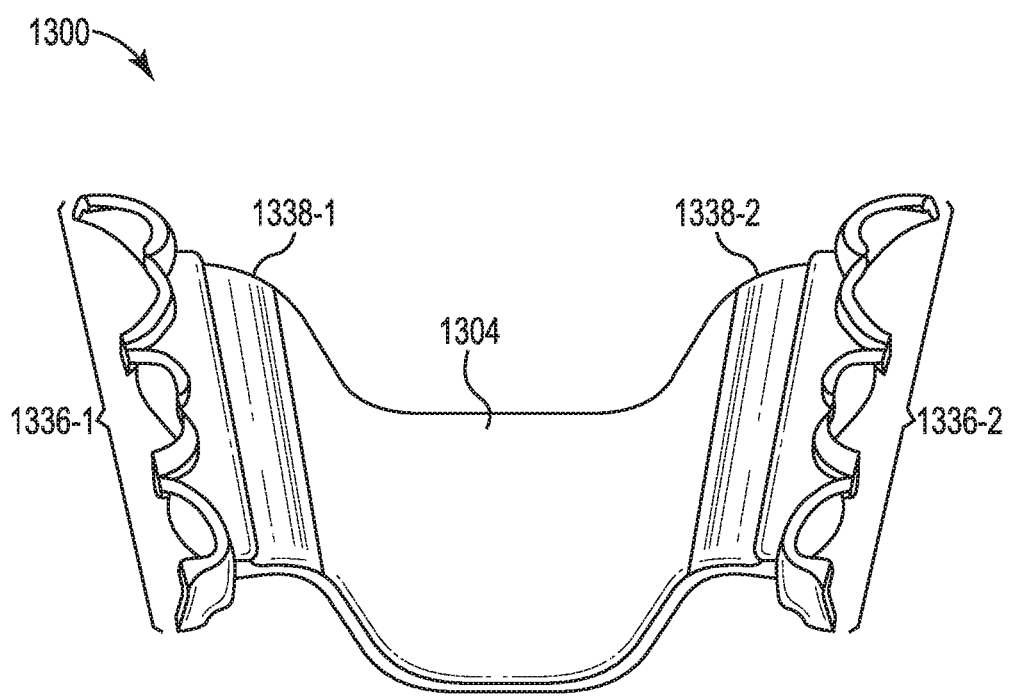
FIG. 13B illustrates a removable arch adjustment appliance including regulating structures for a plurality of tooth engagement structures according to a number of embodiments of the present disclosure.

FIG. 13B illustrates a removable arch adjustment appliance including regulating structures for a plurality of tooth engagement structures according to a number of embodiments of the present disclosure. The removable arch adjustment appliance 1300 can include a first regulating structure 1338-1 and a second regulating structure 1338-2 (referred to collectively as regulating structures 1338). In contrast to FIG. 13A, the removable arch adjustment appliance 1300 in FIG. 13B includes more than one regulating structure 1338. Although the remainder of the figures illustrate appliances with more than one regulating structure 1338, embodiments are not so limited as the removable arch adjustment appliance 1300 can include only one regulating structure 1338 in any embodiment.

The first regulating structure 1338-1 connected between the transpalatal element 1304 and the first plurality of tooth engagement structures 1336-1 is configured to balance and direct the expansion force from the transpalatal element 1304 to the first plurality of tooth engagement structures 1336-1. The second regulating structure 1338-2 connected between the transpalatal element 1304 and the second plurality of tooth engagement structures 1336-2 is configured to balance and direct the expansion force from the transpalatal element 1304 to the first plurality of tooth engagement structures 1336-2. The tooth engagement structures 1336 can contact at least one of a surface of a tooth or a surface of the patient's gingiva and impart a force thereto. The force imparted to the teeth or gingiva can originate from the transpalatal element 1304 and be balanced and directed to the tooth engagement structures 1336 via the regulating structures 1338. The first plurality of tooth engagement structures 1336-1 can be collectively connected to the first regulating structure 1338-1 and the second plurality of tooth engagement structures 1336-2 can be collectively connected to the second regulating structure 1338-2.

As noted above, applying an expansion force to more than one tooth on each side of the dental arch can result in uneven movement of the teeth, which may yield an undesired dental arch shape during the dental arch expansion process. For example, the roots of the teeth that are to be moved during the expansion process may begin to shift under different amounts of pressure (e.g., some teeth may be more strongly rooted than others). The regulating structures 1338 can balance and direct the expansion force so that the teeth move more evenly and the dental arch expansion process maintains a proper or desired shape of the dental arch. Such a balanced and directed application of the force generated by the transpalatal element 1304 can help prevent different teeth from moving differently in the first place. Furthermore, even if one tooth starts to move before the other teeth to which the expansion force is being applied, a regulating structure 1338 can balance the portion of the expansion force that is being generated by the transpalatal element 1304 for one side of the dental arch such that it is applied more evenly to the teeth.

In some embodiments, the tooth engagement structures 1336, the regulating structures 1338, and the transpalatal element 1304 of the removable arch adjustment appliance 1300 can comprise a unitary body. In this manner, a removable arch adjustment appliance 1300 can be formed that has two or more distinct material properties, but is unitary in nature (e.g., forms a single body that can be used by the patient even though it is formed of two or more materials). A material property can be a chemical property such as that of a composition or mixture or a physical property, such as a weight, elasticity, strength, etc. In various embodiments, the tooth engagement structures 1336, the regulating structures 1338, and the transpalatal element 1304 of the removable arch adjustment appliance 1300 can be fabricated from one material. In some embodiments, the removable arch adjustment appliance 1300 can be fabricated from multiple materials or can be manufactured in parts wherein the parts are made from different materials and are attached together to create the removable arch adjustment appliance 1300. Portions of the removable arch adjustment appliance 1300 may not be visible to people when they see the removable arch adjustment appliance 1300 in the patient's mouth and as such the material does not have to be clear, and this therefore allows for more options with regard to the choice of material that can be utilized.

In some embodiments, the transpalatal element 1304 can be formed of a first material and from a second material that is a different than the first material in at least one physical property. For example, the first material may be a polyurethane material and the second material may also be a polyurethane material with the same chemical formula, but of different hardness or rigidity due to greater crosslinking. Or, the first material can be of one chemical composition (e.g., polyurethane), and the second material of an entirely different chemical composition (e.g., polyvinyl chloride). In some embodiments, the second material is more resilient than the first material. This can be beneficial in embodiments, for example, where there is an initial need for a more rigid transpalatal element 1304 and then a more resilient transpalatal element 1304 later in treatment, among other situations where such an embodiment may be utilized.

In some embodiments, the second material can include, for instance, a more rigid material than the first material designed to provide greater resistance and/or force in a transverse direction against the posterior teeth (e.g., molars and bicuspids) of the dental arch. In various embodiments, this second material can be designed to impart force to the molars and/or other teeth on the jaw of the patient in order to either help preserve or change the transverse dimensions of the dental arch.

Rather than providing a strong force, such as 10 to 50 N for a short period of a few days to a few weeks, embodiments of the present disclosure can provide a lesser force, such as 3 to 9 N via the transpalatal element 1304, for a longer period, such as a month to six months. This force can be used, for example, to move palatal plates, move teeth outward, and/or maintain the teeth and/or jaw in a particular orientation while musculature and bone are adjusting to the orientation and to prevent movement of the teeth or jaw back toward their initial orientation. For example, a challenge of such an appliance is the need to retain the expansion while the bone is filling into the suture, long after the active expansion has taken place. The active expansion process may be completed within 2 or 3 weeks' time, but the retention period can last around 6 months while waiting for the gap between the maxillary halves to fill in with new bony tissue.

In some embodiments, a plurality of removable arch adjustment appliances 1300 can be worn by a patient successively to achieve gradual expansion (or constriction) of the dental arch. For instance, each of a plurality of arch adjustment appliances can include an incrementally wider width to expand the dental arch in incremental distances. In some such embodiments, since this dental arch expansion technique can be accomplished concurrently with other orthodontic treatments, the dental arch expansion can be accomplished over a series of removable arch adjustment appliances 1300 that will be utilized, for example, over a period of less than six months, thereby making any pain and/or discomfort of the patient more consistent and less arbitrary without prolonging the overall time for orthodontic treatment.

A physical model of the patient's oral anatomy can be created from a virtual model of the patient's oral anatomy. The patient's oral anatomy can include, for example, a number of teeth and interconnecting tissue, such as gingiva and/or the palate. The virtual model can be created from data obtained from scanning the patient's oral anatomy directly or from scanning a mold (e.g., a plaster mold) of the patient's oral anatomy. The virtual model can be modified to create a treatment plan that can identify the patient, define various stages of the treatment plan and corresponding variations of the virtual model specific to each stage.

In some embodiments, the physical model can be manufactured by using a Computer-aided Design (CAD) virtual model file in a rapid prototyping process, such as, for example, a Computer-aided manufacturing (CAM) milling, stereolithography, 3D printing, fused deposition modeling (FDM), selective laser sintering (SLS), and/or photolithography process. Advantages of such techniques can include, for example, that multiple materials can be used in a single build, various cross sectional thickness's can be designed and built for rigidity, and easy fabrication of a complex geometry of the oral anatomy. The virtual model can be hollowed out or "shelled" before it is sent for manufacturing to save on material cost if printed, for example.

In some embodiments, the removable arch adjustment appliance 1300, or a portion thereof, can be formed using a thermoforming and/or vacuum forming process. For example, one or more sheets of polymeric material can be thermoformed and/or vacuum formed over the physical model. A sheet may be heated and multiple sheets may be heated to different temperatures. In some examples, the sheets may be layered. A sheet can have varying thicknesses (beyond natural variations in thickness during the shaping process as it conforms to the mold shape) in some portions to provide increased or reduced strength or other physical material properties across the removable arch adjustment appliance 1300. The removable arch adjustment appliance 1300 and/or parts thereof may be transparent, semi-transparent, or opaque in such a way as to emulate a natural tooth shade.

In some embodiments, the removable arch adjustment appliance 1300, or a portion thereof, can be formed by a rapid prototyping process, such as, for example, by a Computer-aided manufacturing (CAM) milling, stereolithography, 3D printing, fused deposition modeling (FDM), selective laser sintering (SLS), and/or photolithography. Advantages of such techniques can include, for example, that multiple materials can be used in a single build, various cross sectional thickness's can be designed and built for rigidity, and easy fabrication of a complex organic geometry.

Figure 13C:
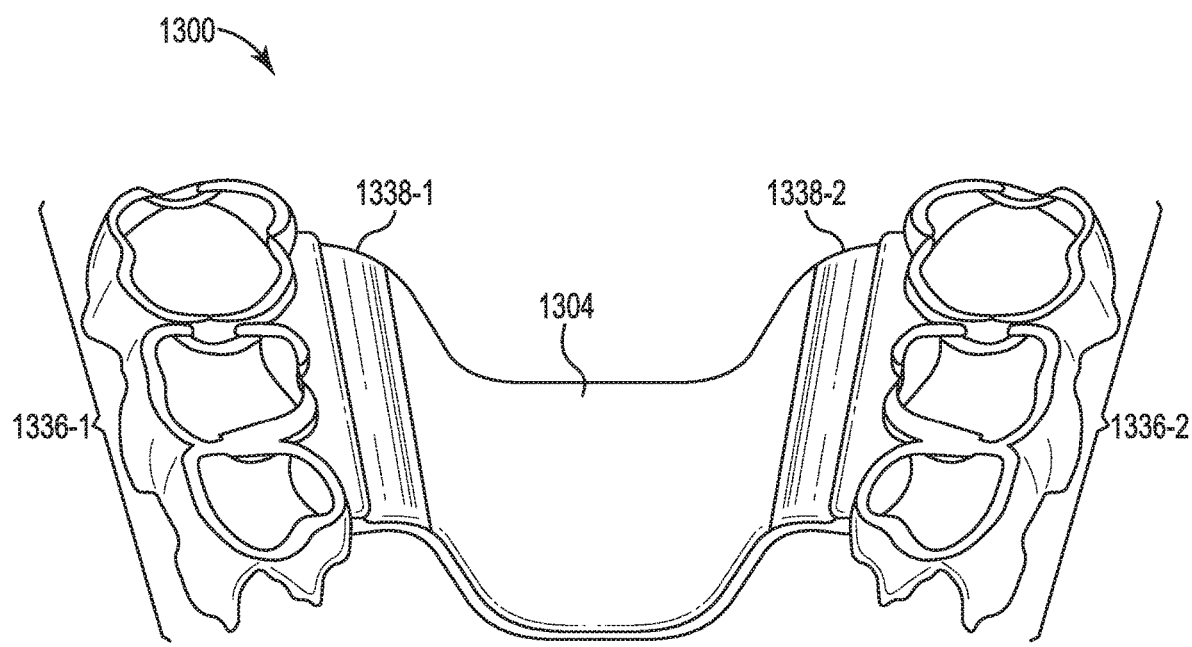
FIG. 13C illustrates a removable arch adjustment appliance including regulating structures for a plurality of tooth engagement structures according to a number of embodiments of the present disclosure.

FIG. 13C illustrates a removable arch adjustment appliance including regulating structures for a plurality of tooth engagement structures according to a number of embodiments of the present disclosure. The removable arch adjustment appliance 1300 illustrated and described with respect to FIG. 13C is analogous to the removable arch adjustment appliance 1300 illustrated and described with respect to FIG. 13B, except that the tooth engagement structures 1336 are slightly different. In the embodiment illustrated in FIG. 13C, the first plurality of tooth engagement structures 1336-1 are shaped to mate with the molars of the patient along the first side of the dental arch by extending substantially around the side surfaces of the molars. Likewise, the second plurality of tooth engagement structures 1336-2 are shaped to mate with the molars of the patient along the second side of the dental arch by extending substantially around the side surfaces of the molars. For example, the tooth engagement structures 1336 can extend around the entire side surfaces of the molars to surround the molars. Such embodiments may provide a more secure fit for the removable arch adjustment appliance 1300 in the mouth of the patient, may be able to impart more force, and may be able to control application of that force in one or more directions with respect to a particular tooth. This may, in some instances, allow the position or orientation of a tooth to be adjusted while the removable arch adjustment appliance 1300 is expanding the palate of the patient.

Figure 13D:
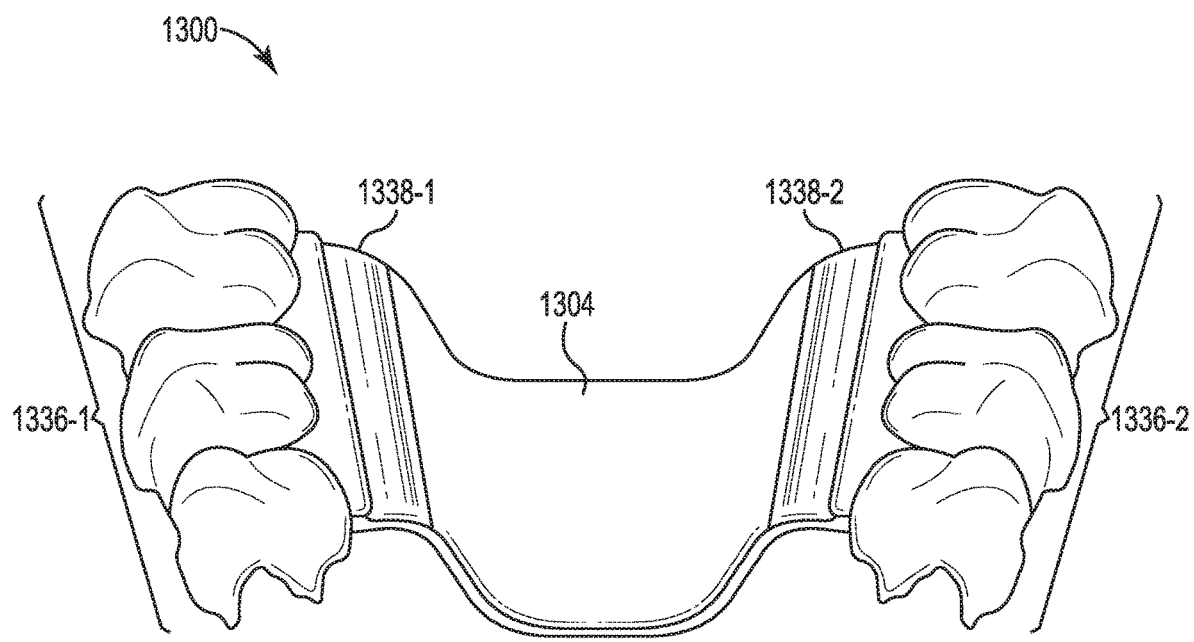
FIG. 13D illustrates a removable arch adjustment appliance including regulating structures for a plurality of tooth engagement structures according to a number of embodiments of the present disclosure.

FIG. 13D illustrates a removable arch adjustment appliance including regulating structures for a plurality of tooth engagement structures according to a number of embodiments of the present disclosure. The removable arch adjustment appliance 1300 illustrated and described with respect to FIG. 13D is analogous to the removable arch adjustment appliance 1300 illustrated and described with respect to FIG. 13B, except that the tooth engagement structures 1336 are slightly different. In the embodiment illustrated in FIG. 13D, the first plurality of tooth engagement structures 1336-1 comprise cavities that are shaped to mate with the molars of the patient along the first side of the dental arch. Each of the cavities can be shaped to receive a respective molar and to mate with side surfaces and an occlusal surface of the molar. Such embodiments may provide a more secure fit for the removable arch adjustment appliance 1300 in the mouth of the patient, may be able to impart more force, and may be able to control application of that force in one or more directions with respect to a particular tooth. This may, in some instances, allow the position or orientation of a tooth to be adjusted while the removable arch adjustment appliance 1300 is expanding the palate of the patient.

In some embodiments, the removable arch adjustment appliance 1300 can be overlaid over an existing appliance used to adjust tooth positioning and/or orientation. For example, in an embodiment such as the one illustrated in FIG. 13D, the tooth engagement structures 1336 (cavities) can be sized to fit over cavities of an aligner appliance used for aligning one or more teeth or a retainer appliance used to maintain the position of one or more teeth. The aligner appliance and/or the removable arch adjustment appliance 1300 may have features thereon to lock the two appliances together or they may be affixed together by other means (e.g., frictionally and/or via adhesives, etc.).

Figure 13E:
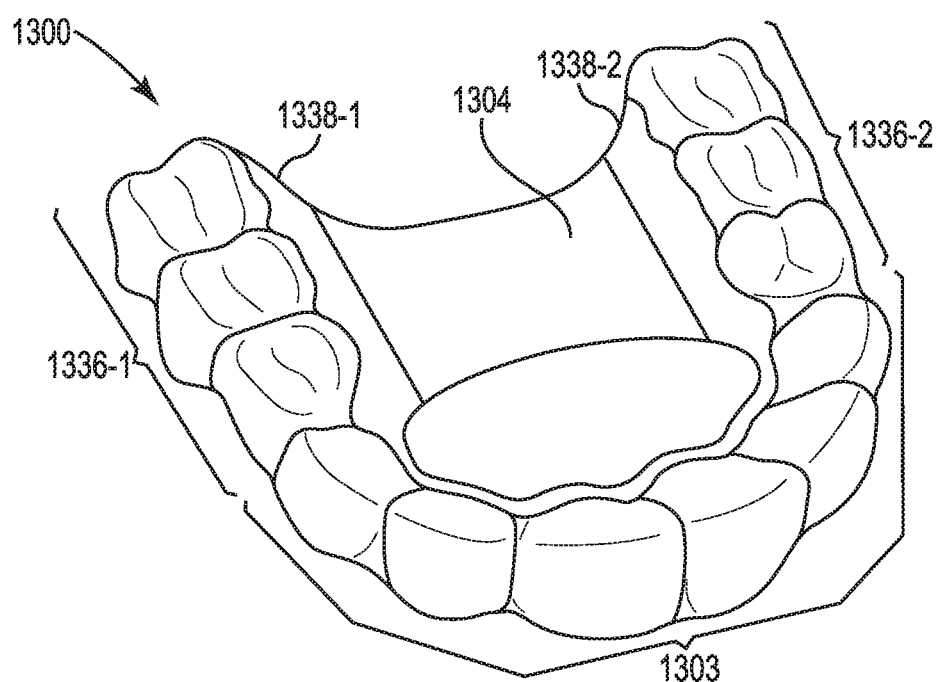
FIG. 13E illustrates a removable arch adjustment appliance including cavities and regulating structures for a plurality of tooth engagement structures according to a number of embodiments of the present disclosure.

FIG. 13E illustrates a removable arch adjustment appliance including cavities and regulating structures for a plurality of tooth engagement structures according to a number of embodiments of the present disclosure. The removable arch adjustment appliance 1300 illustrated and described with respect to FIG. 13E is analogous to the removable arch adjustment appliance 1300 illustrated and described with respect to FIG. 13D, except that the removable arch adjustment appliance 1300 further comprises a shell including a plurality of cavities 1303 shaped to receive other teeth of the patient (e.g., premolars, canines, incisors). The plurality of cavities 1303, the first plurality of tooth engagement structures 1336-1, and the second plurality of tooth engagement structures 1336-2, which are also cavities in this embodiment, form an arch of the removable arch adjustment appliance 1300 that corresponds to the dental arch. In this embodiment, the tooth engagement structures 1336 are part of the shell along with the plurality of cavities.

The shell can be formed of a material having resilient properties that generally conforms to the other teeth of the patient, but is slightly out of alignment with a current tooth configuration of the patient to provide force to change the current tooth configuration. The shell may be designed to fit over a number of, or in many instances all, teeth present in the jaw. The shell can include an interior surface (e.g., adjacent to a surface of the teeth place therein) and an exterior surface. The interior surface is configured to receive and a apply forces to the teeth therein to reposition a number of teeth of the patient, for example. Force can also be applied outwardly from the transpalatal element 1304 in opposite directions via the tooth engagement structures 1336 as balanced and directed by the regulating structures 1338 to expand a dental arch. In some embodiments, the removable arch adjustment appliance 1300 can be used for repositioning the number of teeth of the patient concurrently with expansion of the dental arch.

The simultaneous treatment of misalignment of a patient's dental arch in conjunction with teeth alignment issues (e.g., rotation, tipping, etc.) can, for example, potentially eliminate a second phase of what would otherwise be a two phase treatment protocol, make the second phase less complex or a little more comfortable for the patient, or shorten treatment times when compared to current linear two-phase treatment protocols that first treat the misalignment of a patient's dental arch followed by treatment of misalignment of the patient's teeth. The transpalatal element 1304 can, in accordance with a number of embodiments, avoid and/or not interfere with engagement of the shell with the teeth therein and thereby allow for correction of various tooth misalignment issues during the dental arch expansion process so that both dental arch expansion and alignment correction occurs in tandem rather than as separate phases.

In some embodiments of the present disclosure, a particular removable arch adjustment appliance 1300 can be specific to a stage of a treatment plan. For instance, the treatment plan can call for a series of removable arch adjustment appliance 1300 designed to incrementally implement the treatment plan. Each of the series of removable arch adjustment appliance 1300 can be specific to a stage of the incremental treatment plan, for instance. The series can be used for treating misalignment of teeth of a patient and/or misalignment of one or more dental arches. In some such embodiments, one dental arch can be expanded while the other dental arch is not expanded or both dental arches can be expanded simultaneously. Or one dental arch can be expanded while the other one is contracted.

A system of removable arch adjustment appliances 1300 can include a shell having a plurality of cavities 1303 shaped to receive teeth of a patient, a transpalatal element 1304 configured to apply an expansion force via the shell in a transverse direction, and a regulating structure 1338 connected between the transpalatal element 1304 and the shell and configured to balance and direct the expansion force from the transpalatal element 1304 to the shell according to a particular stage of a treatment plan.

The transpalatal element 1304 can have a width specific to a particular stage of a treatment plan. For example, a system can include a plurality of removable arch adjustment appliances 1300 designed to incrementally implement the treatment plan. The transpalatal element 1304 of a first removable arch adjustment appliance 1300 can have a width specific to a first stage of the treatment plan and the transpalatal element 1304 of a second removable arch adjustment appliance 1300 can have a width specific to a second stage of the treatment plan. For example, the second removable arch adjustment appliance 1300 can be designed to provide force to move at least one of the teeth and to apply the expansion force via the shell concurrently. The regulating structure 1338 of the second removable arch adjustment appliance 1300 can be a same type or a different type of regulating structure 1338 as that of the first removable arch adjustment appliance 1300. FIGS. 14-19 illustrate some specific examples of different types of regulating structures 1338.

In some embodiments, a removable arch adjustment appliance 1300 can be formed by thermoforming. For example, a removable shell can be formed over a set of molded teeth. The removable shell can include a plurality of cavities 103 formed therein, as well as the tooth engagement structures 1336. The regulating structures 1338 and the transpalatal element 1304 can be formed of the same material as the removable shell or different materials. The regulating structures 1338 and the transpalatal element 1304 can be connected to the removable shell to form the removable arch adjustment appliance 1300.

The connection can be achieved by thermoforming the removable shell over the set of molded teeth with at least a portion of the regulating structures 1338 placed within the set of molded teeth (e.g., encapsulated). The connection can be achieved via direct fabrication of the regulating structures 1338 and the transpalatal element 1304 from a virtual model, then by fusing the components together (e.g., ultrasonic welding). The connection can be achieved by adhering the regulating structures 1338 and the transpalatal element 1304 using an agent (e.g., a binding material) subsequent to forming the regulating structures 1338, the transpalatal element 1304, and the removable shell. In some embodiments, the regulating structures 1338 can be thermoformed with the material removable shell and later have portions of the material removed to provide the functionality of the regulating structures (e.g., as in the embodiment illustrated in FIGS. 18A-18B).

FIGS. 14-19 illustrate arch adjustment appliances that are analogous to the removable arch adjustment appliances 1300 illustrated in FIGS. 13A-13E, except that specific examples of the regulating structures are illustrated. For ease of illustration and explanation, the appliances illustrated in FIGS. 14-18 are shown including tooth engagement structures analogous to those illustrated in FIG. 13B. However, embodiments are not so limited, as the embodiments of FIGS. 14-19 can include tooth engagement structures analogous to those illustrated in FIGS. 13C-13D. Likewise, the embodiments of FIGS. 14-19 can include a shell analogous to that illustrated and described with respect to FIG. 13E.

Figure 14:
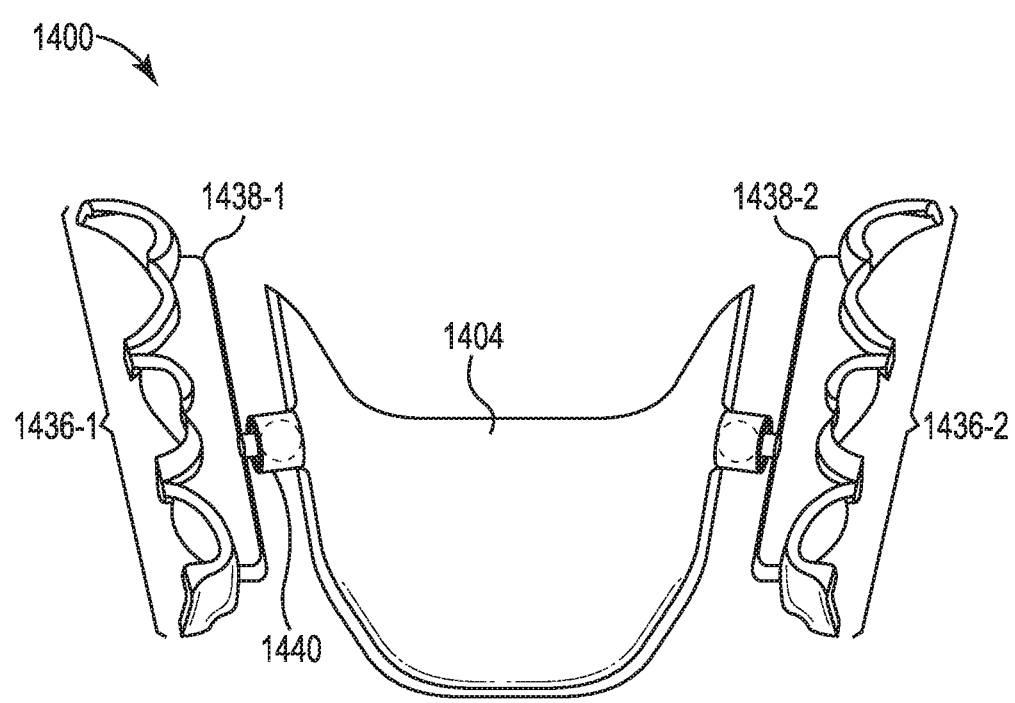
FIG. 14 illustrates a removable arch adjustment appliance including a regulating structure comprising a ball joint according to a number of embodiments of the present disclosure.

FIG. 14 illustrates an arch adjustment appliance including a regulating structure comprising a ball joint according to a number of embodiments of the present disclosure. As illustrated in FIG. 14, the removable arch adjustment appliance 1400 includes a transpalatal element 1404, a first plurality of tooth engagement structures 1436-1, a second plurality of tooth engagement structures 1436-2, a first regulating structure 1438-1, and a second regulating structure 1438-2. In the embodiment of FIG. 14, the regulating structures 1438 comprise ball joints 1440.

The regulating structures 1438 can balance and direct the expansion force so that the teeth move more evenly and the dental arch expansion process maintains a proper or desired shape of the dental arch. The ball joints 1440 add three degrees of freedom (rotation) for the regulating structures 1438 versus a solid plane between the transpalatal element 1404 and the tooth engagement structures 1436. This allows rolling, pitching, and yawing of the tooth engagement structures 1436 relative to the transpalatal element 1404 to apply force more evenly to the patient's teeth.

Figure 15:
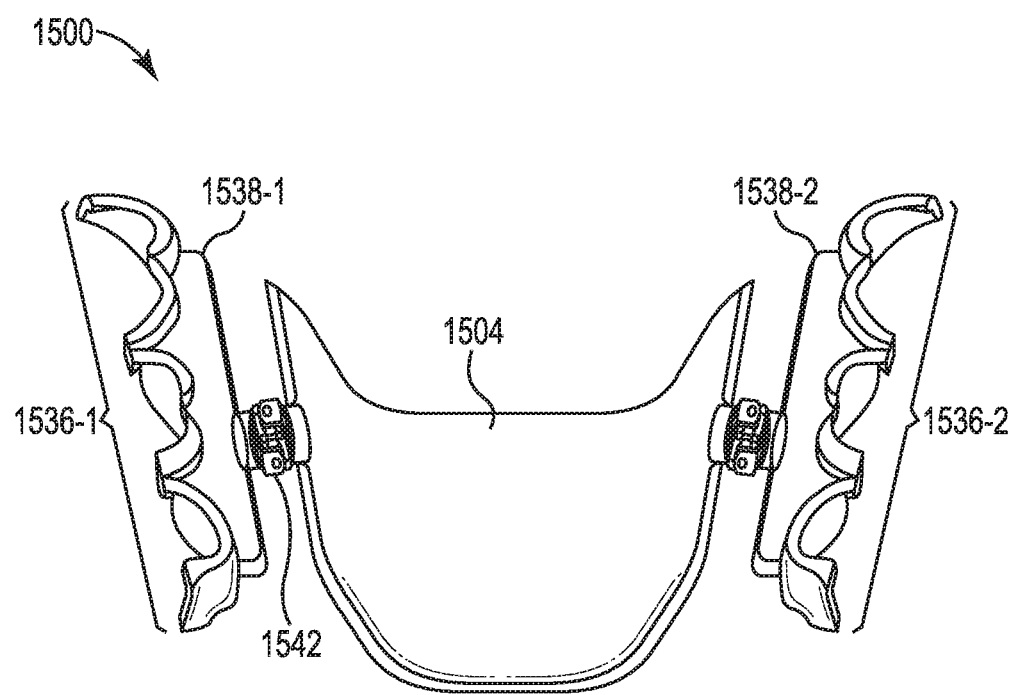
FIG. 15 illustrates a removable arch adjustment appliance including a regulating structure comprising a universal joint according to a number of embodiments of the present disclosure.

FIG. 15 illustrates an arch adjustment appliance including a regulating structure comprising a universal joint according to a number of embodiments of the present disclosure. As illustrated in FIG. 15, the removable arch adjustment appliance 1500 includes a transpalatal element 1504, a first plurality of tooth engagement structures 1536-1, a second plurality of tooth engagement structures 1536-2, a first regulating structure 1538-1, and a second regulating structure 1538-2. In the embodiment of FIG. 15, the regulating structures 1538 comprise universal joints 1542.

The regulating structures 1538 can balance and direct the expansion force so that the teeth move more evenly and the dental arch expansion process maintains a proper or desired shape of the dental arch. The universal joints 1542 add three degrees of freedom (rotation) for the regulating structures 1538 versus a solid plane between the transpalatal element 1504 and the tooth engagement structures 1536. This allows rolling, pitching, and yawing of the tooth engagement structures 1536 relative to the transpalatal element 1504 to apply force more evenly to the patient's teeth.

Figure 16:
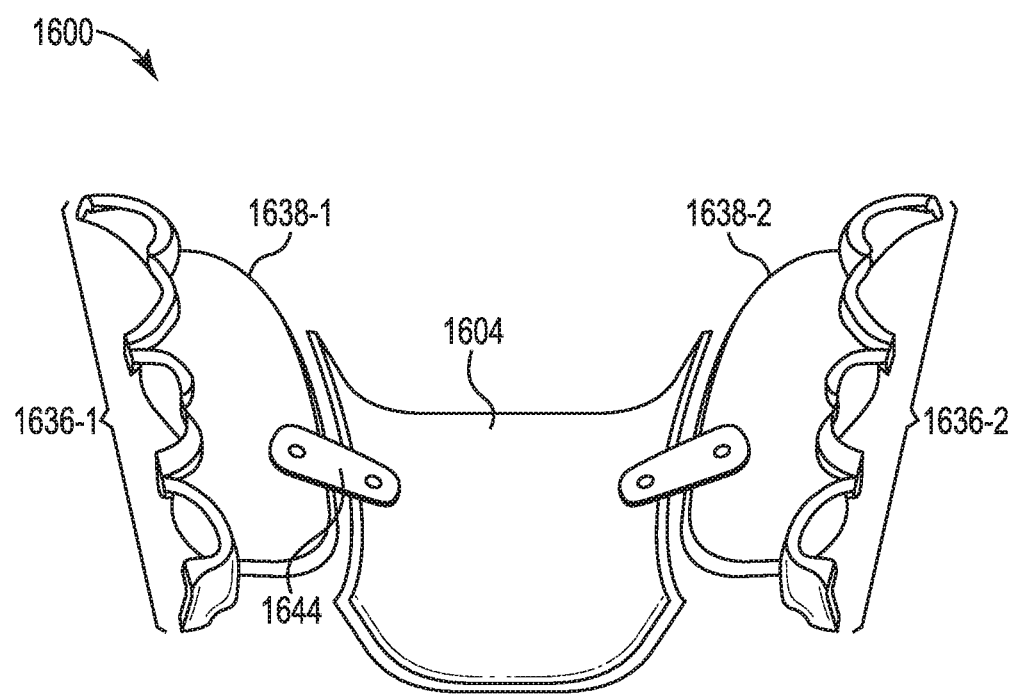
FIG. 16 illustrates a removable arch adjustment appliance including a regulating structure comprising an arm according to a number of embodiments of the present disclosure.

FIG. 16 illustrates an arch adjustment appliance including a regulating structure comprising an arm according to a number of embodiments of the present disclosure. As illustrated in FIG. 16, the removable arch adjustment appliance 1600 includes a transpalatal element 1604, a first plurality of tooth engagement structures 1636-1, a second plurality of tooth engagement structures 1636-2, a first regulating structure 1638-1, and a second regulating structure 1638-2. In the embodiment of FIG. 16, the regulating structures 1638 each comprise an arm 1644. The arms 1644 can be pinned to the toot engagement structures 1636 and fixed to the transpalatal element 1604.

The regulating structures 1638 can balance and direct the expansion force so that the teeth move more evenly and the dental arch expansion process maintains a proper or desired shape of the dental arch. The arms 1644 add one degree of freedom (rotation) for the regulating structures 1638 versus a solid plane between the transpalatal element 1604 and the tooth engagement structures 1636. This allows for rotation of the tooth engagement structures 1636 relative to the transpalatal element 1604 to apply force more evenly to the patient's teeth.

Figure 17:
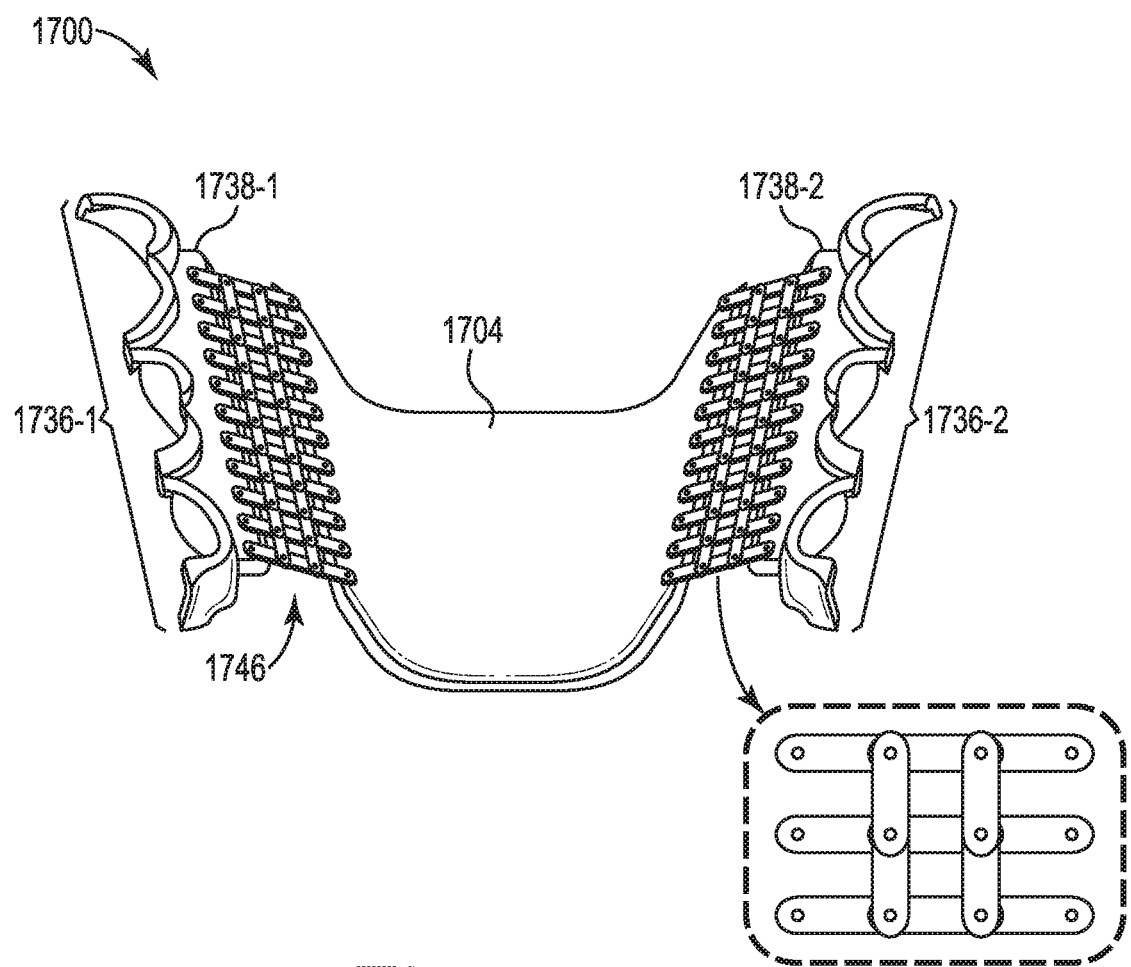
FIG. 17 illustrates a removable arch adjustment appliance including a regulating structure comprising a mesh of arms according to a number of embodiments of the present disclosure.

FIG. 17 illustrates an arch adjustment appliance including a regulating structure comprising a mesh of arms according to a number of embodiments of the present disclosure. As illustrated in FIG. 17, the removable arch adjustment appliance 1700 includes a transpalatal element 1704, a first plurality of tooth engagement structures 1736-1, a second plurality of tooth engagement structures 1736-2, a first regulating structure 1736-1, and a second regulating structure 1736-2. In the embodiment of FIG. 17, the regulating structures 1736 comprise meshes of arms 1746. The meshes of arms 1746 can have pinned connections between the arms.

The regulating structures 1736 can balance and direct the expansion force so that the teeth move more evenly and the dental arch expansion process maintains a proper or desired shape of the dental arch. The meshes of arms 1746 add two degrees of freedom (one translation and one rotation) for the regulating structures 1736 versus a solid plane between the transpalatal element 1704 and the tooth engagement structures 1736. This allows for rotation and translation of the tooth engagement structures 1736 relative to the transpalatal element 1704 to apply force more evenly to the patient's teeth.

Figure 18A:
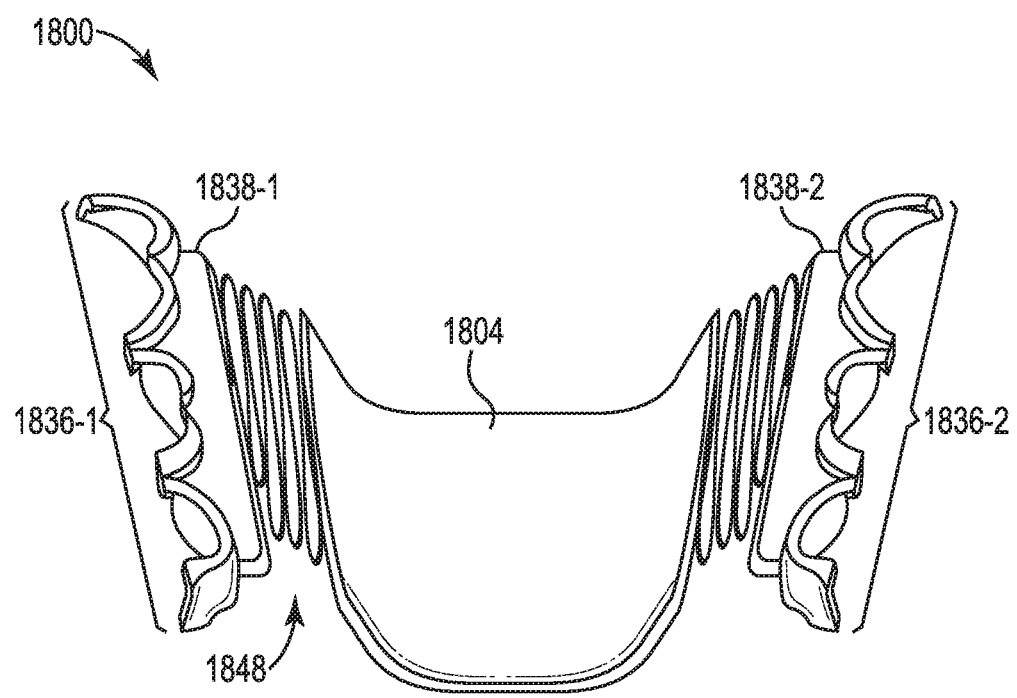
FIG. 18A illustrates a removable arch adjustment appliance including a regulating structure comprising a horizontal accordion spring according to a number of embodiments of the present disclosure.
Figure 18B:
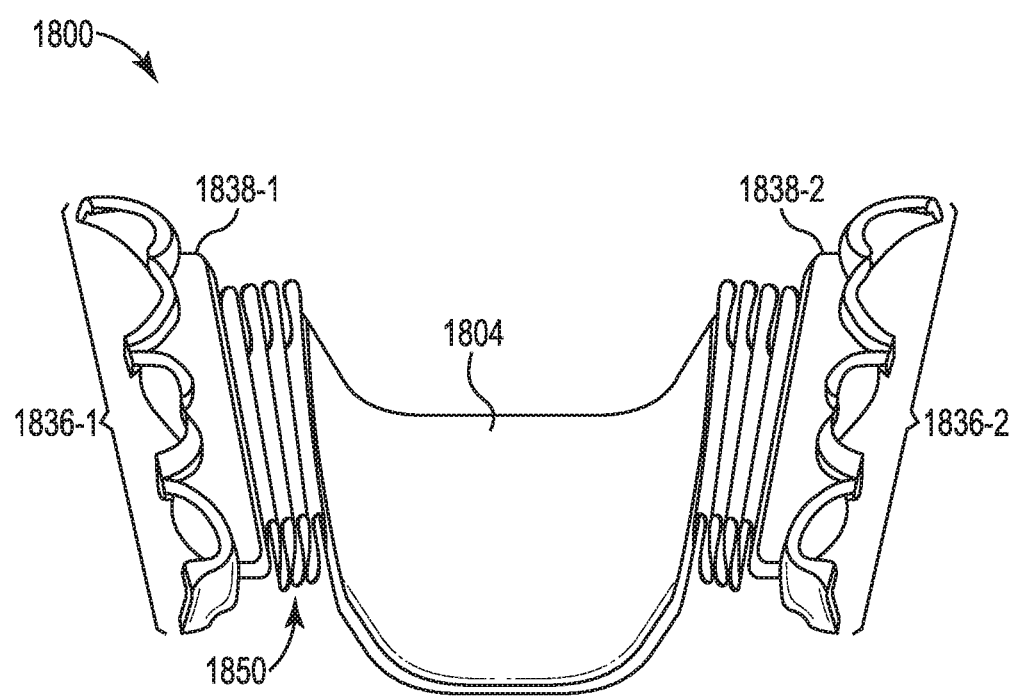
FIG. 18B illustrates a removable arch adjustment appliance including a regulating structure comprising a vertical accordion spring according to a number of embodiments of the present disclosure.

FIG. 18A illustrates an arch adjustment appliance including a regulating structure comprising a horizontal accordion spring according to a number of embodiments of the present disclosure. FIG. 18B illustrates a removable arch adjustment appliance including a regulating structure comprising a vertical accordion spring according to a number of embodiments of the present disclosure. As illustrated in FIGS. 18A-18B, the removable arch adjustment appliance 1800 includes a transpalatal element 1804, a first plurality of tooth engagement structures 1836-1, a second plurality of tooth engagement structures 1836-2, a first regulating structure 1838-1, and a second regulating structure 1838-2. In the embodiment of FIG. 18A, the regulating structures 1838 comprise a portion of the removable arch adjustment appliance 1800 with areas of material removed therefrom yielding a shape and functionality of a horizontal accordion spring 1848. In the embodiment of FIG. 18B, the regulating structures 1838 comprise a portion of the removable arch adjustment appliance 1800 with areas of material removed therefrom yielding a shape and functionality of a vertical accordion spring 1850.

The regulating structures 1838 can balance and direct the expansion force so that the teeth move more evenly and the dental arch expansion process maintains a proper or desired shape of the dental arch. The horizontal accordion springs 1848 or the vertical accordion springs 1850 add two degrees of freedom (one translation and one rotation) for the regulating structures 1838 versus a solid plane between the transpalatal element 1804 and the tooth engagement structures 1836. This allows for rotation and translation of the tooth engagement structures 1836 relative to the transpalatal element 1804 to apply force more evenly to the patient's teeth.

Figure 19:
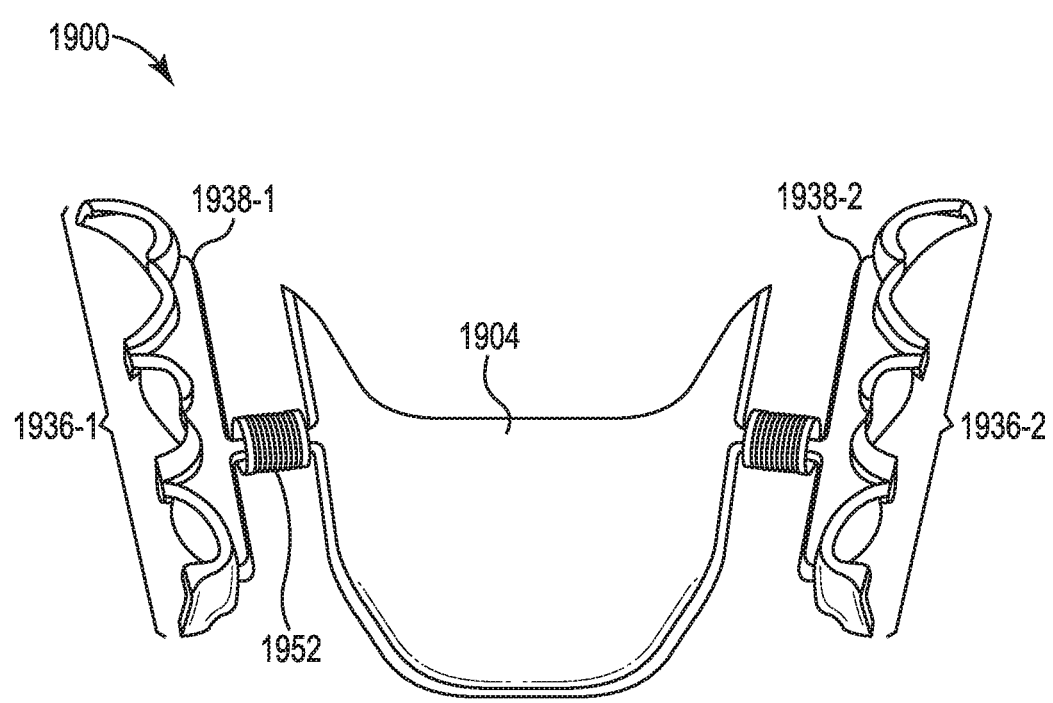
FIG. 19 illustrates a removable arch adjustment appliance including a regulating structure comprising a coupling spring according to a number of embodiments of the present disclosure.

FIG. 19 illustrates a removable arch adjustment appliance including a regulating structure comprising a coupling spring according to a number of embodiments of the present disclosure. As illustrated in FIG. 19, the removable arch adjustment appliance 1900 includes a transpalatal element 1904, a first plurality of tooth engagement structures 1936-1, a second plurality of tooth engagement structures 1936-2, a first regulating structure 1938-1, and a second regulating structure 1938-2. In the embodiment of FIG. 19, the regulating structures 1938 comprise coupling springs 1952.

The regulating structures 1938 can balance and direct the expansion force so that the teeth move more evenly and the dental arch expansion process maintains a proper or desired shape of the dental arch. The transpalatal arch element 1904 can terminate in a first shaft proximal to the first regulating structure 1938-1. The first plurality of tooth engagement structures 1936-1 can terminate in a second shaft proximal to the first regulating structure 1938-1. The coupling spring 1952 can dampen misalignment between the first shaft and the second shaft.

Figure 20:
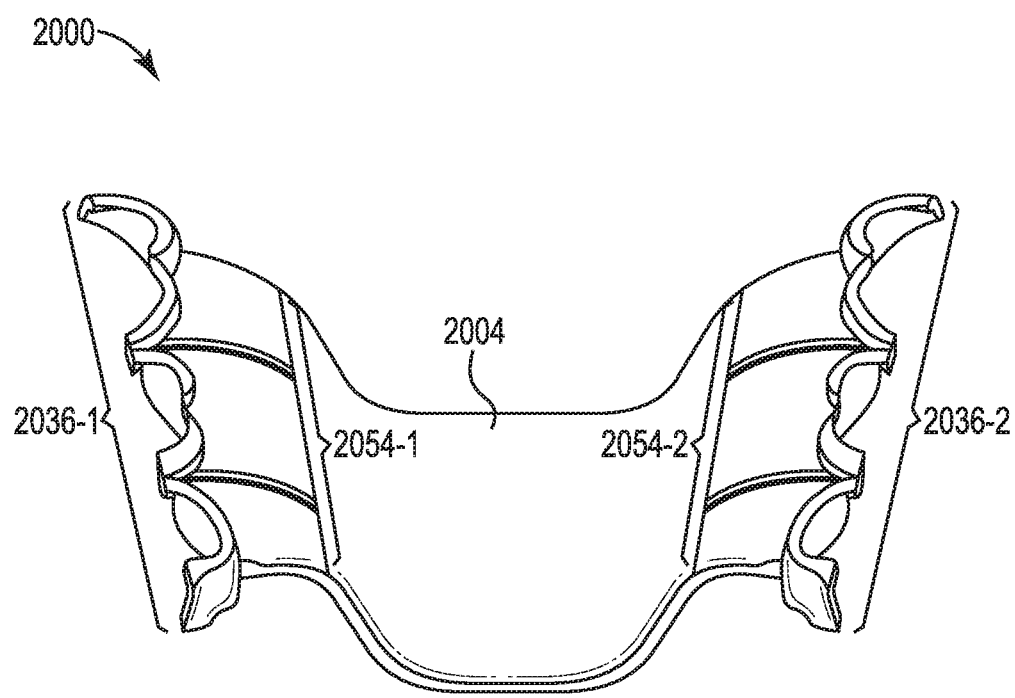
FIG. 20 illustrates a removable arch adjustment appliance including regulating structures for individual tooth engagement structures according to a number of embodiments of the present disclosure.

FIG. 20 illustrates a removable arch adjustment appliance including regulating structures for individual tooth engagement structures according to a number of embodiments of the present disclosure. The removable arch adjustment appliance 2000 can include a first plurality of tooth engagement structures 2036-1 shaped to mate with molars of a patient along a first side of a dental arch. The removable arch adjustment appliance 2000 can include a second plurality of tooth engagement structures 2036-2 shaped to mate with molars of the patient along a second side of the dental arch. The tooth engagement structures 2036 are analogous to the tooth engagement structures 1336 illustrated and described with respect to FIGS. 13A-13D. Although illustrated as being analogous to those in FIGS. 13A-13B, the tooth engagement structures of FIGS. 13C-13D can alternatively be a part of the removable arch adjustment appliance 2000 in FIG. 20. Likewise, although not specifically illustrated, the appliance 2000 can include a shell analogous to that illustrated and described with respect to FIG. 13E.

The removable arch adjustment appliance 2000 includes a transpalatal element 2004 configured to apply an expansion force via the first plurality of tooth engagement structures 2036-1 and to the second plurality of tooth engagement structures 2036-2. The transpalatal element 2004 is analogous to the transpalatal element illustrated and described with respect to FIGS. 13A-13E.

The removable arch adjustment appliance 2000 can include a first plurality of regulating structures 2054-1 each connected between the transpalatal element 2004 and a respective one of the first plurality of tooth engagement structures 2036-1. Each of the first plurality of tooth engagement structures 2054-1 is configured to balance and direct the expansion force from the transpalatal element 2004 via a respective one of the first plurality of tooth engagement structures 2036-1 to a respective tooth of the patient.

The removable arch adjustment appliance 2000 can include a second plurality of regulating structures 2054-2 each connected between the transpalatal element 2004 and a respective one of the second plurality of tooth engagement structures 2036-2. Each of the second plurality of tooth engagement structures 2054-2 is configured to balance and direct the expansion force from the transpalatal element 2004 via a respective one of the second plurality of tooth engagement structures 2036-2 to a respective tooth of the patient.

The first plurality of regulating structures 2054-1 are individually connected to the first plurality of tooth engagement structures 2036-1 and the second plurality of regulating structures 2054-2 are individually connected to the second plurality of tooth engagement structures 2036-2. Thus, the removable arch adjustment appliance 2000 is analogous to the removable arch adjustment appliance 1300 illustrated and described with respect to FIGS. 13A-13E, except that the first plurality of regulating structures 2054-1 and the second plurality of regulating structures 2054-2 (referred to collectively as regulating structures 2054) are individually connected to respective tooth engagement structures 2036 in the removable arch adjustment appliance 2000 as opposed to being collectively connected to the tooth engagement structures 1336 on either side of the dental arch in the removable arch adjustment appliance 1300. Individually connecting the regulating structures 2054 to the tooth engagement structures 2036 can allow for more individualized application of the force from the transpalatal element 2004 via the tooth engagement structures 2036 to the teeth of the patient versus having a single regulating structure for the tooth engagement structures 2036.

The regulating structures 2054 are illustrated generically in FIG. 20 and specifically in FIGS. 21-25. The discussion of the regulating structures 2054 with respect to FIG. 20 applies to each of the embodiments illustrated and described with respect to FIGS. 21-25. The discussion of the regulating structures in FIGS. 21-25 may be specific to those individual embodiments.

FIGS. 21-25 illustrate arch adjustment appliances that are analogous to the removable arch adjustment appliance 2000 illustrated and described with respect to FIG. 20, except that specific examples of the regulating structures are illustrated. For ease of illustration and explanation, the appliances illustrated in FIGS. 21-25 are shown including tooth engagement structures analogous to those illustrated in FIGS. 13A-13B. However, embodiments are not so limited, as the embodiments of FIGS. 21-25 can include tooth engagement structures analogous to those illustrated in FIGS. 13C-13D. Likewise, the embodiments of FIGS. 21-25 can include a shell analogous to that illustrated and described with respect to FIG. 13E.

Figure 21:
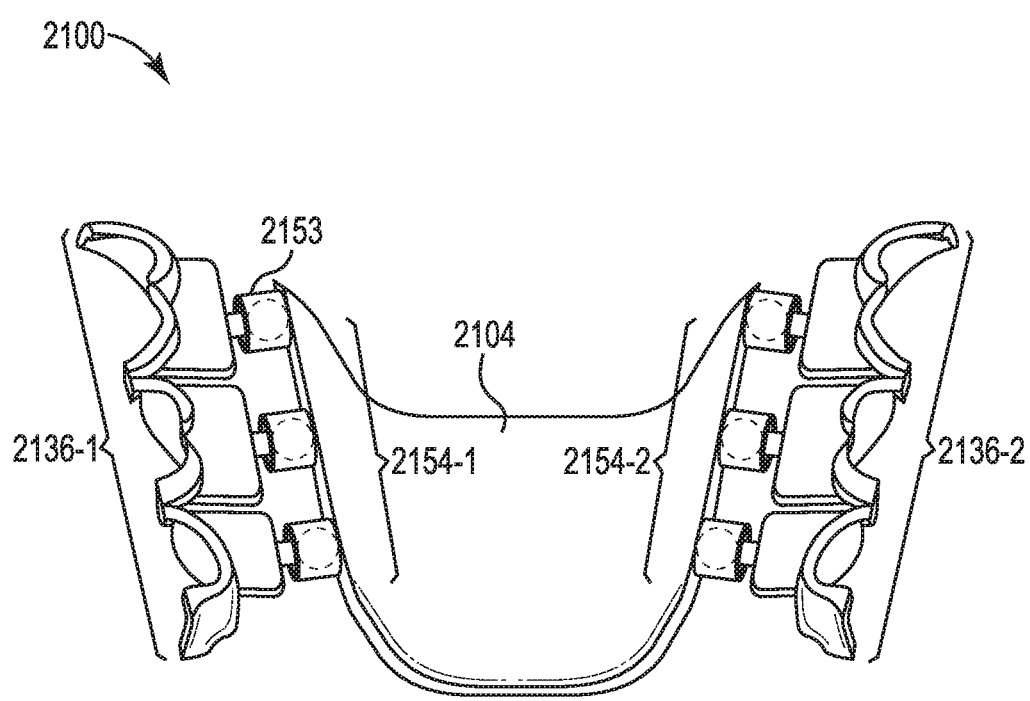
FIG. 21 illustrates a removable arch adjustment appliance including regulating structures for individual tooth engagement structures comprising ball joint s according to a number of embodiments of the present disclosure.

FIG. 21 illustrates a removable arch adjustment appliance including regulating structures for individual tooth engagement structures comprising ball joint s according to a number of embodiments of the present disclosure. As illustrated in FIG. 21, the removable arch adjustment appliance 2100 includes a transpalatal element 2104, a first plurality of tooth engagement structures 2136-1, a second plurality of tooth engagement structures 2136-2, a first plurality of regulating structures 2154-1, and a second plurality of regulating structures 2154-2. In the embodiment of FIG. 21, the regulating structures 2154 each comprise a ball joint 2153.

The regulating structures 2154 can balance and direct the expansion force so that the teeth move more evenly and the dental arch expansion process maintains a proper or desired shape of the dental arch. The ball joints 2153 add three degrees of freedom (rotation) for the regulating structures 2154 versus a solid plane between the transpalatal element 2104 and the tooth engagement structures 2136. This allows rolling, pitching, and yawing of the tooth engagement structures 2136 relative to the transpalatal element 2104 to apply force more evenly to the patient's teeth.

Figure 22:
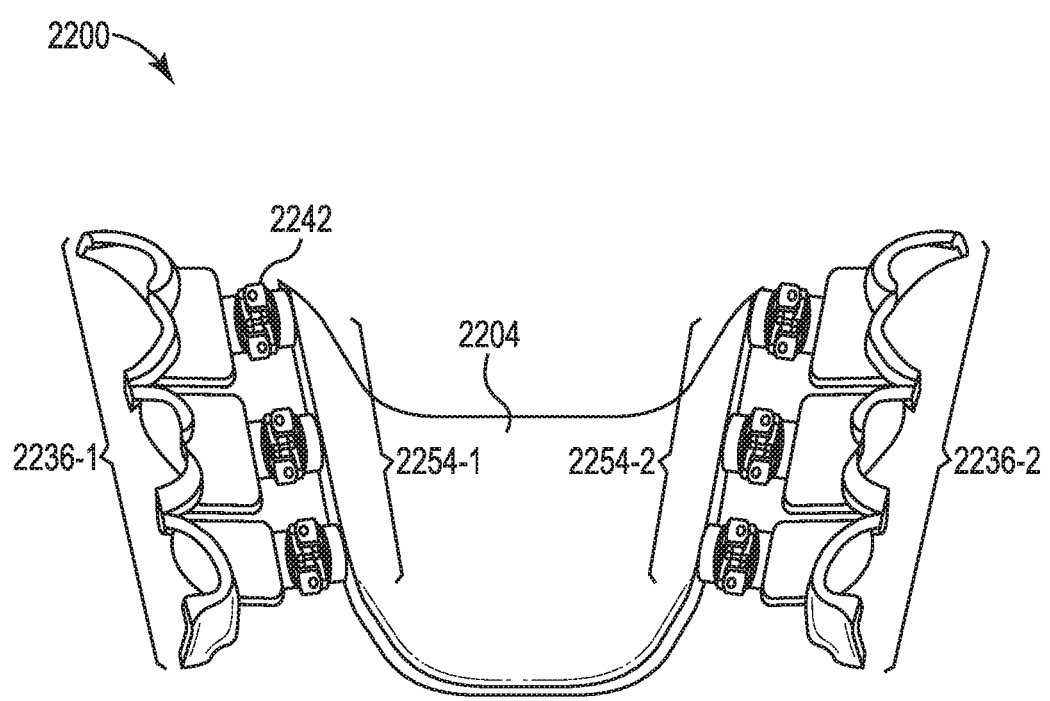
FIG. 22 illustrates a removable arch adjustment appliance including regulating structures for individual tooth engagement structures comprising universal joint s according to a number of embodiments of the present disclosure.

FIG. 22 illustrates a removable arch adjustment appliance including regulating structures for individual tooth engagement structures comprising universal joints according to a number of embodiments of the present disclosure. As illustrated in FIG. 22, the removable arch adjustment appliance 2200 includes a transpalatal element 2204, a first plurality of tooth engagement structures 2236-1, a second plurality of tooth engagement structures 2236-2, a first plurality of regulating structures 2254-1, and a second plurality of regulating structures 2254-2. In the embodiment of FIG. 22, the regulating structures 2254 each comprise a universal joint 2242.

The regulating structures 2254 can balance and direct the expansion force so that the teeth move more evenly and the dental arch expansion process maintains a proper or desired shape of the dental arch. The universal joints 2242 add three degrees of freedom (rotation) for the regulating structures 2254 versus a solid plane between the transpalatal element 2204 and the tooth engagement structures 2236. This allows rolling, pitching, and yawing of the tooth engagement structures 2236 relative to the transpalatal element 2204 to apply force more evenly to the patient's teeth.

Figure 23:
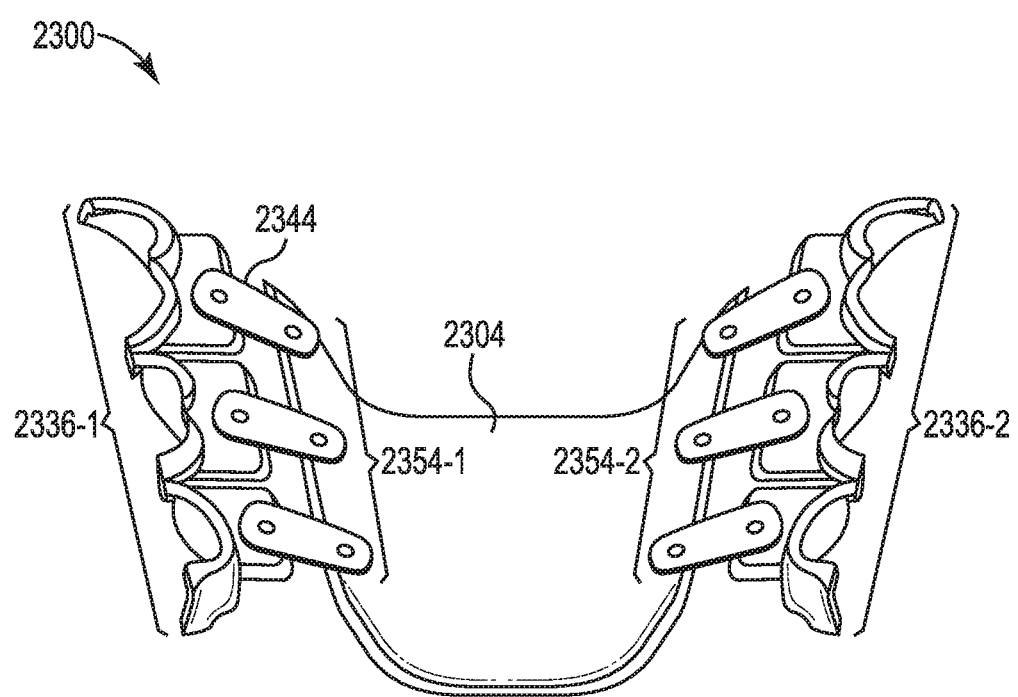
FIG. 23 illustrates a removable arch adjustment appliance including regulating structures for individual tooth engagement structures comprising arms according to a number of embodiments of the present disclosure.

FIG. 23 illustrates a removable arch adjustment appliance including regulating structures for individual tooth engagement structures comprising arms according to a number of embodiments of the present disclosure. As illustrated in FIG. 23, the removable arch adjustment appliance 2300 includes a transpalatal element 2304, a first plurality of tooth engagement structures 2336-1, a second plurality of tooth engagement structures 2336-2, a first plurality of regulating structures 2354-1, and a second plurality of regulating structures 2354-2. In the embodiment of FIG. 23, the regulating structures 2354 each comprise an arm 2344. Each of the arms 2344 can be pinned to a respective one of the tooth engagement structures 2336 and fixed to the transpalatal element 2304.

The regulating structures 2354 can balance and direct the expansion force so that the teeth move more evenly and the dental arch expansion process maintains a proper or desired shape of the dental arch. The arms 2344 add one degree of freedom (rotation) for the regulating structures 2354 versus a solid plane between the transpalatal element 2304 and the tooth engagement structures 2336. This allows for rotation of the tooth engagement structures 2336 relative to the transpalatal element 2304 to apply force more evenly to the patient's teeth.

Figure 24A:
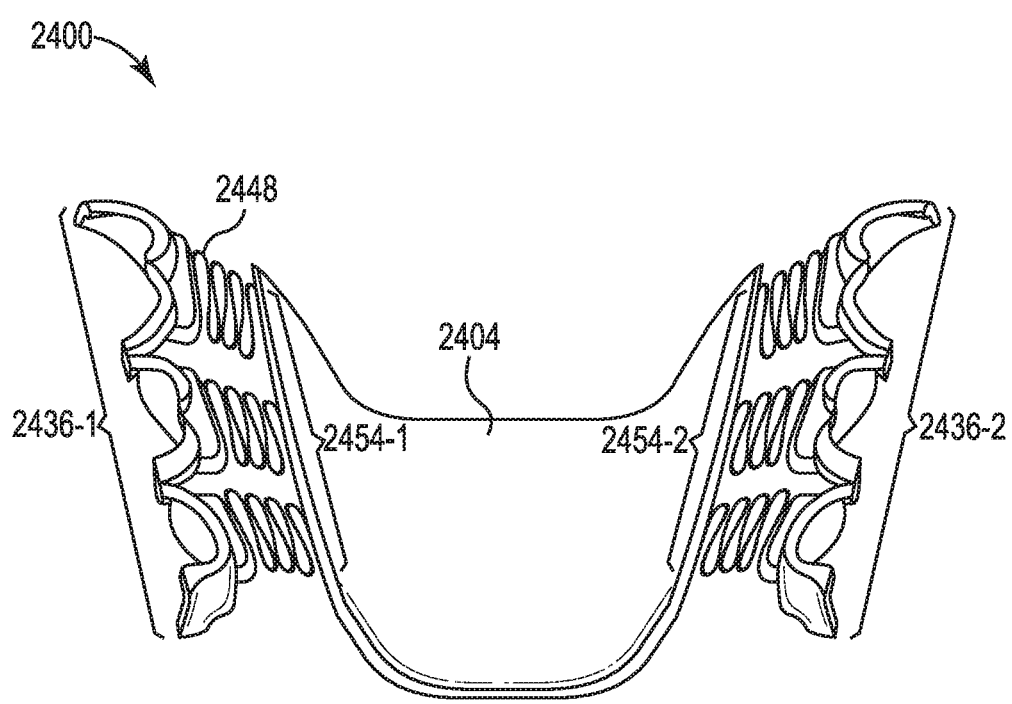
FIG. 24A illustrates a removable arch adjustment appliance including regulating structures for individual tooth engagement structures comprising horizontal accordion springs according to a number of embodiments of the present disclosure.
Figure 24B:
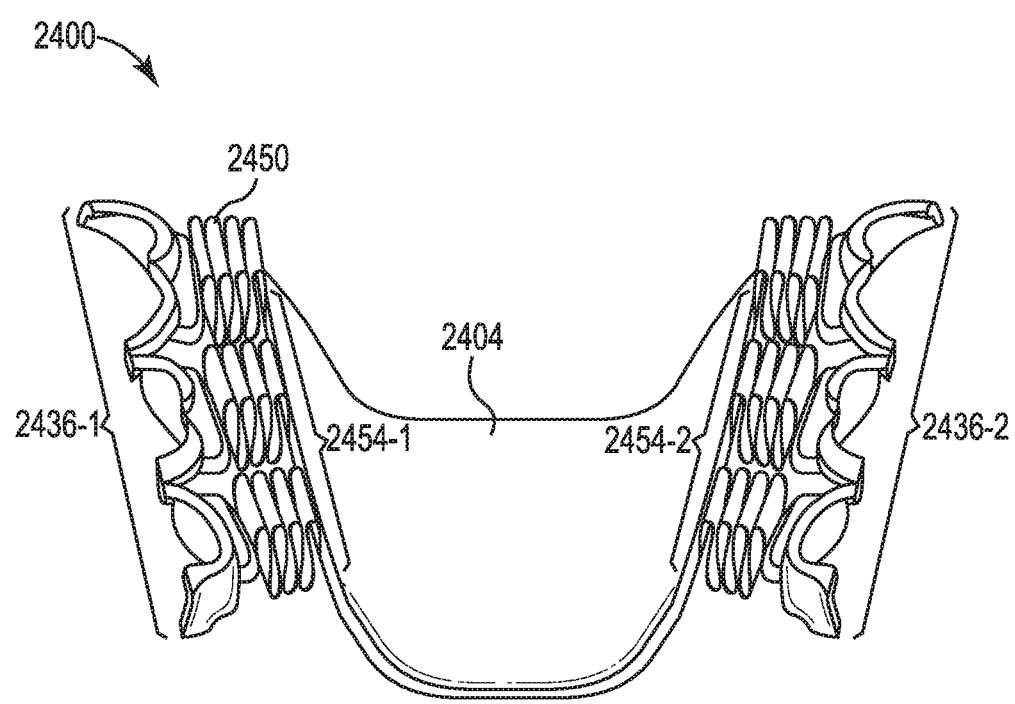
FIG. 24B illustrates a removable arch adjustment appliance including regulating structures for individual tooth engagement structures comprising vertical accordion springs according to a number of embodiments of the present disclosure.

FIG. 24A illustrates a removable arch adjustment appliance including regulating structures for individual tooth engagement structures comprising horizontal accordion springs according to a number of embodiments of the present disclosure. FIG. 24B illustrates a removable arch adjustment appliance including regulating structures for individual tooth engagement structures comprising vertical accordion springs according to a number of embodiments of the present disclosure. As illustrated in FIGS. 24A-24B, the removable arch adjustment appliance 2400 includes a transpalatal element 2404, a first plurality of tooth engagement structures 2436-1, a second plurality of tooth engagement structures 2436-2, a first plurality of regulating structures 2454-1, and a second plurality of regulating structures 2454-2. In the embodiment of FIG. 24A, each of the regulating structures 2454 comprise a portion of the removable arch adjustment appliance 2400 with areas of material removed therefrom yielding a shape and functionality of horizontal accordion springs 2448. In the embodiment of FIG. 24B, each of the regulating structures 2454 comprise a portion of the removable arch adjustment appliance 2400 with areas of material removed therefrom yielding a shape and functionality of horizontal accordion springs 2450.

The regulating structures 2454 can balance and direct the expansion force so that the teeth move more evenly and the dental arch expansion process maintains a proper or desired shape of the dental arch. The horizontal accordion springs 2448 or vertical accordion springs 2450 add two degrees of freedom (one translation and one rotation) for the regulating structures 2454 versus a solid plane between the transpalatal element 2404 and the tooth engagement structures 2436. This allows for rotation and translation of the tooth engagement structures 2436 relative to the transpalatal element 2404 to apply force more evenly to the patient's teeth.

Figure 25:
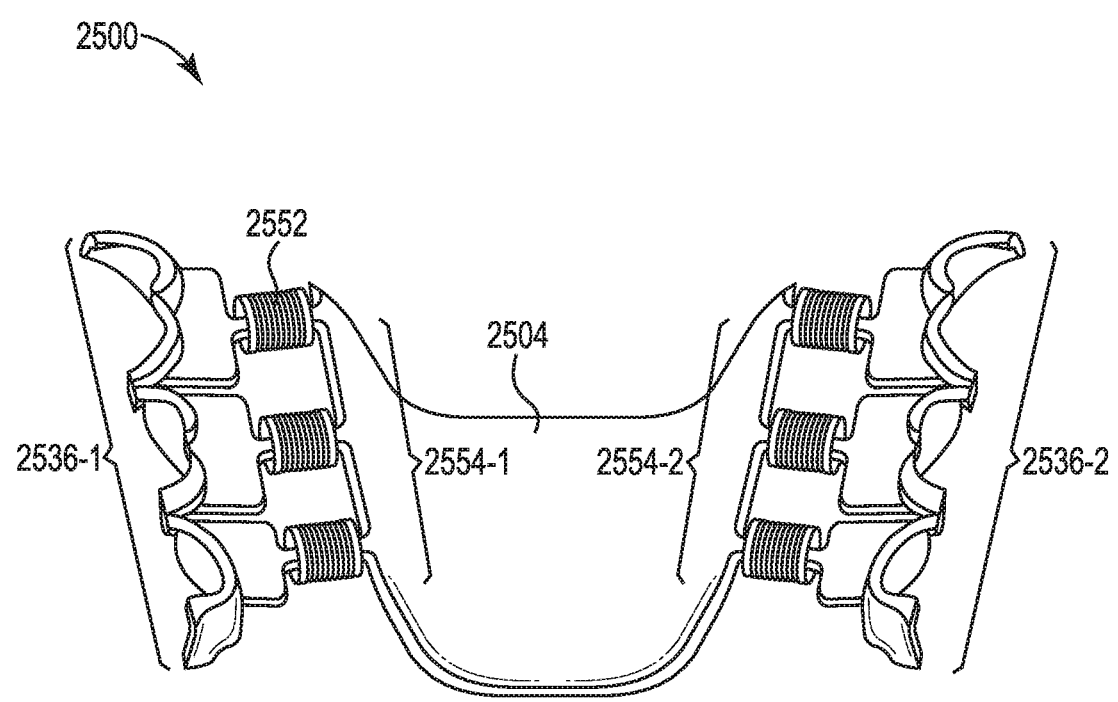
FIG. 25 illustrates a removable arch adjustment appliance including regulating structures for individual tooth engagement structures comprising coupling springs according to a number of embodiments of the present disclosure.

FIG. 25 illustrates a removable arch adjustment appliance including regulating structures for individual tooth engagement structures comprising coupling springs according to a number of embodiments of the present disclosure. As illustrated in FIG. 25, the removable arch adjustment appliance 2500 includes a transpalatal element 2504, a first plurality of tooth engagement structures 2536-1, a second plurality of tooth engagement structures 2536-2, a first plurality of regulating structures 2554-1, and a second plurality of regulating structures 2554-2. In the embodiment of FIG. 25, the regulating structures 2554 each comprise a coupling spring 2552.

The regulating structures 2554 can balance and direct the expansion force so that the teeth move more evenly and the dental arch expansion process maintains a proper or desired shape of the dental arch. The transpalatal arch element 2504 can terminate in a first shaft proximal to the first plurality of regulating structures 2554-1. The first plurality of tooth engagement structures 2536-1 can terminate in a second shaft proximal to the first plurality of regulating structure 2554-1. The coupling spring 2552 can dampen misalignment between the first shaft and the second shaft.

Figure 26:
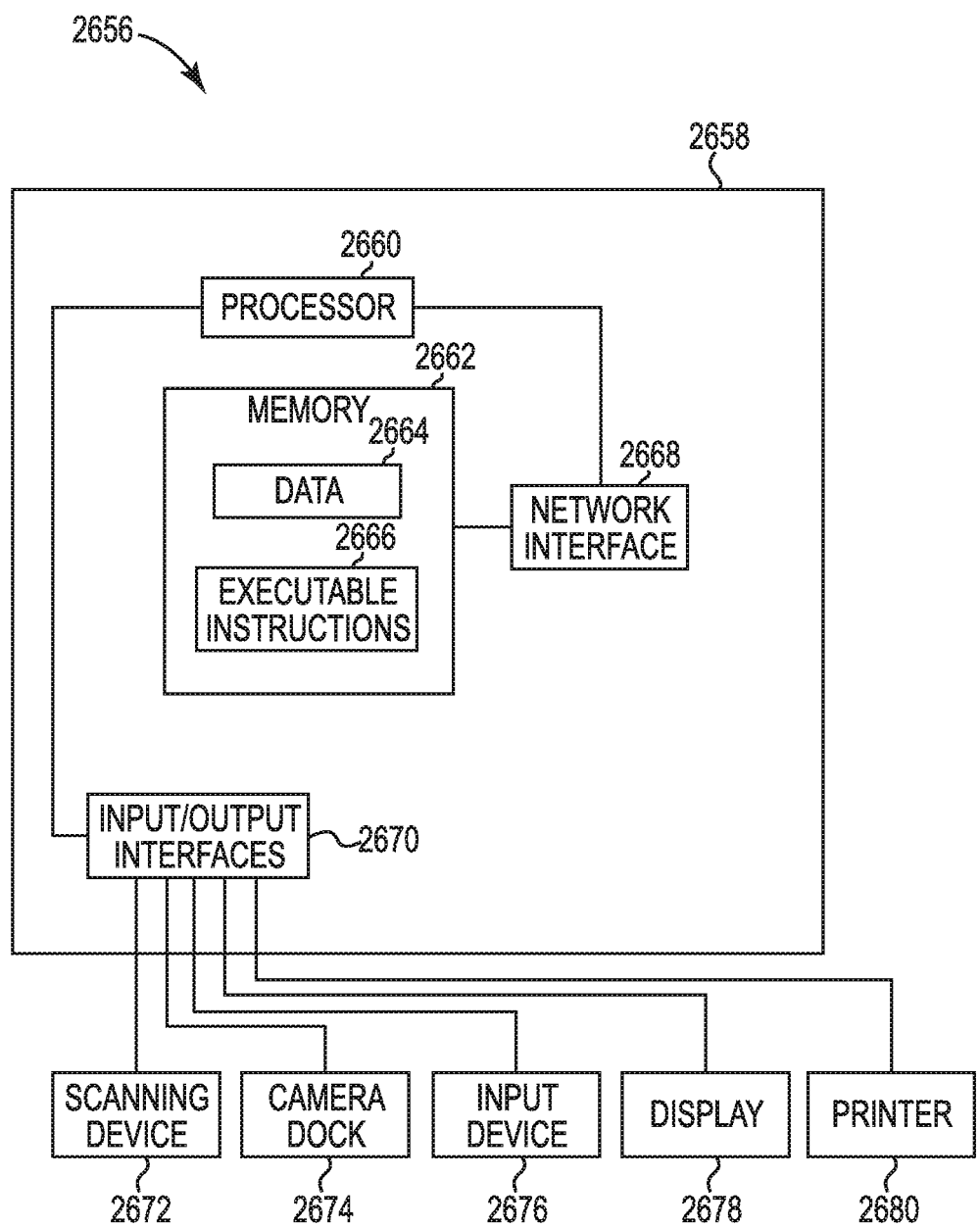
FIG. 26 illustrates an example computing device readable medium having executable instructions that can be executed by a processor to perform a method according to one or more embodiments of the present disclosure.

FIG. 26 illustrates an example computing device readable medium 2656 having executable instructions that can be executed by a processor to perform a method according to one or more embodiments of the present disclosure. For instance, a computing device 2658 can have a number of components coupled thereto. The computing device 2658 can include a processor 2660 and a memory 2662. The memory 2662 can have various types of information including data 2664 and executable instructions 2666, as discussed herein.

The processor 2660 can execute instructions 2666 that are stored on an internal or external non-transitory computer device readable medium (CRM). A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information.

Memory 2662 and/or the processor 2660 may be located on the computing device 2658 or off the computing device 2658, in some embodiments. As such, as illustrated in the embodiment of FIG. 26, the computing device 2658 can include a network interface 2668. Such an interface 2668 can allow for processing on another networked computing device, can be used to obtain information about the patient, and/or can be used to obtain data and/or executable instructions for use with various embodiments provided herein.

As illustrated in the embodiment of FIG. 26, the computing device 2658 can include one or more input and/or output interfaces 2670. Such interfaces 2670 can be used to connect the computing device 2658 with one or more input and/or output devices 2672, 2674, 2676, 2678, 2680.

For example, in the embodiment illustrated in FIG. 26, the input and/or output devices can include a scanning device 2672, a camera dock 2674, an input device 2676 (e.g., a mouse, a keyboard, etc.), a display device 2678 (e.g., a monitor), a printer 2680, and/or one or more other input devices. The input/output interfaces 2670 can receive executable instructions and/or data, storable in the data storage device (e.g., memory), representing a virtual dental model of a patient's dentition.

In some embodiments, the scanning device 2672 can be configured to scan one or more physical dental models of a patient's dentition. In one or more embodiments, the scanning device 2672 can be configured to scan the patient's dentition and/or dental appliance directly. The scanning device 2672 can be configured to input data into the computing device 2658.

In some embodiments, the camera dock 2674 can receive an input from an imaging device (e.g., a 2D or 3D imaging device) such as a virtual camera, a printed photograph scanner, and/or other suitable imaging device. The input from the imaging device can, for example, be stored in memory 2662.

The processor 2660 can execute instructions to provide a visual indication of a treatment plan, a dental appliance, and/or a portion of a transpalatal element or stop mechanism on the display 2678. The computing device 2658 can be configured to allow a treatment professional or other user to input treatment goals. Input received can be sent to the processor 2660 as data 2664 and/or can be stored in memory 2662.

Such connectivity can allow for the input and/or output of data and/or instructions among other types of information. Some embodiments may be distributed among various computing devices within one or more networks, and such systems as illustrated in FIG. 26 can be beneficial in allowing for the capture, calculation, and/or analysis of information discussed herein.

The processor 2660, in association with the data storage device (e.g., memory 2662), can be associated with the data 2664. The processor 2660, in association with the memory 2662, can store and/or utilize data 2664 and/or execute instructions 2666 for designing a virtual appliance, including a transpalatal element, a regulating structure, a stop mechanism for a specific stage of a treatment plan and/or a series of virtual appliances for a treatment plan. Such data can include the virtual dental model and/or virtual model of a surface of a patient's mouth (e.g., palate and/or floor of the mouth).

The processor 2660 coupled to the memory 2662 can cause the computing device 2658 to determine a treatment plan to expand at least one of a space between the molars on each side of a patient's jaw or the palate of the patient. The treatment plan can include expanding at least one of the space between the molars on each side of a patient's jaw or palate of the patient by a first incremental distance (e.g., first incremental expansion length) using a first virtual appliance, wherein the first virtual appliance includes a shell having a plurality of cavities formed therein and shaped to receive teeth of the patient. The shell of the first virtual appliance can include an elastic transpalatal element with a predetermined force characteristic that spans the space between the molars on each side of the patient's jaw and provides force to expand at least one of the spaces between the molars on each side of the patient's jaw or the palate of the patient. The transpalatal element of the first virtual appliance can include a number of force control elements and/or regulating structures to control the force provided by the transpalatal element. The first virtual appliance can, in addition or alternatively, include a stop mechanism located on the shell to provide a mechanical force on the transpalatal element of the shell of the first appliance to reduce the force provided by the transpalatal element that expands the at least one of the space between the molars on each side of the patient's jaw or the palate of the patient. The transpalatal element of the shell of the first appliance, the force control elements, and/or the stop mechanism can be specific to a stage of a treatment plan and can be shaped based on physical data of the space between the molars on each side of the patient's jaw or the palate of the patient.

The treatment plan can include expanding at least one of the space between the molars on each side of a patient's jaw or palate of the patient by a second incremental distance (e.g., second incremental expansion length) using a second virtual appliance, wherein the second virtual appliance includes a shell having a plurality of cavities formed therein and shaped to receive teeth of the patient. The shell of the second virtual appliance can include an elastic transpalatal element with a predetermined force characteristic that spans the space between the molars on each side of the patient's jaw and provides force to expand at least one of the spaces between the molars on each side of the patient's jaw or the palate of the patient. The transpalatal element of the second virtual appliance can include a number of force control elements and/or regulating structures to control the force provided by the transpalatal element. The second virtual appliance can, in addition or alternatively, include a stop mechanism located on the shell to provide a mechanical force on the transpalatal element of the shell of the second appliance to reduce the force provided by the transpalatal element that expands the at least one of the space between the molars on each side of the patient's jaw or the palate of the patient. The transpalatal element of the shell of the second appliance, the force control elements, and/or the stop mechanism can be specific to a stage of a treatment plan and can be shaped based on physical data of the space between the molars on each side of the patient's jaw or the palate of the patient.

The virtual model of the dental appliance can, in some embodiments, be used to create a physical dental appliance. For example, dental appliance structural data can be stored in memory and used by an appliance manufacturing device to fabricate an appliance based upon the dental structural data. For instance, the memory can contain executable instructions to operate a thermoforming or direct fabrication device to form a dental appliance using those techniques.

In some embodiments, in order to direct force from the transpalatal element to other portions of the shell, a more rigid material may be applied between the transpalatal element and other portions of the shell (e.g., a rigid material is applied over and/or under the shell material or encapsulated within layers of shell material). Additionally, the rigid material used to form the transpalatal element can be reinforced by a reinforcement material (e.g., a metallic sheet or wire material).

As noted herein in some embodiments, the virtual appliance or data therefrom can be used to fabricate a physical appliance to be used in a patient's mouth. For example, in some embodiments, a method can include forming a physical transpalatal element based on the virtual transpalatal element.

It should be noted that when first and second are used to describe items in this disclosure, it is only meant that one item comes before the next and does not indicate that the items be the first and second items in a series of multiple items. For example, a first item may be the third item in a series of items and the second item may be the sixth item in a series and the terms first and second are used to indicate that the first comes before the second in the series even though there may be more items in the series.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A removable arch adjustment appliance comprising:
    a removable shell having a plurality of cavities shaped to receive a corresponding plurality of teeth of a patient's dental arch, the removable shell including an interior surface configured to apply forces to the teeth therein to reposition misaligned teeth within the patient's dental arch according to a stage of a treatment plan; and
    a transpalatal element comprising a sheet of material coupled to the removable shell, the sheet of material shaped to follow the contours of the patient's palate and arranged to span the patient's palate, wherein the sheet of material includes folds extending a length of multiple of the plurality of cavities in an anterior to posterior direction, wherein the folds have folding radiuses that are configured to provide a non-linear force that expands a space between posterior teeth on each side of the patient's jaw or palate.

2. The removable arch adjustment appliance of claim 1, wherein the folds are configured to activate in different steps of expansion of the transpalatal element.

3. The removable arch adjustment appliance of claim 2, wherein:
    the folds include four folds, wherein the four folds are located substantially near an apex of the transpalatal element.

4. The removable arch adjustment appliance of claim 2, wherein:
    the folds include two folds, wherein the two folds are located substantially near the removable shell, and wherein the two folds are located substantially between an apex of the transpalatal element and the plurality of cavities of the shell.

5. The removable arch adjustment appliance of claim 1, wherein the forces applied to the teeth by the shell are configured to rotate, tip, or rotate and tip the misaligned teeth within the patient's dental arch.

6. The removable arch adjustment appliance of claim 1, wherein the folds extend in a direction toward the tongue of the patient when the appliance is placed in the patient's oral cavity during use.

7. The removable arch adjustment appliance of claim 1, wherein the folds extend in a direction towards the palate of the patient when the appliance is placed in the patient's oral cavity during use.

8. The removable arch adjustment appliance of claim 1, wherein the transpalatal element continuously spans the removable shell in a lingual direction from a first side of the removable shell to a second side of the removable shell.

9. The removable arch adjustment appliance of claim 1, wherein the removable shell is made of the same material as the sheet of material of the transpalatal element.

10. The removable arch adjustment appliance of claim 1, wherein the sheet of material is a polymeric material.

11. The removable arch adjustment appliance of claim 1, wherein the removable shell, the sheet of material, and the folds form a unitary body.

12. The removable arch adjustment appliance of claim 1, wherein the removable shell and the sheet of material include different materials.

13. The removable arch adjustment appliance of claim 1, wherein different folds the folds have one or more of the following characteristics: different thicknesses, different lengths, and different bending curvatures.

14. The removable arch adjustment appliance of claim 1, wherein the non-linear force decreases as the space between the posterior teeth on each side of the patient's jaw or palate increases.

15. The removable arch adjustment appliance of claim 1, wherein the transpalatal element is configured to provide a gap between the patient's palate and at least a portion of the transpalatal element.

* * * * *